United States Patent [19]

Fitzgerald et al.

[11] 4,058,849
[45] Nov. 15, 1977

[54] SYSTEM FOR CONVERTING A ROUGH SKETCH TO A FINISHED DRAWING

[75] Inventors: William Joseph Fitzgerald, Ridgefield, Conn.; Glenmore Lorraine Shelton, Jr., Carmel; Robert Nolan Wolfe, Peekskill, both of N.Y.

[73] Assignee: International Business Machines Corporation, Armonk, N.Y.

[21] Appl. No.: 615,880

[22] Filed: Sept. 22, 1975

[51] Int. Cl.² .................................................. G06F 15/00
[52] U.S. Cl. ................................. 364/520; 364/300; 340/365 R; 364/900
[58] Field of Search ................. 235/151.1, 151; 444/1; 340/172.5

[56] References Cited

U.S. PATENT DOCUMENTS

| | | | |
|---|---|---|---|
| 3,720,948 | 3/1973 | Eichen et al. | 444/1 |
| T938,005 | 9/1973 | Colton et al. | 235/151 |

OTHER PUBLICATIONS

"The Instant Draftsman", Machine Design, 4/6/72, pp. 68–72.

*Primary Examiner*—Eugene G. Botz
*Attorney, Agent, or Firm*—Charles P. Boberg

[57] ABSTRACT

By means of a suitable data entry device such as an electronic digitizing tablet or graph board, items of data respectively defining the original configuration of a roughly sketched object and the desired final proportions thereof are entered into a stored table called a "pointing sequence list" (PSL), which is capable of storing all of the information required to define both the original form and the desired final configuration of the object. Initially the PSL contains positional entries representing the coordinates of definitive points on the roughly sketched object and dimensional entries specifying the proportions which the object is to have in its final delineation, all arranged in an order corresponding to a predefined pointing sequence which is followed by the operator when he enters the necessary items of graphic information into the system. The initial PSL subsequently is converted to a new PSL by a rectifying procedure which modifies the coordinates of the previously entered points where necessary in order to effect horizontal and vertical alinements of points which are supposed to be located on common axially directed lines. Whenever a coordinate is modified to effect an axial alinement (or in some instances a joinder) between two or more points during the rectification process, the respective entry which corresponds to the modified coordinate in the new PSL is provided with a "pointer" to the PSL location storing the entry which specifies the referenced coordinate, thereby establishing an equivalence between these two entries. The linkages among equivalent entries are preserved during subsequent processing operations performed upon these entries, so that a change in one member of each set affects all of the other members thereof. The new PSL entries are then further modified where necessary in accordance with the proportions specified by the various dimensional entries, so that the PSL ultimately specifies the positions of points defining a rectified and proportioned version of the original rough sketch, thereby enabling a finished drawing or other final representation of the object to be produced from these PSL entries.

23 Claims, 47 Drawing Figures

OVERLAY KEYBOARD

FIG. 7

POINTING SEQUENCE LIST (PSL)

| PSL LOCATION | PSL ENTRY | | |
|---|---|---|---|
| 1 | LINE FUNCTION HEADER | | ⎫ |
| 2 | $A_H$ | ⎫ | |
| 3 | $A_V$ | | |
| 4 | $B_H$ | DOC | |
| 5 | $B_V$ | ENTRIES | |
| 6 | $C_H$ | SPECIFYING | LINE BLOCK |
| 7 | $C_V$ | LINE | |
| 8 | $D_H$ | POSITIONS | |
| 9 | $D_V$ | IN A | |
| 10 | $E_H$ | LINE STRING | |
| 11 | $E_V$ | ⎭ | ⎭ |
| 12 | AXIAL DIMENSION HEADER | | ⎫ |
| 13 | $B_H$ | ⎫ | |
| 14 | $B_V$ | DOC | |
| 15 | $C_H$ | REFERENCES | |
| 16 | $C_V$ | SPECIFYING | AXIAL DIMENSION BLOCK |
| 17 | $F_H$ | POSITIONS OF AN | |
| 18 | $F_V$ | AXIAL DIMENSION | |
| 19 | DIRECTION CONTROL WORD | | |
| 20 | 4 | | |
| 21 | . | | |
| 22 | 0 | | |

DATA WORD STRUCTURES FOR PSL ENTRIES

```
     FIRST BYTE      SECOND BYTE
    ⌢⎯⎯⎯⎯⎯⎯⎯⎯⎯⎯⎯⌢   ⌢⎯⎯⎯⎯⎯⎯⎯⎯⎯⎯⌢
    0 0 0 0 0 1 0 0  - - - - - - - -   HEADER
    - 1 - - - - - -  - - - - - - - -   DOC ENTRY           FIG. 8
    0 0 0 0 0 0 1 0  - - - - - - - -   ALPHABETIC
    0 0 0 0 0 0 0 1  - - - - - - - -   NUMERIC

- DENOTES ANY DIGIT
```

DATA WORD STRUCTURE FOR DOC ENTRY
(OLD AND NEW PSL)

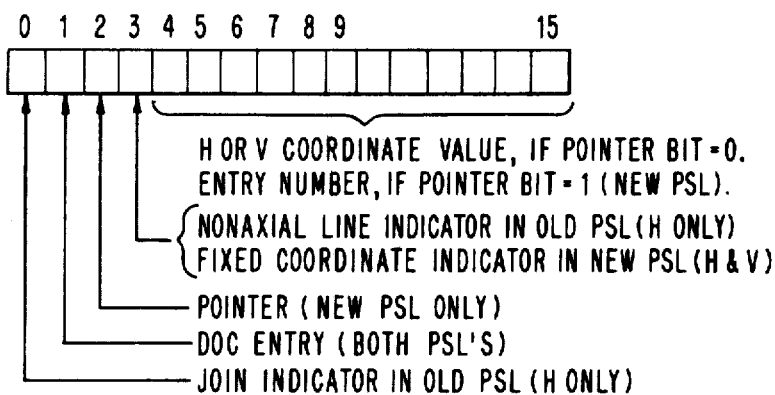

FIG. 9

H OR V COORDINATE VALUE, IF POINTER BIT = 0.
ENTRY NUMBER, IF POINTER BIT = 1 (NEW PSL).
{NONAXIAL LINE INDICATOR IN OLD PSL (H ONLY)
{FIXED COORDINATE INDICATOR IN NEW PSL (H & V)
POINTER (NEW PSL ONLY)
DOC ENTRY (BOTH PSL'S)
JOIN INDICATOR IN OLD PSL (H ONLY)

|  | PSL |  |
| PSL1 (OLD PSL) | LOC. | PSL2 (NEW PSL) |
|---|---|---|
| L.F. HEADER | 1 | L.F. HEADER |
| AH | 2 | AH |
| AV | 3 | AV |
| BH | 4 | BH |
| BV | 5 | BV |
| CH | 6 | CH |
| CV | 7 | CV |
| DH | 8 | DH |
| DV | 9 | DV |
| EH | 10 | EH |
| EV | 11 | EV |

FIG. 10

PROP1

RECTIFYING AND PROPORTIONING

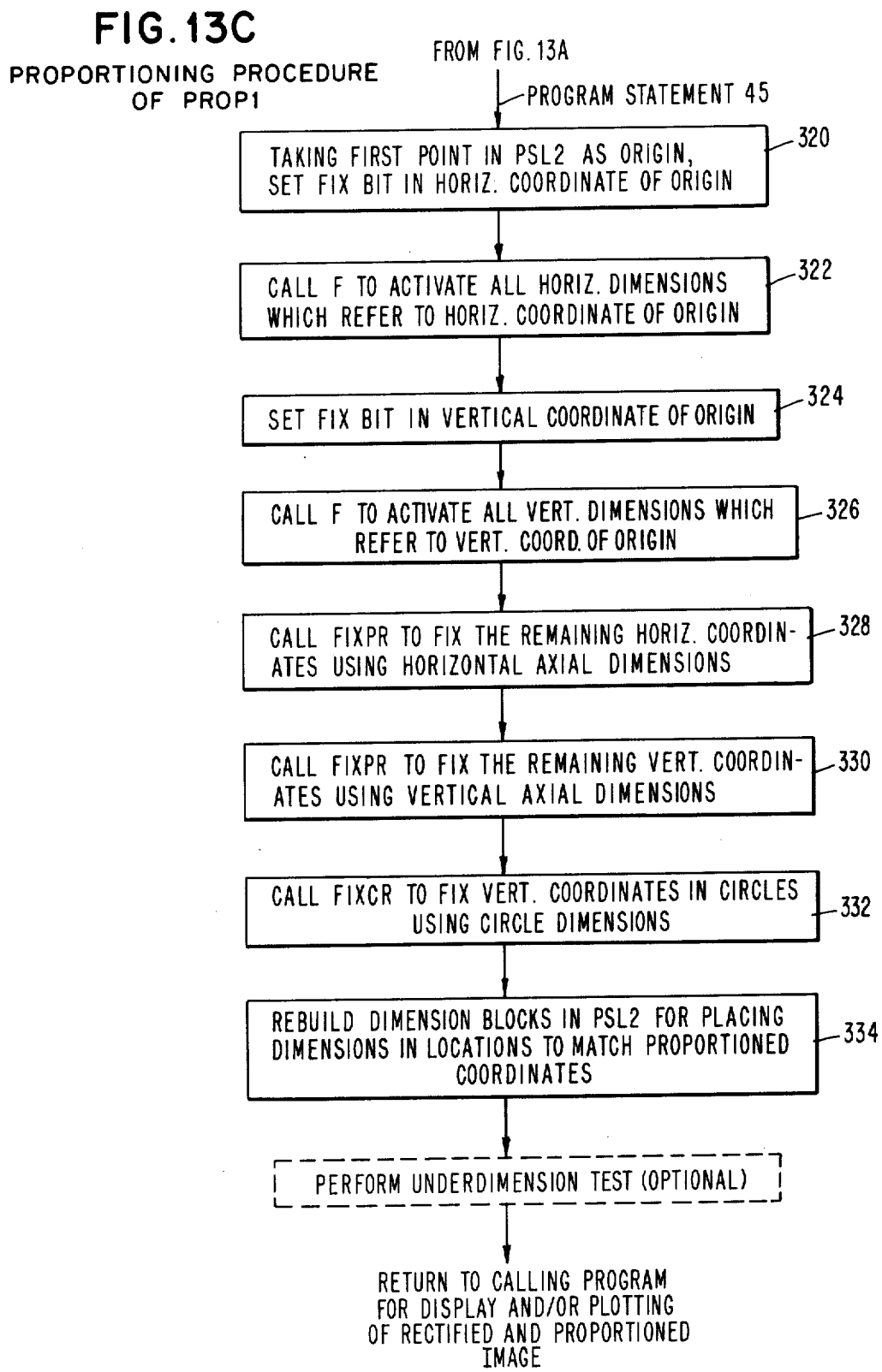

CONL

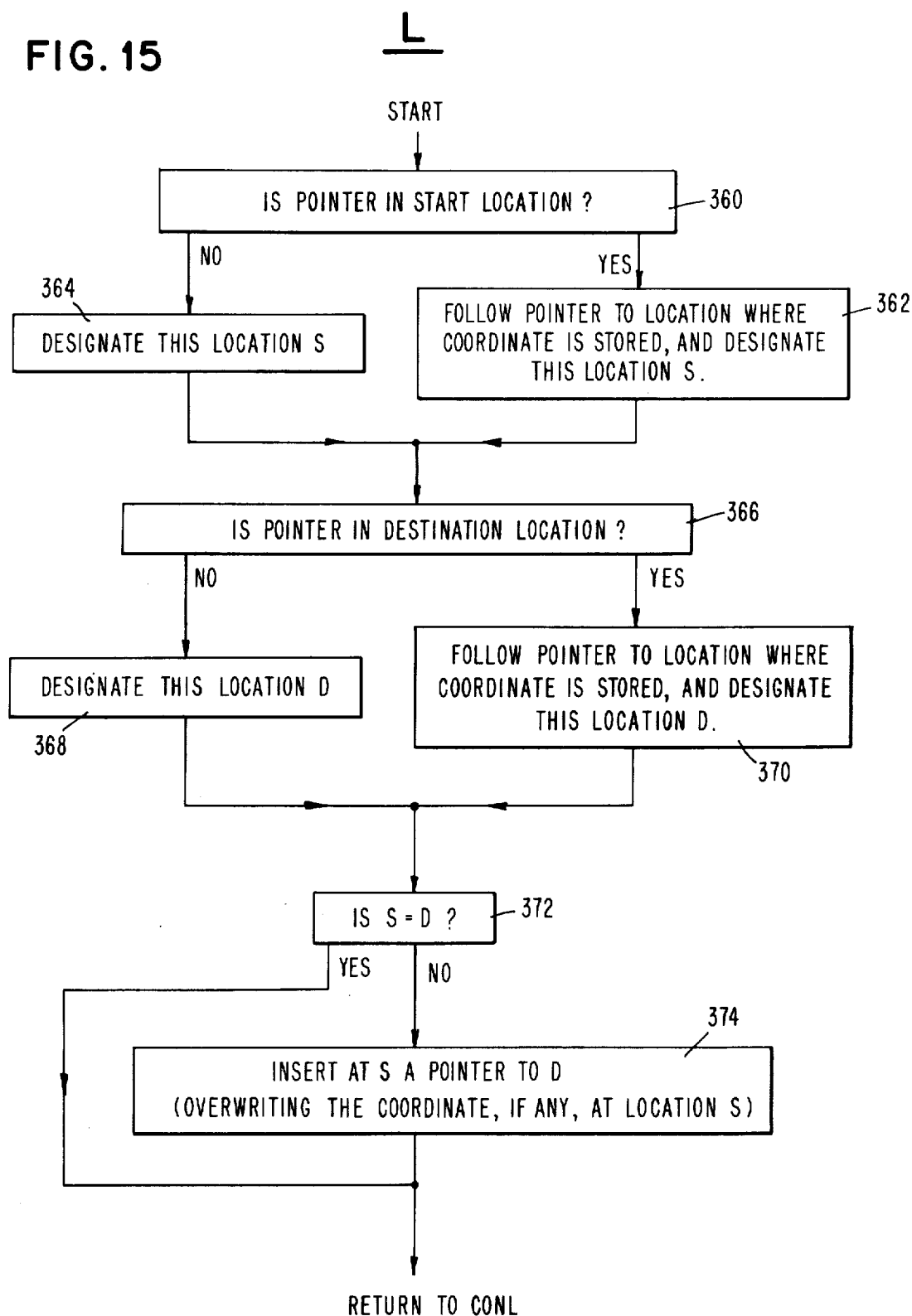

FIG. 18A

PROP 1

```
// FOR PROP1
      SUBROUTINE PROP1(IPDSW)
C     IPDSW, 1= ORTHOG, 2= PROP
C        INTERPRET PROP1 FUN-KEY. CALLED BY MECDW
      DIMENSION IFUM(15)
      DIMENSION ICDI(50)
C
      COMMON /INSKEL/IPTX(4),IPTY(4),IORSW,IPTIX,IBUZS
      COMMON ICHAR(172),ITWDI,ITWD(1000),IOUT(1011)
      COMMON KPCF(100),KPCN(12),KPCA(100),IAPCF,IAPCN,IAPCA,IPCC,IDOCX
      COMMON IDOCY,LMSGA,LIOUT,IDOX,IDOY
      COMMON IFX1,NX1,IAX1,IFY1,NY1,IAY1,IFX2,NX2,IAX2,IFY2,NY2,IAY2
      COMMON IFDLX,NDELX,IADLX,IFDLY,NDELY,IADLY,NFX,NNX,NAX,NFY,NNY,NAY
      COMMON IFUNC,NUMRL,IALPH,KBX1,KBX2,KBY1,KBY2,ITBX,ITBY,KBRX1,KBRY1
      COMMON KBRX2,KBRY2,KBREG,IDOC,           IUNUK,              LPKX,LPKY
      COMMON IOPTR,IOPT1,IBUZC,MKDOC,KBTLT,KBWTH,KBHGT,IDSPL,IRES,KBNUM
      COMMON ITDCX,ITDCY,ISLPT,LCVID,IRTOP,LTOP,IVBMN,IVBMX,IVBND(1375)
      COMMON ISYMA(320),ISYMV(1000),IDKP,ISTRT,ISTOP,IERSW,ICLAS,ISC
      COMMON SC,IERR,LCCKC(45,2),KK(25,3),NCHAR,NFUN,ICMSG(23,10)
      COMMON KCCK(25),NXMEN,IPSL(1011),IOVD,IGRAV,ILYCU,NAXCC
      COMMON           INOXK,KLTY1,KLTY2,KLTY3,KLTY4,KLTY5
      COMMON                 LPSF1,LPSF2,LPSF3,LPSF4,LPSF5,LPSF6
      COMMON LSA(11),JOUT,IDSPG,LRTN,IXYZ,ISTSW,IPUSW
      COMMON NXVE,NXCA,IDPS,IRECN,IMSSN,IPRSW
      COMMON IPSN,ISMR,IBIR
      COMMON IDCX2,IDCY2,IDOCR,KBDX2,KBDY2,KBDR,ITABX,ITABY
      COMMON IHDAP,IHDIP,IVDAP,IHDI(50),IVDI(50),IVDIP
C
      DATA MFUNC/Z0400/
      DATA M6000/Z6000/
      DATA M003F/Z003F/
      DATA M2000/Z2000/
      DATA MOFFF /ZOFFF/
      DATA ISKLN/Z04F1/
      DATA M4000/Z4000/
      DATA IPDC/Z0407/
      DATA M0300/Z0300/
      DATA LFUM/12/
      DATA IFUM/Z04E9,Z04E2,Z04E3,Z04E4,Z04E5,Z0410,Z04C0,Z0411,Z0408,
     1Z0446,Z04E1,Z0405/
      DATA ICIRP/Z04C0/
C        80=FILLET  90=SLOT   100=SINGLE WEIGHT SOLID LINE FOR LEADER 2
C     DIM PAC   110=A/N
C      Z0410 FOR DIMPAC HAS 04E1 IN IT
C      Z04C0 FOR CIRPAC
      DATA M1000/Z1000/
C        INITIALIZE
C     WRITE (6,1001)
C1001 FORMAT('ENTERED PROP1')
      IHDAP=0
      IHDIP=0
      IVDAP=0
      IVDIP=0
      ICDIP=0
      ICDAP=0
```

FIG. 18B

```
C       SAVE IGRAV
C       SET IGRAV=0 FOR PROP1 AND CONL ROUTINES
        IGRAS=IGRAV
        IGRAV=0
        CALL TSTOP
        DO 44 I=1,50
        IVDI(I)=0
44      IHDI(I)=0
        CALL TSTRT
        IOSW = 1
        ICONS=1
13      CONTINUE
        IT = IAND(IOUT(ISTRT),MFUNC)
        IF(IT-MFUNC) 12,11,12
12      CONTINUE
        IPSL(ISTRT) = IOUT(ISTRT)
        ISTRT = ISTRT+1
        IF(ISTRT-IOPTR) 13,41,41
41      CONTINUE
        IPSL(ISTRT) = IOUT(ISTRT)
        GO TO 40
C          CLEAR IPSL    WAS DONE IN MECDW INIT. AND PER CLEAR F.K.
C          ISTRT = COUNTER I IOUT AND IPSL
C          IOSW  = ORIGIN SWITCH (FIRST LINK OF FIRST CHAIN)
C          ICONS = FIRST LINK SWITCH FOR ALL CHAINS
C          PROP1 ONLY SETS THESE SWITCHES, NEVER RESET
C             START IOUT/IPSL INVESTIGATION
C          IS THIS A FUN-KEY WD.
11      CONTINUE
        IOUT(ISTRT) = IOUT(ISTRT)
        IF(IOUT(ISTRT)-IPDC) 14,12,14
14      CONTINUE

ISTRT = ISTRT
        IOUT(ISTRT) = IOUT(ISTRT)
        IF(ISTRT-IOPTR)22,22,40
C                GO TO DISPLAY OR PROPORTION AT 40 IF END OF PSL
22      CONTINUE
C                CHECK FOR A LEGAL CODE
C           8=FILLET  46=SLOT   42=NOTES    5=A/N
        DO 23 I=1,LFUM
        IF(IOUT(ISTRT)-IFUM(I))23,25,23
23      CONTINUE
        IT = 1

CALL ERMSG(15)
        IPDSW=1
C       RESTORE IGRAV
        IGRAV=IGRAS
        RETURN
C
25      IPSL(ISTRT)=IOUT(ISTRT)
```

FIG. 18C

```
        GO TO (26,26,26,26,26,28,26,199,80,90,100,110),I
C            26= STRAIGHT LINE CODE
C            28= DIMENSION CODE
C         80=FILLET  90=SLOT  100=SINGLE WEIGHT SOLID LINE FOR LEADER 2
C            199= CIR DIM CODE
C        DIM PAC  110=A/N
 26     ISTRT=ISTRT+1
        ICONS=1
 27     CALL CONL(IOSW,ICONS)
        ISTRT=ISTRT+2
        IF(ISTRT-IOPTR)42,42,40
 42     IT=IAND(IOUT(ISTRT),M4000)

IF(IT)27,13,27
C
C         80=FILLET  90=SLOT  100=SINGLE WEIGHT SOLID LINE FOR LEADER 2
C        DIM PAC  110=A/N
C
 80     CONTINUE
 90     CONTINUE
100     CONTINUE
110     CONTINUE
        ISTRT = ISTRT+1
        GO TO 13
C       FIRST PASS CIRCLE DIM PACKS
  199   I=ISTRT
C       TRANSFER 1ST 3 WRDS OF IOUT TO IPSL
        IPSL(I)=IOUT(I)
        IPSL(I+1)=IOUT(I+1)
        IPSL(I+2)=IOUT(I+2)
C       SEARCH 04C0 FOR 1ST SURFACE POINT
        ICLAS=ICIRP
        IDOCX=IOUT(I+5)
        IDOCY=IOUT(I+6)
        IOPTS=IOPTR
        IOPTR=I-1
        CALL SRCH1
        IF(IOPT1) 200,250,200
  200   CONTINUE
C       PUT POINTERS INTO IPSL I+3-6
        IPSL(I+3)=IOR((IOPT1+1),M6000)
        IPSL(I+4)=IOR((IOPT1+2),M6000)
        IPSL(I+5)=IOR((IOPT1+3),M6000)
        IPSL(I+6)=IOR((IOPT1+4),M6000)
C       PREPARE CIRCLE DIM INDEX
        ICDIP=ICDIP+1
        ICDAP=ICDAP+1
        ICDI(ICDIP)=I
C       GET NO OF CIRCLES IN THIS PACK
        NCIR1=ISRA(IPSL(I+2),6)
C       MASK OFF ORIGINAL BIT NO 1
        NCIR=IAND(NCIR1,M003F)
C       HOW MANY CHARS IN A/N
        NCHAR=IAND(IPSL(I+2),M003F)
C       UPDATE I TO NEXT FUNC OR C2X
        I=I+11+NCHAR
```

FIG. 18D

```
C         IS CIR DIM PACK FINISHED
C         REDUCE CIRCLE COUNT BY 1
      201 NCIR=NCIR-1
          IF(NCIR) 230,230,202
C         PACK NOT COMPLETE
C         DOES I POINT TO DOC PT
C         YES.  OK
      202 CONTINUE
          NPONT=IAND(IOUT(I),M4000)
          IF (NPONT) 204,204,206
C         ERROR
      204 CONTINUE
          WRITE(2,208)
      208 FORMAT ('SHOULD HAVE BEEN CIRCLE CX')
C         UPDATE ISTRT, RESTORE IOPTR, GO TO 22
          ISTRT=I
          IOPTR=IOPTS
          GO TO 22
C         SEARCH 04C0 FOR NEXT SURFACE POINT
      206 ICLAS=ICIRP
          IDOCX=IOUT(I+2)
          IDOCY=IOUT(I+3)
          CALL SRCH1
C
          IF(IOPT1) 220,250,220
C         PUT POINTERS INTO IPSL I+0-3
      220 CONTINUE
          IPSL(I)=IOR((IOPT1+1),M6000)
          IPSL(I+1)=IOR((IOPT1+2),M6000)
          IPSL(I+2)=IOR((IOPT1+3),M6000)
          IPSL(I+3)=IOR((IOPT1+4),M6000)
C         UPDATE I BY 4
          I=I+4
C         CHECK FOR CIR DIM PACK COMPLETE
          GO TO 201
C         RESTORE IOPTR AND ISTRT
      230 CONTINUE
          ISTRT=I
          IOPTR=IOPTS
C         IS IT END OF IOUT
          IF(IOPTR-I) 232,232,234
C         END OF IOUT, DISP OR PRCP
      232 CONTINUE
          GO TO 40
C
C         NOT END, IS NEST WORD FUNC CODE
      234 CONTINUE
          INXT=IAND(IOUT(ISTRT),M4000)
          IF(INXT) 240,240,236
C         ERROR, TYPE MESSAGE
      236 CONTINUE
          WRITE(2,238)
      238 FORMAT('WAS DOC PT, SHOULD BE FUNC')
      240 GO TO 22
C         SRCH1 DID NOT FIND S PT MATCH
      250 CONTINUE
```

FIG. 18E

```
      WRITE (2,252)
 252  FORMAT ('SRCH1 DIDNT FIND S PT MATCJ')
      GO TO 29

28   CONTINUE
C              SEARCH FOR SKETCH POINTS IN PSL
C              ASSOCIATED WITH THIS DIMENSION.
C
C              FIND THE FIRST POINT
C
      I=ISTRT
      IPSL(I)=IOUT(I)
      ICLAS=ISKLN
      IDOCX=IOUT(I+3)
      IDOCY=IOUT(I+4)
      IOPTS=IOPTR
      IOPTR=I-1
      CALL SRCH1
      IF(IOPT1)31,29,31
 29   CONTINUE
      IT = 2

C     RESTORE IGRAV
      IGRAV=IGRAS
      RETURN
 31   CONTINUE
C              SAVE POINTER TO SKETCH POINT. SAVE POINTER IN X HALF
C              POINT OF DIM PACK IN NEW PSL.
      IPSL(I+3)=ICLAS
      IPSL(I+4) = ICLAS+1
C
C              FIND THE SECOND POINT
C
      ICLAS=ISKLN
      IDOCX=IOUT(I+5)
      IDOCY=IOUT(I+6)
      CALL SRCH1
      IOPTR=IOPTS
      IF(IOPT1)32,29,32
 32   CONTINUE
C              FOUND A MATCH. SAVE POINTER.
      IPSL(I+5)=ICLAS
      IPSL(I+6) = ICLAS+1
C              SAVE A POINTER TO THE DIM IN THE HORIZ OR VERT DIM
C              INDEX. IT IS A VERT DIMENSION IF THE VERTICAL PRINT
C              DIRECTION CODE IS IN THE DIM PACK.
      IF (IOUT(I+32)-IPDC)34,33,34
 33   CONTINUE
C              FOUND VERTICAL DIMENSION. PUT IT IN THE VERTICAL
C              INDEX.
      IVDIP=IVDIP+1
      IVDAP=IVDAP+1
      IVDI(IVDIP)=I
C              SKIP TO A/N WORD.
```

FIG. 18F

```
            I=I+36
            GO TO 37
34      CONTINUE
C               FOUND A HORIZONTAL DIM. PUT IT IN HORIZ INDEX.
        IHCIP=IHDIP+1
        IHDAP=IHDAP+1
        IHDI(IHDIP)=I
C               SKIP TO A/N DATA.
        I=I+34
C
C               SKIP TO END OF DIM PACK.
37      DO 36 K=I,IOPTR
        IT=IAND(IOUT(K),M0300)
        IF(IT)36,43,36
43      ISTRT=K
        GO TO 22
36      CONTINUE
C               REACHED END OF PSL.
C
40      CONTINUE
C
C               DETERMINE WHETHER TO DISPLAY THE ORTHOGONALIZED IMAGE
C               OR TO PROPORTION BEFORE DISPLAYING.
C
        GO TO (60,45),IPDSW
45      CONTINUE
C               SAVE DIM  INDEX POINTERS
        IVDPS=IVDAP
        IHDPS=IHDAP
C               PROPORTION THE IMAGE
C
C               THE ORIGIN IS ASSUMED TO BE THE 1ST POINT IN THE PSL.
C               FIX THE PROJECTED COORDINATES OF THE ORIGIN AND ACTIVATE
C               ALL DIMENSIONS ASSOCIATED WITH IT.
C
        IT=2
67      CONTINUE
C               ACTIVATE ALL HORIZ DIMS ON THIS FIXED POINT.
        CALL F(IHDI,IHDIP,IT,3)
C               GO TO 72 IF THE X HALF POINT IS A POINTER.
        I2=IAND(IPSL(IT),M2000)
        IF(I2)72,68,72
72      IT=IAND(IPSL(IT),MOFFF)
        GO TO 67
68      CONTINUE
C               PUT FIX BIT IN X HALF POINT.
        IPSL(IT)=IOR(IPSL(IT),M1000)
        IT=3
70      CONTINUE
C               ACTIVATE ALL VERT DIMS ON THIS FIXED POINT.
        CALL F(IVDI,IVDIP,IT,4)
C               IF THE FIXED Y HALF POINT IS A POINTER, GO TO 69
        I2=IAND(IPSL(IT),M2000)
        IF(I2)69,71,69
69      IT=IAND(IPSL(IT),MOFFF)
        GO TO 70
```

FIG. 18G

```
71      CONTINUE
C               PUT FIX BIT IN Y HALF POINT.
        IPSL(IT)=IOR(IPSL(IT),M1COO)
C
C
C               FIX ALL X HALF POINTS.
C
        CALL FIXPR(IHDI,IHDIP,IHDAP,3)
C
C               FIX ALL Y HALF POINTS.
C
        CALL FIXPR(IVDI,IVDIP,IVDAP,4)
C
C               FIX ALL CIRCLE SURFACE POINTS
        CALL FIXCR(ICDI,ICDAP)
C
C               RESTORE DIM INDEX POINTERS
        IVDAP=IVDPS
        IHDAP=IHDPS
C
C               ANY CIRCLE DIM PACKS TO UPDATE
    60  IF (ICDAP) 86,86,84
    84  CALL FXLDR(ICDI,ICDAP)
    86  CONTINUE
C       RESTORE IGRAV
        IGRAV=IGRAS
    66  RETURN
C
        END
```

FIG. 19A

SRCH 1

```
// ASM SRCH1

*ONE WORD INTEGERS
*COMMON ICHAR(172),ITWOI,ITWD(1000),IOUT(1011)
*COMMON KPCF(100),KPCN(12),KPCA(100),IAPCF,IAPCN,IAPCA,IPCC,IDOCX
*COMMON IDOCY,LMSGA,LIOUT,IDOX,IDOY
*COMMON IFX1,NX1,IAX1,IFY1,NY1,IAY1,IFX2,NX2,IAX2,IFY2,NY2,IAY2
*COMMON IFDLX,NDELX,IADLX,IFDLY,NDELY,IADLY,NFX,NNX,NAX,NFY,NNY,NAY
*COMMON IFUNC,NUMRL,IALPH,KBX1,KBX2,KBY1,KBY2,ITBX,ITBY,KBRX1,KBRY1
*COMMON IFUNC,NUMRL,IALPH,KBX1,KBX2,KBY1,KBY2,ITBX,ITBY,KBRX1,KBRY1
*COMMON KBRX2,KBRY2,KBREG,IDOC,        IUNUK,              LPKX,LPKY
*COMMON IOPTR,IOPT1,IBUZC,MKDOC,KBTLT,KBWTH,KBHGT,IDSPL,IRES,KBNUM
*COMMON ITDCX,ITDCY,ISLPT,LCVID,IRTOP,LTOP,IVBMN,IVBMX
*COMMON IBF,IVT,IVL,IVB(550),ICD(320),IDD(498),IA,IC,IX,IY
*COMMON ISYMA(320),ISYMV(1000),IDKP,ISTRT,ISTOP,IERSW,ICLAS,ISC
*COMMON SC,IERR,LCCKC(45,2),KK(25,3),NCHAR,NFUN,ICMSG(23,10)
*COMMON KCCK(25),NXMEN,IPSL(1011),IOVD,IGRAV,ILYCU,NAXCC
*COMMON INOXK,KLTY1,KLTY2,KLTY3,KLTY4,KLTY5
*COMMON LPSF1,LPSF2,LPSF3,LPSF4,LPSF5,LPSF6
*COMMON LSA(11)
                      1    *                        WATCH CODES 0444 AND 0447 MECDW
                      2    *  SEARCH FOR CLASS OF INFO AND COORD OF DELETE.
0000   22643231       3           ENT     SRCH1
0000 0 0000           4    SRCH1 DC      *-*
E631                  5    DELTA EQU     IGRAV
                      6    *                        SETUP BASE ADDR OF PSL
0001 01 6F00005F      7           STX    L3  SVX3+1
0003 01 6E000061      8           STX    L2  SVX2+1
0005 01 6D000063      9           STX    L1  SVX1+1
0007 01 C40000BF     10           LD     L   AIOU1
0009 03 9400F66F     11           S      L   IOPTR
000B 01 D40C0034     12           STO    L   PSLA+1
000D 01 D400009D     13           STO    L   PSLA1+1
000F 01 D400008A     14           STO    L   CMPX+1
0011 01 C40000E5     15           LD     L   C0
0013 03 D400F66E     16           STO    L   IOPT1
0015 03 6580F66F     17           LDX    I1  IOPTR
                     18    *                        GET MAX+MIN X,Y OF SQ
                     19    *                        SEARCH AREA AROUND IMPACT
0017 03 C400F69F     20           LD     L   IDOCX
0019 01 E40C00C1     21           AND    L   M3FF
001B 03 8400E631     22           A      L   DELTA
001D 01 D40000BA     23           STO    L   XMAX
001F 03 9400E631     24           S      L   DELTA
0021 03 9400E631     25           S      L   DELTA
0023 01 D40000BB     26           STO    L   XMIN
0025 03 C400F69E     27           LD     L   IDOCY
0027 01 E40000C1     28           AND    L   M3FF
0029 03 8400E631     29           A      L   DELTA
002B 01 D40000BC     30           STO    L   YMAX
002D 03 9400E631     31           S      L   DELTA
002F 03 9400E631     32           S      L   DELTA
0031 01 D40C00BD     33           STO    L   YMIN
                     34    *                         INDIC=0=NO MATCH (YET)
                     35    *  LOOK FOR REQUIRED COORDINATE
                     36    *                         IS FIRST WD IN PSL VECTOR
                     37    *                         YES=ASSUME CLASS IS CORREC
                     38    *                         SET IOPT1 TO SEARCH PLACE
                     39    *                         FOUND VECTOR SET IOPT1 IT
```

FIG. 19B

```
                        40  *                        TEST FOR GROUP OF 04 CODES
0033 00 C5000000        41  PSLA  LD   L1  *-*       POINTING TO ACC
0035 01 D40000BE        42        STO  L   TEMP
0037 01 E40000C0        43        AND  L   M4000
0039 01 4C200082        44        BSC  L   CKCLS,Z   FOUND COORD. GO CK CLASS SW
003B 01 C40000C2        45        LD   L   NGRPS
003D 01 4C180040       .46        BZ       *+1       BR=NO SPECIAL GROUPS
003F 0  7026            47        B        SPGRP     CHECK SPECIAL GROUPS
0040 01 C40000BE        48  G     LD   L   TEMP
0042 03 B400EBD2        49        CMP  L   ICLAS     COMPARE CLASS
0044 0  7004            50        MDX      B
0045 0  7003            51        MDX      B
0046 03 6D00F66E        52  F     STX  L1  IOPT1     SAVE POINTER TO CLESS
0048 0  700F            53        MDX      S1
0049 01 840000E6        54  B     CMP  L   FUSE      IS IT FUSE OR CB...
004B 0  7007            55        MDX      D
004C 0  7001            56        MDX      C         NO
004D 0  700A            57        MDX      S1        YES
004E 01 C40000E5        58  C     LD   L   CO        CLEAR CLASS SW TO ZERO
0050 03 D400F66E        59        STO  L   IOPT1
0052 0  7005            60        MDX      S1
0053 01 840000E7        61  D     CMP  L   CB
0055 0  70F8            62        MDX      C         NO
0056 0  7001            63        MDX      S1        YES
0057 0  7000            64        MDX      S1        YES
0058 0  71FF            65  S1    MDX   1  -1
0059 0  70D9            66        MDX      PSLA
005A 01 C40000E5        67  S2    LD   L   CO
005C 03 D4C0F66E        68        STO  L   IOPT1
005E 00 67000000        69  SVX3  LDX  L3  *-*
0060 00 66000000        70  SVX2  LDX  L2  *-*
0062 00 65000000        71  SVX1  LDX  L1  *-*
0064 01 4C800000        72        BSC  I   SRCH1
0066 01 678000C2        73  SPGRP LDX  I3  NGRPS
0068 03 C400EBD2        74        LD   L   ICLAS
006A 01 B70000C3        75  SG1   CMP  L3  GCODE
006C 0  7002            76        B        *+2
006D 0  7001            77        B        *+1
006E 0  7003            78        B        SG2       FOUND SPECIAL GROUP CODE
006F 0  73FF            79        MDX   3  -1
0070 0  70F9            80        B        SG1
                        81  *  NOT SPECIAL GROUP CODE
0071 0  70CE            82        B        G
                        83  * CHECK TO SEE IF THE FUNCTION CODE IN PSL IS EQUAL
                        84  * TO ONE OF THE F-CODES IN THIS SPECIAL GROUP
0072 01 C70000C7        85  SG2   LD   L3  GPADR     GET L.O. ADDR OF GROUP
0074 0  D001            86        STO      *+1
0075 00 66800000        87        LDX  I2  *-*       NO. OF GROUPS IN XR2
0077 0  DC03            88        STO      SG3+1
0078 01 C40000BE        89        LD   L   TEMP      PSL ENTRY TO ACC
007A 00 B6000000        90  SG3   CMP  L2  *-*       COMPARE WITH GROUP CODE
007C 0  7002            91        B        *+2
007D 0  7001            92        B        *+1
007E 0  70C7            93        B        F         FOUND MATCH IN PSL
007F 0  72FF            94        MDX   2  -1
0080 0  70F9            95        B        SG3
                        96  * NO MATCH FOUND FOR THIS PSL ENTRY
```

FIG. 19C

```
0081 0  70C7         97              B         B
                     98       *  GO TO CMPX IF IN PROPER CLASS
0082 03 C400F66E     99       CKCLS LD    L   IOPT1
0084 01 4C200089    100             BSC   L   CMPX,Z
0086 0  71FF        101             MDX   1   -1
0087 0  7000        102             MDX       S1
0088 0  7001        103             MDX       S2
                    104       *  COMPARE X COORDINATE
0089 00 C5000000    105       CMPX  LD    L1  *-*
008B 01 E40000C1    106             AND   L   M3FF
008D 01 B40000BA    107             CMP   L   XMAX
008F 0  7002        108             MDX       NEG
0090 0  7004        109             MDX       LFT
0091 0  7007        110             MDX       CMPY        FOUND X WITHIN RANGE
0092 0  71FF        111       NEG   MDX   1   -1
0093 0  70C4        112             MDX       S1
0094 0  70C5        113             MDX       S2
0095 01 B40C00BB    114       LFT   CMP   L   XMIN
0097 0  7001        115             MDX       CMPY
0098 0  70F9        116             MDX       NEG
                    117       *  COMPARE Y COORDINATE
0099 0  71FF        118       CMPY  MDX   1   -1
009A 0  7001        119             MDX       *+1
009B 0  70BE        120             MDX       S2
009C 00 C50C0000    121       PSLA1 LD    L1  *-*
009E 01 E40000C1    122             AND   L   M3FF
00A0 01 B40000BC    123             CMP   L   YMAX
00A2 0  70B5        124             MDX       S1
00A3 0  7001        125             MDX       TOP
00A4 0  7004        126             MDX       FNDXY       X AND Y WITHIN RANGE
00A5 01 B40000BD    127       TOP   CMP   L   YMIN
00A7 0  7001        128             MDX       *+1
00A8 0  70AF        129             MDX       S1
                    130       *  FOUND COORD WITHIN RANGE
00A9 03 C400F66F    131       FNDXY LD    L   IOPTR
00AB 03 94C0F66E    132             S     L   IOPT1
00AD 01 840000E4    133             A     L   C1
00AF 03 D400F66E    134             STO   L   IOPT1
00B1 01 600000BE    135             STX   L1  TEMP
00B3 03 C400F66F    136             LD    L   IOPTR
00B5 01 940000BE    137             S     L   TEMP
00B7 03 D400EBD2    138             STO   L   ICLAS
00B9 0  70A4        139             MDX       SVX3
00BA 0  C000        140       XMAX  DC        0
00BB 0  0000        141       XMIN  DC        0
00BC 0  0000        142       YMAX  DC        0
00BD 0  0000        143       YMIN  DC        0
00BE 0  0000        144       TEMP  DC        0
00BF 3  FB6A        145       AIOU1 DC        IOUT
00C0 0  4000        146       M4000 DC        /4000
00C1 0  03FF        147       M3FF  DC        /03FF
                    148       * NUMBER OF SPECIAL GROUPS (NGRPS) MUST=0=IF
                    149       * NO SPEC. GPS.
00C2 0  0003        150       NGRPS DC        3
                    151       * TABLE OF GROUP CODES MUST BE NGPS ENTRIES
00C3 0  0000        152       GCODE DC        0
00C4 0  040F        153             DC        /040F
```

FIG. 19D

```
00C5 0  04F1      154         DC      /04F1
00C6 0  04F2      155         DC      /04F2
                  156    *  TABLE OF GROUP ADDRESSES MUST BE SAME NUM AND
                  157    *  ORDER
00C7 0  0000      158   GPADR DC      0
00C8 1  00CB      159         DC      A040F
00C9 1  00D2      160         DC      A04F1
00CA 1  00DA      161         DC      A04F2
                  162    *  TABLES OF FUNCTION CODES FOR SPECIAL GROUPS. THE
                  163    *  FIRST WORD OF EACH SPECIAL GROUP MUST SPECIFY
                  164    *  THE NUMBER OF ENTRIES IN THE GROUP. NOTE........
                  165    *  FOR FASTEST EXECUTION SPEED PUT MOST FREQ USED
                  166    *  CODES AT BOT OF EACH OF FOLLOWING TABLES
00CB 0  0006      167   A040F DC      6
00CC 0  04E2      168         DC      /04E2
00CD 0  04E3      169         DC      /04E3
00CE 0  04E4      170         DC      /04E4
00CF 0  04E5      171         DC      /04E5
00D0 0  04E1      172         DC      /04E1
00D1 0  04E9      173         DC      /04E9
00D2 0  0007      174   A04F1 DC      7
00D3 0  04E1      175         DC      /04E1
0CD4 0  04E2      176         DC      /04E2
00D5 0  04E3      177         DC      /04E3
00D6 0  04E4      178         DC      /04E4
00D7 0  04E5      179         DC      /04E5
00D8 0  04C0      180         DC      /04C0
00D9 0  04E9      181         DC      /04E9
00DA 0  0006      182   A04F2 DC      6
00DB 0  04E2      183         DC      /04E2
00CC 0  04E3      184         DC      /04E3
00DD 0  04E4      185         DC      /04E4
00DE 0  04E5      186         DC      /04E5
00DF 0  04C0      187         DC      /04C0
00E0 0  04E9      188         DC      /04E9
00E1 0  0004      189   C4    DC      4
00E2 0  0008      190   C8    DC      8
00E3 0  8000      191   M8000 DC      /8000
00E4 0  0001      192   C1    DC      1
00E5 0  0000      193   C0    DC      0
00E6 0  0444      194   FUSE  DC      /0444
00E7 0  0447      195   CB    DC      /0447
00E8              196         END
```

FIG. 20A

`// FOR F`

F

```
C           THIS ROUTINE PUTS A 1 IN BIT 3 OF EACH DIM PACK HALF
C           POINT (P1 OR P2) WHICH IS ASSOCIATED WITH THE HALF
C           POINT JUST FIXED IN THE NEW PSL(IPSL), AND
C           ACTIVATES THE INDEX ENTRY ASSOCIATED WITH THE DIM PACK
C           THUS MARKED.
      SUBROUTINE F(IVDI,IVDIP,ISTR,N)
      DIMENSION IVDI(50)
      DIMENSION IVDI(50)
      COMMON /INSKEL/IPTX(4),IPTY(4),IORSW,IPTIX,IBUZS
      COMMON ICHAR(172),ITWDI,ITWD(1000),IOUT(1011)
      COMMON KPCF(100),KPCN(12),KPCA(100),IAPCF,IAPCN,IAPCA,IPCC,IDOCX
      COMMON IDOCY,LMSGA,LIOUT,IDOX,IDOY
      COMMON IFX1,NX1,IAX1,IFY1,NY1,IAY1,IFX2,NX2,IAX2,IFY2,NY2,IAY2
      COMMON IFDLX,NDELX,IADLX,IFDLY,NDELY,IADLY,NFX,NNX,NAX,NFY,NNY,NAY
      COMMON IFUNC,NUMRL,IALPH,KBX1,KBX2,KBY1,KBY2,ITBX,ITBY,KBRX1,KBRY1
      COMMON KBRX2,KBRY2,KBREG,IDOC,         IUNUK,         LPKX,LPKY
      COMMON IOPTR,IOPT1,IBUZC,MKDOC,KBTLT,KBWTH,KBHGT,IDSPL,IRES,KBNUM
      COMMON ITDCX,ITDCY,ISLPT,LCVID,IRTOP,LTOP,IVBMN,IVBMX,IVBND(1375)
      COMMON ISYMA(320),ISYMV(1000),IDKP,ISTRT,ISTOP,IERSW,ICLAS,ISC
      COMMON SC,IERR,LCCKC(45,2),KK(25,3),NCHAR,NFUN,ICMSG(23,10)
      COMMON KCCK(25),NXMEN,IPSL(1011)
      DATA MOFFF/ZOFFF/
      DATA M2000/Z2000/
      CALL DATSW(15,K15)
      GO TO (100,102),K15
100   WRITE(6,101)
101   FORMAT(' ENTER F')
102   CONTINUE
      K=N
      L=N+2
      I=IVDIP
9     IF(I)10,10,11
C           GO TO 10 IF NO DIMS IN INDEX.
10    RETURN
C           IVDI(I) IS PTR TO FUNCTION CODE IN DIM PACK.
C           I2 IS PTR TO X OR Y VALUE IN PSL(FROM DIM PACK P1)
C           ISTR IS PTR TO X OR Y VALUE JUST FIXED IN PSL.
C           N IS 3 IF X, 4 IF Y DIMENSION.
11    I2=IVDI(I)+K
17    I2=IAND(IPSL(I2),MOFFF)
17    I2=IAND(IPSL(I2),MOFFF)
      IT=IAND(IPSL(I2),M2000)
      IF (IT) 18,18,17
18    IF(ISTR-I2)12,14,12
C           GO TO 12 IF 1ST END OF DIM NOT ASSOCIATED WITH HALF
C           POINT JUST FIXED.
12    I2=IVDI(I)+L
19    I2=IAND(IPSL(I2),MOFFF)
      IT=IAND(IPSL(I2),M2000)
      IF (IT) 16,16,19
16    IF(ISTR-I2)13,15,13
C           GO TO 13 IF 2ND END OF DIM NOT ASSOCIATED WITH   HALF
C           POINT JUST FIXED.
13    I=I-1
      GO TO 9
```

FIG. 20B

```
C             FIRST END OF DIM ASSOC WITH FIXED POINT.
C             SET BIT 3 OF INDEX WORD TO 1
14    IT2=IOR(IVDI(I),M2000)
      IVDI(I)=IT2
C             INTERCHANGE THIS INDEX WORD WITH LAST ACTIVE WD IN INDEX
15    IT=IVDI(I)
      J=IVDIP
      IVDI(I)=IVDI(J)
      IVDI(J)=IT
      IVDIP=IVDIP-1
      GO TO 13
      END
```

FIG. 21A

FIXPR

// FOR FIXPR

```
          SUBROUTINE FIXPR(IVDI,IVDIP,IVCAP,N)
          DIMENSION IVDI(50)
          COMMON /INSKEL/IPTX(4),IPTY(4),IORSW,IPTIX,IBUZS
          COMMON ICHAR(172),ITWDI,ITWD(1000),IOUT(1011)
          COMMON KPCF(100),KPCN(12),KPCA(100),IAPCF,IAPCN,IAPCA,IPCC,IDOCX
          COMMON IDOCY,LMSGA,LIOUT,IDOX,IDOY
          COMMON IFX1,NX1,IAX1,IFY1,NY1,IAY1,IFX2,NX2,IAX2,IFY2,NY2,IAY2
          COMMON IFDLX,NDELX,IADLX,IFDLY,NDELY,IADLY,NFX,NNX,NAX,NFY,NNY,NAY
          COMMON IFUNC,NUMRL,IALPH,KBX1,KBX2,KBY1,KBY2,ITBX,ITBY,KBRX1,KBRY1
          COMMON KBRX2,KBRY2,KBREG,IDOC,          IUNUK,          LPKX,LPKY
          COMMON IOPTR,IOPT1,IBUZC,MKDOC,KBTLT,KBWTH,KBHGT,IDSPL,IRES,KBNUM
          COMMON ITDCX,ITDCY,ISLPT,LCVID,IRTOP,LTOP,IVBMN,IVBMX
          COMMON ITDCX,ITDCY,ISLPT,LCVID,IRTOP,LTOP,IVBMN,IVBMX
          COMMON IVB(880),IBF,IVT,IVL,        INX(320),ILO(168),IA,IC,IX,IY
          COMMON ISYMA(320),ISYMV(1000),IDKP,ISTRT,ISTOP,IERSW,ICLAS,ISC
          COMMON SC,IERR,LCCKC(45,2),KK(25,3),NCHAR,NFUN,ICMSG(23,10)
          COMMON KCCK(25),NXMEN,IPSL(1011),IOVD,IGRAV,ILYCU,NAXCC
          COMMON        INOXK,KLTY1,KLTY2,KLTY3,KLTY4,KLTY5
          COMMON              LPSF1,LPSF2,LPSF3,LPSF4,LPSF5,LPSF6
          COMMON LSA(11)
          DATA MASK1,MASK2,MASKP/Z1000,Z2000,ZOFFF/
          DATA M5000/Z5000/
          CALL DATSW(15,K15)
          GO TO (100,102),K15
100       WRITE(6,101)
101       FORMAT('ENTER FIXPR')
102       CONTINUE
C         TEST FOR IVDAP =0, NO ENTRIES
2         IF (IVDAP) 4,4,6
4         RETURN
C         IS ACTIVE DIM EMPTY
6         IF(IVDAP-IVDIP) 4,4,8
C         WHICH IPSL DIM POINTED TO
8         I2=IAND(IVDI(IVDAP),MASKP)
C         FIND POS IN IPSL DIM TO LOOK
C         PTR TO FIRST ENTRY X OR Y REL TO DIM PACK IN IPSL
          J=I2+N
C         PTR TO SECOND ENTRY X OR Y REL TO DIM PACK IN IPSL
          K=J+2
          ITJ=IAND(IOUT(J),MASKP)
          ITK=IAND(IOUT(K),MASKP)
C         WHICH END OF LINE NOT FIXED, 1ST OR 2ND
          I1=IAND(IVDI(IVDAP),MASK2)
          IF(I1) 12,12,30
C                 GO TO 12 IF 1ST END IS UNFIXED.
12        CONTINUE
C
C                P1 IS THE UNFIXED END OF THE DIMENSION.
C                CHASE THE POINTER TO THE DOCUMENT PT FOR P1.
C                IT IS A PTR TO P1
          IT=IAND(IPSL(J),MASKP)
          IADR1=IT
          IRTN=3
          GO TO 44
56        ISPD1=IT
```

FIG. 21B

```
C                 GO TO 40 IF P1 IS FIXED.
          IT2=IAND(IPSL(IT),MASK1)
          IF(IT2)40,57,40
57        CONTINUE
C                 GET DIMENSION VALUE
          IDVAL=IOUT(I2+9)/20
C                 SEE WHICH END OF DIM SPAN IS GREATER.
C                 J IS PTR TO P1.
C                 K IS PTR TO P2
          IF(ITJ-ITK)58,58,59
C                 GO TO 59 IF P1 IS GREATER.
58        IDVAL=-IDVAL
59        CONTINUE
C                 CHASE PTR TO P2 DOC POINT.
C                 IT IS PTR TO P2
          IT=IAND(IPSL(K),MASKP)
          IRTN=4
          GO TO 44
60        IP2VL=IAND(IPSL(IT),MASKP)
          IP1VL=IP2VL+IDVAL
C                 IP1VL IS P1 VALUE
C                 IP2VL IS P2 VALUE.
C                 SAVE P1 VALUE
          IPSL(ISPD1)=IOR(IP1VL,M5000)
          ISTR=ISPD1
20        CALL F(IVDI,IVDIP,ISTR,N)
C         DELETE ACTIVE FROM LIST
22        IVDAP= IVDAP-1
          GO TO 6
30        CONTINUE
C
C                 P2 IS THE UNFIXED END OF THE DIMENSION.
C                 CHASE THE POINTER TO THE DOC PT FOR P2.
C                 IT IS PTR TO P2
          IT=IAND(IPSL(K),MASKP)
          IADR2=IT
          IRTN=1
44        IT2=IAND(IPSL(IT),MASK2)
          IF(IT2)43,45,43
C                 CHASE POINTER.
43        IT=IAND(IPSL(IT),MASKP)
          GO TO 44
45        GO TO (46,50,56,60),IRTN
46        ISPD2=IT
C                 GO TO 40 IF P2 IS FIXED.
          IT2=IAND(IPSL(IT),MASK1)
          IF(IT2)40,47,40
47        CONTINUE
C                 GET DIM VALUE.
          IDVAL=IOUT(I2+9)/20
C                 SEE WHICH END OF DIM SPAN IS GREATER.
C                 J IS PTR TO P1
C                 K IS PTR TO P2
          IF(ITK-ITJ)48,48,49
C                 GO TO 49 IF P2 IS GREATER.
48        IDVAL=-IDVAL
```

FIG. 21C

```
49      CONTINUE
C              CHASE PTR TO P1 DOC POINT.
C              IT IS PTR TO P1
        IT=IAND(IPSL(J),MASKP)
        IRTN=2
        GO TO 44
C              IP1VL IS P1 VALUE.
C              IP2VL IS P2 VALUE.
    50  IP1VL=IAND(IPSL(IT),MASKP)
        IP2VL=IP1VL+IDVAL
C              SAVE P2 VALUE.
        IPSL(ISPD2)=IOR(IP2VL,M5000)
        ISTR=ISPD2
        GO TO 20
    40  WRITE(2,42)
    42  FORMAT('OVER DIMENSIONED')
        IOVD=1
C       DELETE ACTIVE FROM LIST
        GO TO 22
        END
```

FIG. 22A

FIXCR

```
// FOR FIXCR

SUBROUTINE FIXCR(ICDI,ICDAP)
      DIMENSION ICDI(50)
      COMMON /INSKEL/IPTX(4),IPTY(4),IORSW,IPTIX,IBUZS
      COMMON ICHAR(172),ITWDI,ITWD(1000),IOUT(1011)
      COMMON KPCF(100),KPCN(12),KPCA(100),IAPCF,IAPCN,IAPCA,IPCC,IDOCX
      COMMON IDOCY,LMSGA,LIOUT,IDOX,IDOY
      COMMON IFX1,NX1,IAX1,IFY1,NY1,IAY1,IFX2,NX2,IAX2,IFY2,NY2,IAY2
      COMMON IFDLX,NDELX,IADLX,IFDLY,NDELY,IADLY,NFX,NNX,NAX,NFY,NNY,NAY
      COMMON IFUNC,NUMRL,IALPH,KBX1,KBX2,KBY1,KBY2,ITBX,ITBY,KBRX1,KBRY1
      COMMON KBRX2,KBRY2,KBREG,IDOC,      IUNUK,            LPKX,LPKY
      COMMON IOPTR,IOPTI,IBUZC,MKDOC,KBTLT,KBWTH,KBHGT,IDSPL,IRES,KBNUM
      COMMON ITDCX,ITDCY,ISLPT,LCVID,IRTOP,LTOP,IVBMN,IVBMX
      COMMON IVB(880),IBF,IVT,IVL,        INX(320),ILO(168),IA,IC,IX,IY
      COMMON ISYMA(320),ISYMV(1000),IDKP,ISTRT,ISTOP,IERSW,ICLAS,ISC
      COMMON SC,IERR,LCCKC(45,2),KK(25,3),NCHAR,NFUN,ICMSG(23,10)
      COMMON KCCK(25),NXMEN,IPSL(1011),IOVD,IGRAV,ILYCU,NAXCC
      COMMON        INOXK,KLTY1,KLTY2,KLTY3,KLTY4,KLTY5
      COMMON             LPSF1,LPSF2,LPSF3,LPSF4,LPSF5,LPSF6
      COMMON LSA(11)
      DATA MOFFF/ZOFFF/
      DATA M5000/Z5000/
  100 WRITE(6,101)
  101 FORMAT('ENTER FIXCR')
C     HAS CIR DIM PAC BEEN ACTIVE
      IF(ICDAP)4,4,130
    4 RETURN
C     FIND POINTER AT ICDI(ICDAP), THEN SET I=THAT POINTER
  130 ICDAS=ICDAP
  102 I=ICDI(ICDAP)
C     SET ICCAP=ICDAP-1
  103 ICDAP=ICDAP-1
C     FIND RADIUS AT I+1
  104 IRA=IAND(IPSL(I+1),MOFFF)
      IR=IRA/20
C     CHASE POINTER TO OBTAIN CY1 VALUE AT THE CIR DIM PAC
C     CHASE POINTER TO OBTAIN CY1 VALUE AT THE CIR DIM PAC
  105 IPTR=IPSL(I+4)
      IOUTA=IADDR(IPSL(1))
      CALL CHPTR(IPTR,IOUTA)
C     STORE SY1 AT LOCATION POINTED TO BY I+6
  106 NPTR=IAND(IPSL(I+6),MOFFF)
      IPSL(NPTR)=IOR((IPTR+IR),M5000)
C     GET NO. OF CIRCLES IN THIS PAC
      J=ISLA(IPSL(I+2),4)
      NCIR=ISRA(J,10)
C     UPDATE I=I+11+= OF CHARACTERS
  108 L=ISLA(IPSL(I+2),10)
      NCHAR=ISRA(L,10)
      I=I+11+NCHAR
C     ARE ALL CIRCLES IN THIS PAC COMPLETED
C     REDUCE CIRCLE COUNT BY 1
  109 NCIR=NCIR-1
      IF(NCIR)230,230,110
C     CHASE POINTER AT I+1
```

FIG. 22B

```
    110 IPTR=IPSL(I+1)
        CALL CHPTR(IPTR,IOUTA)
C       SET NEXT SURFACE PT = NEXT CTR PT + RADIUS
    111 NPTR=IAND(IPSL(I+3),MOFFF)
        IPSL(NPTR)=IOR((IPTR+IR),M5000)
C       SET NEW REFERENCE I AT I+4
    112 I=I+4
        GO TO 109
C       IS IVDI EMPTY
    230 IF(ICDAP)120,120,102
C       SET ISTRT=I
    120 ISTRT=I
        ICDAP=ICDAS
    121 RETURN
        END
```

FIG. 23A
CHPTR

```
// ASM CHPTR

*ONE WORD INTEGERS
*COMMON ICHAR(172),ITWDI,ITWD(1000),IOUT(1011)
*COMMON KPCF(100),KPCN(12),KPCA(100),IAPCF,IAPCN,IAPCA,IPCC,IDOCX
*COMMON IDOCY,LMSGA,LIOUT,IDOX,IDOY
*COMMON IFX1,NX1,IAX1,IFY1,NY1,IAY1,IFX2,NX2,IAX2,IFY2,NY2,IAY2
*COMMON IFDLX,NDELX,IADLX,IFDLY,NDELY,IADLY,NFX,NNX,NAX,NFY,NNY,NAY
*COMMON IFUNC,NUMRL,IALPH,KBX1,KBX2,KBY1,KBY2,ITBX,ITBY,KBRX1,KBRY1
*COMMON IFUNC,NUMRL,IALPH,KBX1,KBX2,KBY1,KBY2,ITBX,ITBY,KBRX1,KBRY1
*COMMON KBRX2,KBRY2,KBREG,IDOC,IUNUK,LPKX,LPKY
*COMMON IOPTR,IOPT1,IBUZC,MKDOC,KBTLT,KBWTH,KBHGT,IDSPL,IRES,KBNUM
*COMMON ITDCX,ITDCY,ISLPT,LCVID,IRTCP,LTOP,IVBMN,IVBMX,IVBND(1375)
*COMMON ISYMA(320),ISYMV(1000),IDKP,ISTRT,ISTOP,IERSW,ICLAS,ISC
*COMMON SC,IERR,LCCKC(45,2),KK(25,3),NCHAR,NFUN,ICMSG(23,10)
*COMMON KCCK(25),NXMEN
0000   03217809    1            ENT     CHPTR
0000 0 0000        2     CHPTR  DC      *-*    ADDR OF WRD X OR Y
0001 01 6E000042   3            STX     L2 SAVE2+1
0003 01 6F000044   4            STX     L3 SAVE3+1   SAVE XR3
0005 01 66800000   5            LDX     I2 CHPTR
0007 00 C6800001   6            LD      I2 1
0009 01 D400003B   7            STO     L  IOUTA
000B 0  C0F4       8            LD         CHPTR
000C 0  D033       9            STO        GOBCK+1  ADDR OF ARG
000D 00 C6800000  10            LD      I2 0   CONTENTS = X OR Y
000F 0  E027      11            AND        MSKDP  DOC PT MSK  /4000
0010 01 4C18003E  12            BZ         LDZRO  NOT DOC PT
0012 00 C6800000  13            LD      I2 0   CONTENTS = X OR Y
0014 0  E023      14            AND        MSPTR  PTR MASK /2000
0015 01 4C180031  15            BZ         LDAT   NOT PTR, IS DATA
0017 00 C6800000  16            LD      I2 0   CONTENTS = X OR Y
0019 0  E01F      17     FNDDP  AND        MSENT  STRIP DP AND PRT BITS
001A 0  D021      18            STO        RELIO
001B 01 C400003B  19            LD      L  IOUTA
001D 0  901E      20            S          RELIO
001E 01 84000035  21            A       L  ONE
0020 0  D01C      22            STO        PTADR  ADDR PTD TO
0021 01 C480003D  23            LD      I  PTADR  CONTENTS PTD TO
0023 0  E013      24            AND        MSKDP
0024 01 4C18003E  25            BZ         LDZRO  NOT DP
0026 01 C480003D  26            LD      I  PTADR
0028 0  E00F      27            AND        MSPTR
0029 01 4C18002E  28            BZ         LDSTP  NOT PTR LD AND STRIP
002B 01 C480003D  29            LD      I  PTADR
002D 0  70EB      30            B          FNDDP  IS PTR LOOK AGAIN
002E 01 C480003D  31     LDSTP  LD      I  PTADR  DATA PTD TO
0030 0  7002      32            B          STPBT
0031 00 C6800000  33     LDAT   LD      I2 0   CONTENTS = X OR Y
0033 0  E005      34     STPBT  AND        MSENT  REMOVE CONTROL BITS
0034 0  700A      35            B          GOBCK
0035 0  C001      36     ONE    DC      1
0036 0  1000      37     FXBIT  DC      /1000  MASK FOR BIT POS 3
0037 0  4000      38     MSKDP  DC      /4000  DP MASK
0038 0  2000      39     MSPTR  DC      /2000  PTR MASK
0039 0  0FFF      40     MSENT  DC      /0FFF
003A 0  0000      41     ZERO   DC      0
003B 0  0000      42     IOUTA  DC      *-*    ADDR OF TABLE
003C 0  0000      43     RELIO  DC      *-*    ADDR REL TO IOUT
```

FIG. 23B

```
003D  0   0000         44    PTADR  DC          *-*    ADDR PTD TO IN IOUT
003E  0   C0F8         45    LDZRO  LD          ZERO
003F  00  04800000     46    GOBCK  STO    I    *-*    PUT O,X,Y IN PTR
0041  00  66000000     47    SAVE2  LDX    L2   *-*
0043  00  67000000     48    SAVE3  LDX    L3   *-*
0045  01  7402000C     49           MDX    L    CHPTR,2
0047  01  4C800000     50           BSC    I    CHPTR
004A                   51           END
```

FIG. 24A

FXLDR

```
// FOR FXLDR

SUBROUTINE FXLDR(ICDI,ICDAP)
      DIMENSION ICDI(50)
      COMMON /INSKEL/IPTX(4),IPTY(4),IORSW,IPTIX,IBUZS
      COMMON ICHAR(172),ITWDI,ITWD(1000),IOUT(1011)
      COMMON KPCF(100),KPCN(12),KPCA(100),IAPCF,IAPCN,IAPCA,IPCC,IDOCX
      COMMON IDOCY,LMSGA,LIOUT,IDOX,IDOY
      COMMON IFX1,NX1,IAX1,IFY1,NY1,IAY1,IFX2,NX2,IAX2,IFY2,NY2,IAY2
      COMMON IFDLX,NDELX,IADLX,IFDLY,NDELY,IADLY,NFX,NNX,NAX,NFY,NNY,NAY
      COMMON IFUNC,NUMRL,IALPH,KBX1,KBX2,KBY1,KBY2,ITBX,ITBY,KBRX1,KBRY1
      COMMON KBRX2,KBRY2,KBREG,IDOC,         IUNUK,         LPKX,LPKY
      COMMON IOPTR,IOPT1,IBUZC,MKDOC,KBTLT,KBWTH,KBHGT,IDSPL,IRES,KBNUM
      COMMON ITDCX,ITDCY,ISLPT,LCVID,IRTOP,LTOP,IVBMN,IVBMX,IVBND(1375)
      COMMON ISYMA(320),ISYMV(1000),IDKP,ISTRT,ISTOP,IERSW,ICLAS,ISC
      COMMON SC,IERR,LCCKC(45,2),KK(25,3),NCHAR,NFUN,ICMSG(23,10)
      COMMON KCCK(25),NXMEN,IPSL(1011),IOVD,IGRAV,ILYCU,NAXCC
      COMMON         INOXK,KLTY1,KLTY2,KLTY3,KLTY4,KLTY5
      COMMON                LPSF1,LPSF2,LPSF3,LPSF4,LPSF5,LPSF6
      COMMON LSA(11)
      DATA M4000/Z4000/
      CALL DATSW(15,K15)
      GO TO (2,3),K15
    2 WRITE(6,4)
    4 FORMAT('ENTERED FXLDR')
    3 CONTINUE
C     TEST FOR ANY CIRCLE DIM PACKS
      IF(ICDAP) 160,160,50
   50 CONTINUE
C     SAVE ICDAP
      ICDAS=ICDAP
C
C     FIND PTR IN ICDI, SET I= TO THAT VALUE
  100 I=ICDI(ICDAP)
C     REDUCE ICDAP BY 1
      ICDAP=ICDAP-1
C     UPDATE P3, P4 INFO INTO IPSL
C     SET KDELX=P3X-C1X
      KDELX=IOUT(I+7)-IOUT(I+3)
C     SET KDELY = P3Y-C1Y
C     SET KDELY = P3Y-C1Y
      KDELY=IOUT(I+8)-IOUT(I+4)
C     SET KDELL= P4X-P3X
      KDELL=IOUT(I+9)-IOUT(I+7)
C     CALL CHPTR FOR COORD FROM C1X D PACK
      IPTR=IPSL(I+3)
      IOUTA=IADDR(IPSL(1))
      CALL CHPTR(IPTR,IOUTA)
C     PUT DOC PT BIT INTO RETURN WORD
      KTEMP=IOR(IPTR,M4000)
C     ADD KDELX, STORE AS IPSL P3X
      IPSL(I+7)=KTEMP +KDELX
C     CALL CHPTR FOR COORD FROM C1Y D PACK
      IPTR=IPSL(I+4)
      CALL CHPTR(IPTR,IOUTA)
C     PUT IN DOC PT BIT
```

FIG. 24B

```
        KTEMP=IOR(IPTR,M4000)
C       ADD KDELY, STORE AS IPSL P3Y
        IPSL(I+8)=KTEMP+KDELY
C       P4X= P3X + KDELL
        IPSL(I+9)=IPSL(I+7)+KDELL
C       P4Y= P3Y
        IPSL(I+10)=IPSL(I+8)
C       ARE ALL CIR DIM PACK P3 AND P4 UPDATED
C       IS ICDAP=0
        IF (ICDAP)   150,150,100
C       RESTORE ICDAP AND RETURN
   150  ICDAP=ICDAS
   160  CONTINUE
        RETURN
        END
```

FIG. 25

```
// FOR L                            L

C              THIS SUBROUTINE UPDATES POINTERS IN NEW PSL
      SUBROUTINE L(ISS,IDD)
C
      COMMON /INSKEL/IPTX(4),IPTY(4),IORSW,IPTIX,IBUZS
      COMMON ICHAR(172),ITWDI,ITWD(1000),IOUT(1011)
      COMMON KPCF(100),KPCN(12),KPCA(100),IAPCF,IAPCN,IAPCA,IPCC,IDOCX
      COMMON IDOCY,LMSGA,LIOUT,IDOX,IDOY
      COMMON IFX1,NX1,IAX1,IFY1,NY1,IAY1,IFX2,NX2,IAX2,IFY2,NY2,IAY2
      COMMON IFDLX,NDELX,IADLX,IFDLY,NDELY,IADLY,NFX,NNX,NAX,NFY,NNY,NAY
      COMMON IFUNC,NUMRL,IALPH,KBX1,KBX2,KBY1,KBY2,ITBX,ITBY,KBRX1,KBRY1
      COMMON KBRX2,KBRY2,KBREG,IDOC,         IUNUK,           LPKX,LPKY
      COMMON IOPTR,IOPT1,IBUZC,MKDOC,KBTLT,KBWTH,KBHGT,IDSPL,IRES,KBNUM
      COMMON ITDCX,ITDCY,ISLPT,LCVID,IRTOP,LTOP,IVBMN,IVBMX,IVBND(1375)
      COMMON ISYMA(320),ISYMV(1000),IDKP,ISTRT,ISTOP,IERSW,ICLAS,ISC
      COMMON SC,IERR,LCCKC(45,2),KK(25,3),NCHAR,NFUN,ICMSG(23,10)
      COMMON KCCK(25),NXMEN,IPSL(1011)
C
      DATA IPTRM,IDPM/Z2000,Z6000/
      DATA IPTRM,IDPM/Z2000,Z6000/
      DATA NPTRM/ZOFFF/
      CALL DATSW(15,K15)
      GO TO(100,102),K15
  100 WRITE(6,101)
  101 FORMAT('ENTER L')
  102 CONTINUE
      JSS=ISS
      IF (IPSL(JSS))10,20,10
   10 ITEMP=IAND(IPSL(JSS),IPTRM)
      IF ((ITEMP-IPTRM)20,21,20
   21 JSS=IAND(IPSL(JSS),NPTRM)
      GO TO 10
   20 JDD=IDD
   30 ITEMP=IAND(IPSL(JDD),IPTRM)
      IF ((ITEMP-IPTRM)31,32,31
   32 JDD=IAND(IPSL(JDD),NPTRM)
      GO TO 30
   31 IF (JDD-JSS)33,34,33
33    IPSL(JSS)=IOR(JDD,IDPM)
   34 RETURN
      END
```

FIG. 26A

// FOR CONL                                    CONL

```
C           THIS SUBROUTINE CONSTRUCTS THE LIST OF PROJECTED COORD
      SUBROUTINE CONL(IOSW,ICONS)
C
      COMMON /INSKEL/IPTX(4),IPTY(4),IORSW,IPTIX,IBUZS
      COMMON ICHAR(172),ITWDI,ITWD(1000),IOUT(1011)
      COMMON KPCF(100),KPCN(12),KPCA(100),IAPCF,IAPCN,IAPCA,IPCC,IDOCX
      COMMON IDOCY,LMSGA,LICUT,IDOX,IDOY
      COMMON IFX1,NX1,IAX1,IFY1,NY1,IAY1,IFX2,NX2,IAX2,IFY2,NY2,IAY2
      COMMON IFDLX,NDELX,IADLX,IFCLY,NDELY,IACLY,NFX,NNX,NAX,NFY,NNY,NAY
      COMMON IFUNC,NUMRL,IALPH,KBX1,KBX2,KBY1,KBY2,ITBX,ITBY,KBRX1,KBRY1
      COMMON KBRX2,KBRY2,KBREG,IDOC,        IUNUK,        LPKX,LPKY
      COMMON IOPTR,ICPT1,IBUZC,MKDOC,KBTLT,KBWTH,KBRGT,IDSPL,IRES,KBNUM
      COMMON ITDCX,ITDCY,ISLPT,LCVID,IRTOP,LTOP,IVBMN,IVBMX,IVBND(1375)
      COMMON ISYMA(320),ISYMV(1CCC),ICKP,ISTRT,ISTOP,IERSW,ICLAS,ISC
      COMMON SC,IERR,LCCKC(45,2),KK(25,3),NCHAR,NFUN,ICMSG(23,10)
      COMMON KCCK(25),NXMEN,IFSL(1011)
C
      DATA IPTRM/Z2000/
      DATA ISKLN/Z040F/
      DATA MOFFF/Z0FFF/
      DATA M1000/Z1000/
      DATA MEFFF/ZEFFF/
C           IS THIS SKETCH POINT
      CALL DATSW(15,KL5)
      GO TO(100,102),K15
  100 WRITE(6,101)
  101 FORMAT(' ENTER CONL')
  102 CONTINUE
      GO TO(11,13),IOSW
C           STORE PROJECTED COORDINATES IN NEW PSL
   11 CONTINUE
      IOSW=2
      GO TO 12
C           CHECK TO SEE IF THIS IS A JOIN POINT
   12 CONTINUE
      IF (IOUT(ISTRT))710,21,21
C           GO TO 710 IF THIS IS A JOIN
  710 CONTINUE
C           SEARCH FOR A MATCH ON THIS JOIN POINT
      ICLAS=ISKLN
      IDOCX=IAND(IOUT(ISTRT),MOFFF)
      IDOCY=IAND(IOUT(ISTRT+1),MOFFF)
      IOPTS=IOPTR
      IOPTR=ISTRT-1
      CALL SRCH1
      IOPTR=IOPTS
      IF(IOPT1)713,711,713
  711 WRITE(6,712)
  712 FORMAT('CONL- ERROR. MATCH NOT FOUND ON JOIN')

GO TO 21
  713 IT=ISTRT
      CALL L(IT,ICLAS)
      ICLAS=ICLAS+1
```

FIG. 26B

```
        IT=IT+1
        CALL L(IT,ICLAS)
        GO TO 21
C             IS CONTINUE SWITCH ON
    13 CONTINUE
        GO TO (12,14),ICONS
C IS THIS AN AXIAL OR A NONAXIAL ADJUSTMENT
    14 CONTINUE
        ITEMP=IAND(IOUT(ISTRT),M1000)
        IF(ITEMP-M1000)22,12,22
C             COMPUTE ABSOLUTE DIFFERENCE IN X
    22 CONTINUE
        IOZ=IAND(IOUT(ISTRT),MOFFF)
        IOM2=IAND(IOUT(ISTRT-2),MOFFF)
        IOP1=IAND(IOUT(ISTRT+1),MOFFF)
        IOM1=IAND(IOUT(ISTRT-1),MOFFF)
        JDX=IABS(IOZ-IOM2)
        JDY=IABS(IOP1-IOM1)
C             WHICH DELTA IS SMALLER
        IF(JDX-JDY)20,20,30
C             DELTA X IS SMALLER
    20 CONTINUE
        ISS=ISTRT
        IDD=ISTRT-2
        GO TO 40
    30 CONTINUE
        ISS=ISTRT+1
        IDD=ISTRT-1
    40 CALL L(ISS,IDD)
        GO TO 12
    21 ICONS=2
    41 IF(IPSL(ISTRT))43,42,43
    42 IPSL(ISTRT)=IAND(IOUT(ISTRT),MEFFF)
        GO TO 44
    43 ITSTW=IAND(IPSL(ISTRT),IPTRM)
        IF(ITSTW-IPTRM)42,44,42
    44 IF(IPSL(ISTRT+1))46,45,46
    45 IPSL(ISTRT+1)=IOUT(ISTRT+1)
        GO TO 1111
    46 ITSTW=IAND(IPSL(ISTRT+1),IPTRM)
        IF (ITSTW-IPTRM)45,1111,45
  1111 CONTINUE
        GO TO (110,1112),K15
   110 CONTINUE
        WRITE (6,103)
   103 FORMAT(' EXIT CONL')
  1112 CONTINUE
        RETURN
        END
```

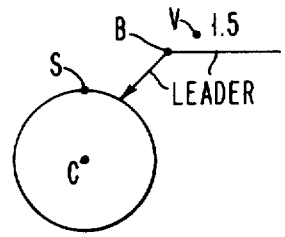

FIG. 27

SYSTEM FOR CONVERTING A ROUGH SKETCH TO A FINISHED DRAWING

BACKGROUND OF THE INVENTION

1. Field of the Invention

The present invention relates to computer-aided drafting systems and the like, particularly those that produce finished drawings or other accurate graphic representations from digitized input data which only roughly or approximately defines the desired final representation.

2. Description of the Prior Art

There have been numerous proposals for building automatic drafting systems of the general category just described. Many of these are referred to in an article entitled "The Instant Draftsman", published in MACHINE DESIGN, Apr. 6, 1972, pages 68–72. Still another example of such a prior system is disclosed in U.S. Pat. No. 3,720,948 issued on Mar. 13, 1973 to H. R. Eichen et al. While such prior systems may serve quite well to produce certain stylized forms of drawings such as wiring diagrams, schematics, flowcharts and structural drawings having many repetitious features which can be symbolically represented, they do not fill the need to which the present invention is particularly directed. The majority of drafting problems (such as those encountered in designing machine parts, for instance) cannot be effectively handled by a system that merely places specified symbols at arbitrarily designated locations on a diagram, or by any of the so-called "construction" methods which require that the operator start with a body of stored data that does not completely define the desired final object representation and then proceed to construct the finished drawing in a piecemeal fashion whereby the operator must intervene repeatedly to specify the dimension, locating coordinates and orientation of each individual line or other component of the drawing in turn as it is being converted from rough to finished form. The more times an operator must intervene to furnish data during the execution of the finished drawing, the less efficient and more cumbersome the drafting procedure becomes, and in an extreme case such a procedure will offer little or no advantage over manual drafting methods.

SUMMARY OF THE INVENTION

What is especially needed at the present time, and which has not been provided by the prior art, is a drafting system that enables the data entry function to be completely separated from the drawing function, meaning that is separates the function of entering into the system the data completely defining the object to be drawn from the function of actually constructing the final object representation, and which system furthermore is able (if desired) to separate the function of entering the "positional" data (i.e., the data defining the locations of key points on the roughly sketched object in terms of suitable grid coordinates) from the function of entering the "dimensional" or "proportional" data that defines the proportions which the lines and other components of the object will have in the finished drawing. A system of the kind herein contemplated permits all of the positional data to be entered in one continuous sequence of data entering operations, followed by entry of all the dimensional data in a separate sequence of data entering operations, and then it causes the conversion of the rough sketch into the finished drawing to be performed instantaneously as an uninterrupted automatic operation utilizing the items of data already entered, so that the operator does not have to intervene repeatedly for supplying the essential items of data piecemeal as the construction of the drawing proceeds. The system also is capable of receiving an individual entry which changes previously entered dimensional information, when desired by the operator, and the characteristics of the system as just described are particularly advantageous in that such an entry causes all of the related positional information to be changed instaneously in an uninterrupted automatic operation.

A primary object of the invention is to provide a computer-aided drafting procedure which fulfills the needs just stated. More specifically, it is an object to provide a system in which the operator, interacting with a graphic input tablet or other digital input device, may effect an initial entry of data comprising the coordinates of key points and any other graphic data necessary for defining a roughly sketched representation of an object to be drawn along with all of the numerical data such as dimensions and radii and the associated functional data which are needed for completely defining a finished scale drawing, all of this being done as one continuous data entering operation, so that production of the finished drawing may proceed automatically on the basis of this initial entry of data without requiring further operator intervention, except where the operator may specifically desire to intervene for a particular purpose.

Another object is to provide a computer-aided drafting system as just described in which rectification (i.e., straightening and axial orientation) of the original sketch lines and proper proportioning of the final drawing lines in accordance with specified dimensions will be accomplished automatically on the basis of the information initially supplied by the operator.

A further object is to enable errors in dimensioning (inadequate, inconsistent or excessive dimensioning to be detected automatically.

A still further object is to separate the function of generating the positional data defining the object lines of the original rough sketch from the function of specifying the dimensions or proportions to which the final scale drawing will be produced, so that the actual line lengths of the sketch need not correspond even approximately to the related dimensions, the system thus being tolerant of even gross errors in the shape and proportions of the sketched figure so long as the dimensions thereof are properly specified by the operator.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 7 is a symbolic tabular representation of a Pointing Sequence List (PSL) used as an example in the present description.

FIGS. 8 and 9 are illustrations of data word structures for PSL entries.

FIG. 10 is a partial tabular representation comparing the contents of "old" and "new" pointing sequence lists.

FIGS. 13A to 17 are flowcharts of certain programs that are utilized by the data processor or computer in the system herein chosen for illustration of the invention.

FIGS. 18A to 26B are code listings of exemplary programs that may be utilized in a system for carrying out the invention.

FIG. 27 is a view depicting the manner in which a circle is dimensioned according to the practice described herein.

DETAILED DESCRIPTION OF A PREFERRED EMBODIMENT GENERAL ARRANGEMENT OF SYSTEM

Figure 1:
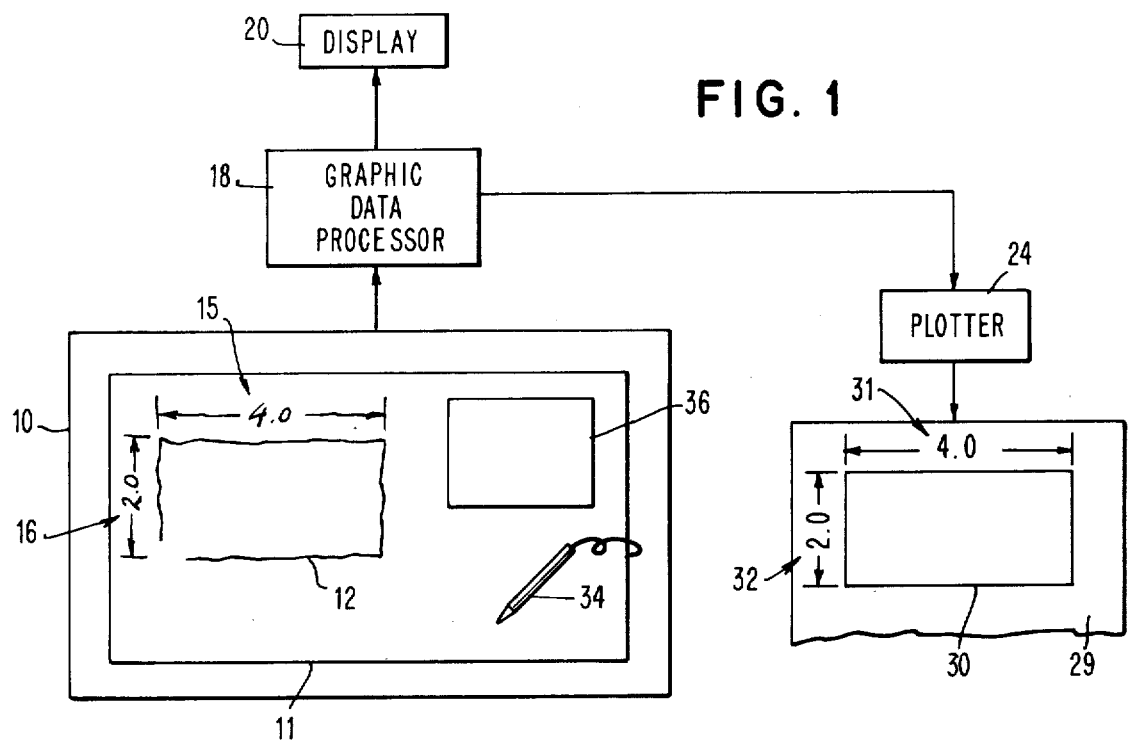
FIG. 1 is a schematic representation of a computer-aided drafting system of the kind in which the present invention may be embodied.

FIG. 1 represents in schematic form a computer system of the type contemplated by this invention for converting a roughly drawn sketch of an object into a neatly executed and properly proportioned line drawing thereof. A graphic input device in the form of an electronic digitizing tablet 10 provides a flat supporting surface for a sheet of paper 11 on which has been drawn a crude sketch of a geometric object 12 (also shown in FIG. 2), from which a finished scale drawing 30 of that object (FIGS. 1 and 3) is to be made. The particular operation herein described is an extremely simple example of a drafting task that the system may be called upon to perform, and in practice the objects to be drawn usually are of much more complex configurations than the one herein illustrated. Generally some roughly drawn dimension legends such as 15 and 16 will be associated with the sketch 12. All of this graphic information may be drawn upon the sheet 11 as it rests upon the tablet 10, utilizing the tablet as a drawing board, or alternatively, it may be on the sheet 11 already at the time when the latter is placed upon the tablet 10.

The digitizing tablet 10 serves as an input device for graphic data processor 18 consisting (in the present example) of a general-purpose computer which is programmed to operate upon the rough sketch data and associated functional information which will be generated by the tablet 10 in the manner described hereinafter. The processor 18, in response to these inputs, will produce output data representing the desired final drawing, which is optionally manifested by the display 20 and/or the plotter 24. The display 20, if utilized, may serve also to manifest an intermediate stage in the development of the finished drawing, as will be explained hereinafter. On a sheet of paper 29 the plotter 24 executes a drawing of the finished object representation 30 and its associated dimension legends such as 31 and 32.

In accordance with accepted drafting practice, the strings of characters forming the dimension values will extend parallel with the respective dimension lines or reference directions to which they apply. Thus the printed value string 32, signifying the vertical dimension 2.0, preferably extends in the vertical direction. In the original freehand sketch, however, the corresponding dimension legend 16 (FIG. 2) would not have to be oriented vertically, although for convenience here it is assumed that such was the case.

DATA ENTRY AND CONTROL

Associated with the input tablet 10 is a stylus 34, FIG. 1 that serves as the data entry device in the particular embodiment shown. By touching the stylus to various key points on the original sketch 12, such as the points A, B, C, D and E, FIG. 2, which are located at line ends, corners, intersections or other strategic points on the object 12, the operator causes the digitized grid coordinates of each such point to be entered into the data storage facilities of the processor 18. It is preferred herein to designate the two grid coordinates of each point respectively as the "H" (horizontal) and "V" (vertical) coordinates thereof. However, other coordinate designations such as "X" and "Y" may be used instead. As each point of interest in the drawing area is touched by the stylus 34, the tablet 10 generates a pair of coded digital entries respectively representing the H and V coordinates which define the position of that point. In the mode of operation herein described the stylus is not used to trace the outline of the original object 12 but only to designate those points thereon which are to be instrumental in determining the configuration that the object will have in the finished drawing.

Figure 2:
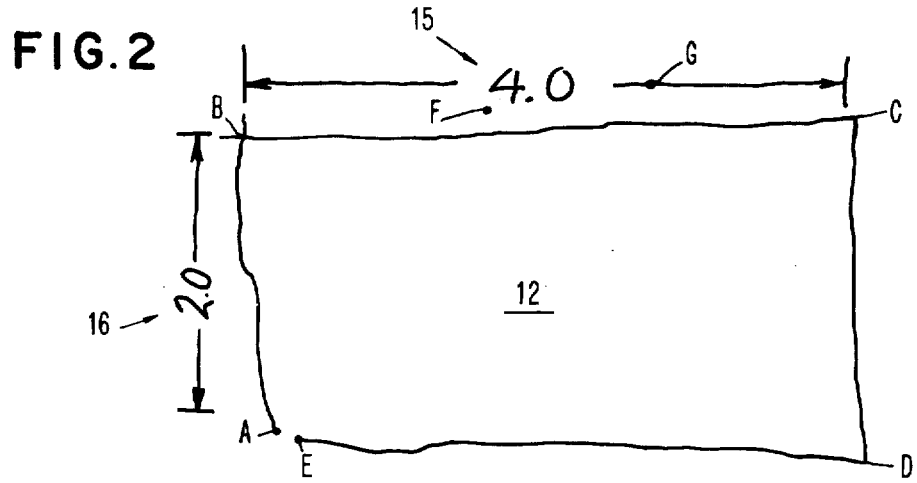
FIG. 2 is a freehand drawing to which reference is made herein as an example of a roughly sketched object.

It is assumed in the present example that the object to be drawn was intended to be a rectangle but that the original rough sketch 12 inadvertently failed to represent the object as a closed figure, the beginning and end points A and E, FIG. 2, being separated from each other by a small distance; or, on the other hand, the object might have been sketched as a closed figure, but the operator touched a final point E that was displaced slightly from the initial point A. The original sketch 12 also may have been carelessly drawn in other ways, for example by extending some of the lines beyond the lines that they are supposed to join, as at point B, FIG. 2, or by making a line too short without identifying its end, as in the case of the line end that is spaced from point C. The data entry procedure has the capability of taking corrective actions such as effecting a joinder of inadvertently separated end points, eliminating excess portions of lines, and ignoring gaps in what were intended to be continuous lines, depending upon how the stylus 34 is manipulated, as will become apparent hereinafter.

Thus far, attention has been given to the procedure for entering the coordinate data defining the locations of key points on the roughly sketched rectangular object 12, using the stylus 34 to identify such points. The stylus 34 is utilized also for entering into the processor 18 other information of both functional and alphanumeric types. This is accomplished through the medium of an overlay keyboard 36, FIGS. 1 and 4, also commonly referred to as a "paper keyboard" and sometimes as a "menu". This keyboard 36 is positioned in any convenient location on the tablet 10, preferably being spaced from the area on which the rough sketch 12 is located (although this is not a necessary condition in the system presently under consideration). The keyboard 36 has registration points 37 and 38, FIG. 4, which the operator touches with the stylus 34 when the keyboard is in place at the desired location on the tablet 10. This fixes the locations of the various "keys" on the keyboard 36, so that whenever the operator thereafter touches the stylus upon an area of the tablet 10 covered by one of these keys, the coordinates thus generated will be interpreted by the system as one of the following pieces of information (depending upon the particular key location): (a) an instruction to perform a designated function, or (b) an entry of a designated alphanumeric character, or (c) any information other than the foregoing which the system may need in its operations or which the operator may wish to have manifested in the display or in the final drawing.

The present application is not specifically concerned with the movable overlay keyboard 36 as such. Devices of this nature are known, and through appropriate programming they can be utilized to effect any operations that could be accomplished under the control of a stationary mechanical keyboard having comparable key designations. The advantage of the overlay keyboard is that it may be positioned at any convenient location on the surface of the tablet 10 or sheet 11, FIG. 1. This is very useful, especially when one is working with a large drawing having many parts and the operator wishes to have the keyboard positioned close at hand to the particular portion of the drawing where he is working at the moment. The keyboard 36 may be relocated from time to time as needed simply by touching the stylus to the "Re-register Keyboard" key (FIG. 4) and moving the keyboard 36 to its new position, then touching the stylus again to the registration points 37 and 38 to fix the new key locations upon the tablet 10.

The keys respectively designated "Object", "Center", "Hidden", "View" and "Constr." on the keyboard 36 are the so-called "line function" keys, which are used to designate the particular types of lines which are to be displayed or drawn. An "object" line is a full line depicting a straight visible edge or boundary of the object. The "center" key refers to the center line of the view being drawn, if such a line is to be used. The "hidden" key refers to invisible edge lines. A "view" line is the line along which a sectional view is to be taken. "Construction" lines are lines which indicate the alinements of corresponding parts in the same or different views. The "object" line function key is the one most frequently used, and in the present example it will be the only one of the line function keys to be considered.

To enter an object line into the system, the operator touches the "object" key, then touches the end points of the line on the sketch. For example, if the line AB FIG. 2, is intended to be straight, the operator touches the stylus to points A and B. The outline of an object usually is assumed to be a sequence of straight lines whose respective end points are denoted by touchings of the stylus. In those instances where lines are meant to be of circular configuration, this must be specified in the manner described hereinafter.

Generally it is assumed by the system that every straight line in the finished drawing is to extend parallel with one of the two orthogonal axes, or in other words, each line is meant to be either horizontal or vertical. Accordingly, as a rule, any rough sketch line which extends diagonally will, in the finished drawing, appear to be horizontal or vertical, depending upon whether the angle it makes with one of the axes is less than or greater than 45°. In those instances where it is intended that a line be nonaxial, the system is notified of this in advance by touching the "Nonaxial" key. In the present example it is assumed that no "nonaxial" lines are to be shown in the drawing.

To enter the essential line data defining the roughly sketched object 12, FIG. 2, the operator successively touches the stylus to the points A, B, C, D, and E. Touching the stylus to each one of these points will cause the system to generate a pair of coded bit strings or "words", respectively defining the horizontal and vertical coordinates of that point, and these words are entered into a stored list hereinafter referred to as the "pointing sequence list" (PSL). Inasmuch as point E terminates the line set or "line string" as it generally is called, the status of E as the final point in the series is designated in some convenient manner, such as by touching the point E twice, for example, or alternatively by touching an "End" key on the keyboard 36, FIG. 4. This will cause the system to search for another point within predefined pedefined area surrounding the point in question, and when such a point is found (such as point A in the present example), its coordinates are assigned to the point which is to be joined therewith (point E in the present case). As a further incident to this action, a "join" bit is set in one of the two PSL words defining the coordinates of Point E. If for any reason it should be desired that the operator have the option of preventing a joinder between two points such as A and E that are positioned very close to each other, the keyboard may be provided with a "NONJOIN" key (FIG. 4) to inhibit any joining action that otherwise might take place.

After the positions of the line end points A, B, C, D and E, FIG. 2, have been entered into the PSL, the dimensional data items are entered therein. Unless otherwise specified, dimensions are assumed to be axial (i.e., horizontal or vertical). To dimension an axial line, the operator first touches the "dimension" (DIMENS.) key on the keyboard 36, FIG. 4, Then he touches the two drawing points specifying the locations from which there are to emanate the extension lines marking off the distance to which the dimension will be applied (e.g., points A and B, FIG. 2). Following this, he touches the point at which it is desired that the string of text characters constituting the dimension value should start (such as point F); then he touches another point (such as G) to indicate the direction in which this value string is to run (e.g., vertically or horizontally). This last indication need be only approximate. Lastly, the dimension value itself (e.g., 4.0) is entered, using the numeric and decimal keys in the lower left portion of the keyboard 36. All dimensions are herein assumed to be axial. The proportioning of a dimension between two end coordinates of a line is independent of the line configuration, whether it be axial, nonaxial, curved, or irregular.

The above-described dimensioning process is repeated for the remaining dimensions. Subsequently herein it will be explained how the system checks to determine whether the object has been properly dimensioned.

Any number of straight-edged objects may be entered into the system by successively touching their constituent line end points as described above. After each set of lines has been entered, the entry of a new set of lines may be started without having to touch the OBJECT key again. Entry of the dimensions may await the completion of all line entries.

The various entries of the line-related data (coordinates and line type designations) and the dimensional data from the original rough sketch will cause the system to create an initial "pointing sequence list" (PSL), which will be described more in detail hereinafter. This initial pointing sequence list subsequently will be converted into a new pointing sequence list or lists as the original roughly sketched object is rectified and/or proportioned in the manner subsequently described.

Figure 4:
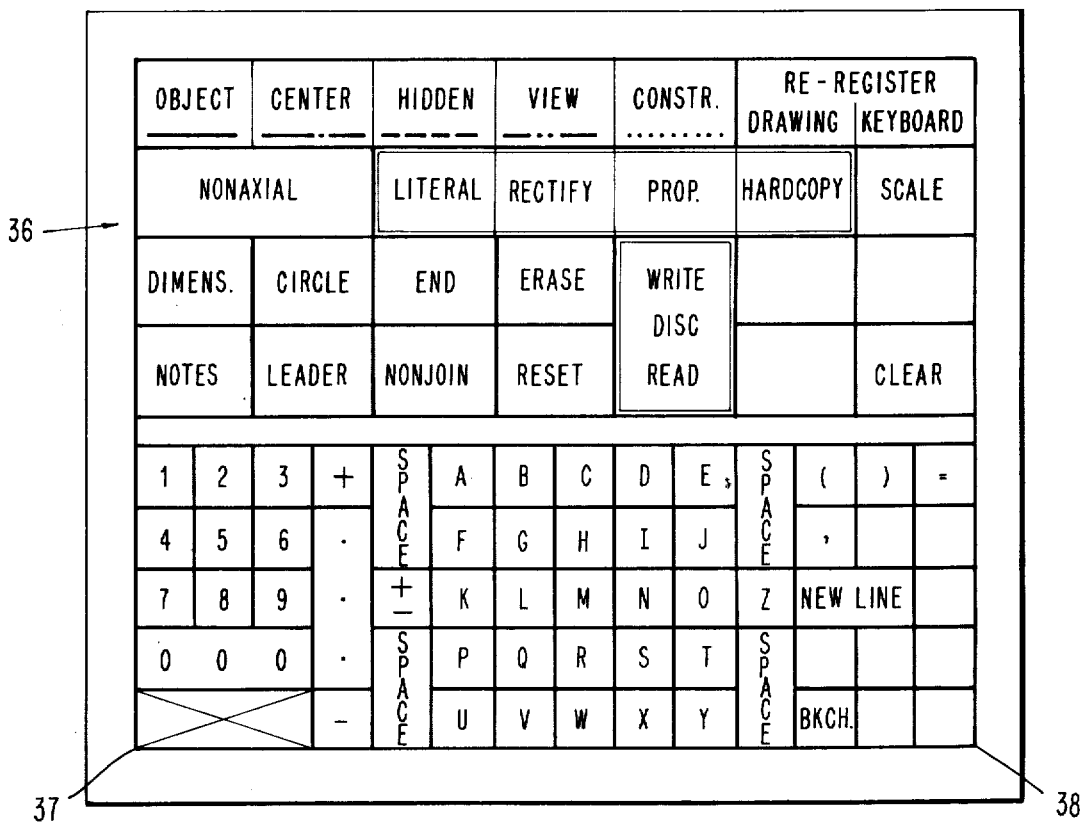
FIG. 4 is a plan view of an illustrative overlay keyboard that may be utilized as part of the graphic input means for the drafting system shown in FIG. 1.

If a circle (FIG. 27) is to be entered, the CIRCLE function key, FIG. 4, is touched with the stylus. Then the center point C of the circle is touched, and a "surface" point S at or near the top of the circle is touched, in that order. It is assumed that the system is provided with suitable circle generating means which is capable of producing a display or plot of a circle, given its center and surface points. Such techniques are well know. To dimension a circle, the DIMENS. and CIRCLE function keys are successively touched. Successive pointings by the stylus then indicate, respectively, the center C and surface point S of the circle to be dimensioned (FIG. 27), the break point B in the leader going from the dimension value to the circle, the point V at which the value string starts, and the successive characters of the value string itself, which specifies the circle diameter.

Other keys designated NOTES and LEADER, FIG. 4, may be provided for entering notations to be put on the drawing and locating the leaders for such notations. These functions will not be described herein.

The display function keys are designated LITERAL, RECTIFY and PROP. (proportion). One of these keys is selected according to the type of display which is to be manifested by the display unit 20, FIG. 1. In the LITERAL mode the input drawing points are used literally as line ends or other feature description points. If orthogonalized straight lines are desired, the RECTIFY key is selected to institute a rectification procedure which will be described hereinafter. The PROP. key is selected when a rectified and proportioned display of the final object image is desired. The size of the image may be selected by use of the SCALE key, a single pointing yielding a half-size image, a double pointing indicating the normal size, and a triple pointing producing a double-size image.

Figure 3:
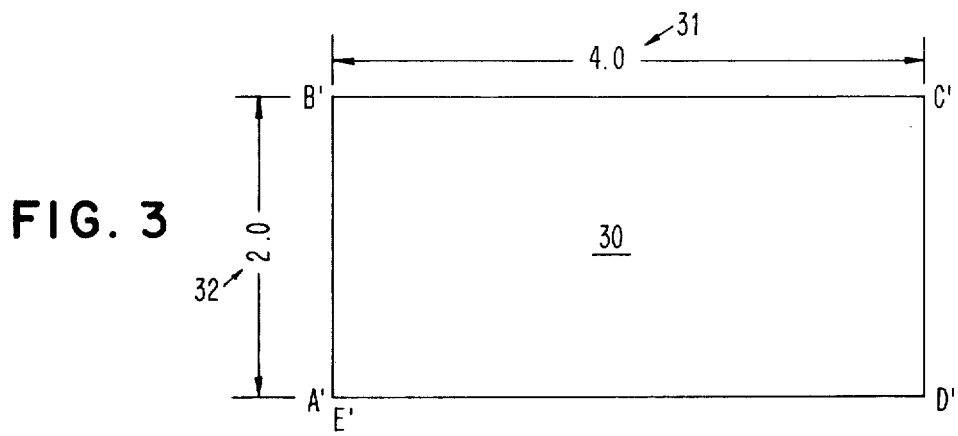
FIG. 3 is a representation of a finished drawing in which the same object is shown in its rectified and proportioned form.

The production of a finished hardcopy drawing 30, FIG. 3, by the plotter 24, FIG. 1, occurs in response to selection of the HARDCOPY key, FIG. 4. The plotter will prepare a drawing of the figure which is being displayed.

The internal functioning of the display device 20 and the plotter 24 will not be described herein. Attention will be given primarily to those operations of the processor 18 which yield the output data that is manifested by the units 20 and/or 24.

The various other features of the illustrated keyboard 36 will be omitted from the present description, since they are not essential to an understanding of the invention herein claimed.

BASIC PRINCIPLES OF DIMENSIONING

The present invention is addressed primarily to the problem of converting data which represents the coordinates of reference points on a rough sketch and related data representing the dimension values associated with pairs of such reference points into other data representing the coordinates of corresponding points on a finished drawing wherein the object lines are properly oriented and are proportioned in accordance with the specified dimensions. Before such a result can be achieved, it is essential that the original sketch specify dimensions which are adequate to define the desired final representation.

Figure 5:
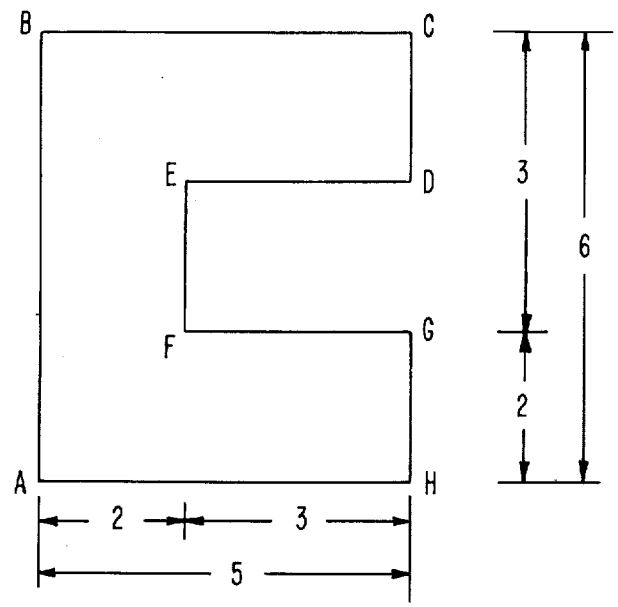
FIGS. 5 and 6 are views of an illustrative object showing proper and improper dimensioning practices.

As an aid to understanding the subject of dimensioning, several examples of improper dimensioning will be considered in relation to the object shown in FIG. 5. Vertically this object is both underdimensioned and overdimensioned. It is underdimensioned because there is no way to determine from the given vertical dimensions the length of the line CD. It is also overdimensioned vertically because there are two ways of determining the length of line AB from the dimensions shown, first from the overall vertical dimension 6, and second from the sum 5 of the other two vertical dimensions, there two sets of vertical dimensions being inconsistent with each other. Even if they were consistent, however (as in the case of the horizontal dimensions shown in FIG. 5), some drafting experts nevertheless consider it bad drawing practice to have two sets of dimensions defining or determining the same line length. The type of system herein contemplated will reject excessive dimensioning even if it is accurate. However, if desired, the system could be so designed that excessive dimensioning is rejected only when it is inaccurate.

Figure 6:
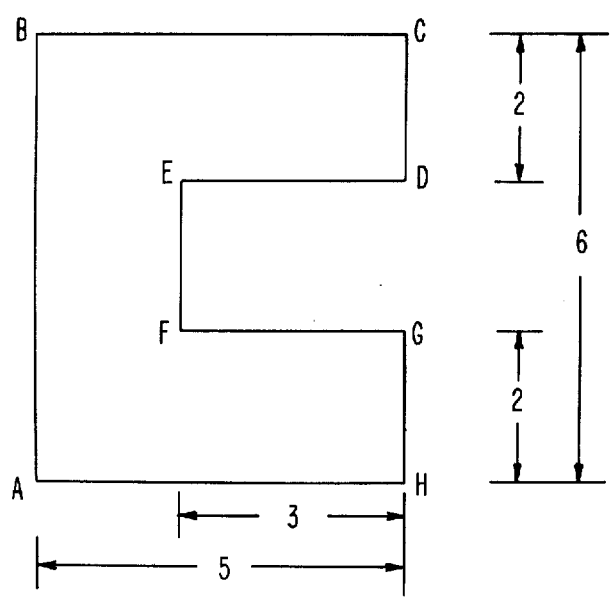

One example of proper dimensioning is shown in FIG. 6. This avoids the objections made hereinabove with respect to FIG. 5.

The proportioning procedure performed by the disclosed system (to which more detailed attention will be given hereinafter) includes the function of checking the dimensions specified by the operator. Unless the object is properly dimensioned, it cannot accurately be proportioned. This dimension checking phase of the procedure is accomplished after the coordinates of the key points in the roughly drawn object have been "rectified", i.e., made to correspond with the desired axial orientations of the respective object lines or circle radii (as the case may be) which are defined by the specified points. The rectification procedure will be described hereinafter. In the examples shown in FIGS. 5 and 6, the object already has been rectified.

As explained hereinabove in connection with FIG. 27, each circle is rather simply identified by specifying the coordinates of the center C, the coordinates of a point S on the surface or periphery of the circle more or less directly above the center, and the diameter of the circle, which is treated as a vertical dimension by the system.

The subject of dimensioning will herein be considered only insofar as the specified dimensions are utilized in the proportioning function. The manner in which such dimensions are utilized for producing visually readable dimension legends for the finished drawing will not be explained herein. The application of visually readable dimension legends to the drawing in its displayed or hardcopy form is a separate subject that is not considered germanne to the present invention.

POINTING SEQUENCE LIST (PSL)

As explained hereinabove in the *Summary of The Invention*, it is a prime objective of this invention to provide an automatic drafting system which enables the operator to specify in one continuous data entering operation all of the information needed for the system to produce a finished drawing, wherein each object is prroportioned according to its specified dimensions. The novel conversion procedure herein described is able to start with a stored body of data which completely defines the final object representation before any part of that final representation is produced. This is a valuable feature of the invention and marks its chief advantage over the prior "construction" methods referred to hereinabove, which have required that the operator start with an incomplete set of data and then intervene repeatedly for supplying the needed additional data at various stages in the production of the finished drawing. It should be noted furthermore that in the initial data entering operation, the entry of data graphically defining the object which is to be processed (coordinates of key points on the rough object, line descriptors, etc.) and the entry of dimensional data defining the finished object representation may be performed in separate data entering sequences, so that a dimension need not be specified at the same time that the location of the part to which it applies is being specified.

The data which defines the respective parts of an object to be drawn by the system and the dimensions associated therewith are assembled and stored in a form that has been referred to hereinabove as a "pointing sequence list" or PSL. As already explained, this data may conveniently be entered into the system by means of an electronic tablet 10, FIG. 1, having a stylus 34 which is pointed at the various object line ends or junctions in the original rough sketch 12 and at the appropriate "keys" of the paper keyboard 36 (FIG. 4). However, it is not essential to the carrying out of the present inventive concept that the PSL data be entered by means of a tablet and stylus, and other equivalent ways of entering such data may be used within the purview of the invention.

FIG. 7 shows in symbolic terms the general format of a pointing sequence list which would be prepared for the type of rough sketch 12 shown in FIGS. 1 and 2. (It will be assumed herein, unless otherwise stated, that the object to be drawn is a figure formed of straight lines). The illustrated PSL, FIG. 7, comprises blocks of entries, each commencing with a function header. The present description will be limited to the consideration of PSL entry blocks having function headers in the following four categories only:

1. Line function (entries defining the positions of points and straight lines connecting these points in a line string)
2. Circle function (entries defining the positions of the center and surface points of a circle)
3. Axial dimension (entries specifying a distance along an axis between two points and other entries needed to specify the display and/or plotting of this dimension
4. Circle dimension (entries specifying the diameter of a circle and other entries needed to specify the display and/or plotting of this dimension)

PSL blocks having other types of headers will not be considered since they are not relevant to the invention.

In the present example, which involves an object (FIG. 2) that is meant to be straight-sided, the assembling of a pSL commences when the operator points to one of the "line function" keys, FIG. 4, for instance the OBJECT line key in the upper left corner of the keyboard 36. This generates a "line function header" as the first entry for the pointing sequence list, FIG. 7. This is followed by a series of "Document" (DOC) entries, which in the illustrated example constitute the entries numbered 2 through 11 defining the coordinates of significant points on the document which lie on the roughly sketched object 12, FIG. 2. These DOC entries also have been collectively referred to hereinabove as "positional data". They also may be referred to as "DOC words".

To generate the DOC entries or DOC words with the type of data entry apparatus shown in FIG. 1, the operator touches the stylus successively to the points, A, B, C, D and E which are the respective ends of the lines bounding the roughly drawn object 12, FIG. 2. For convenience, the initial point A in the first series of points to be entered for a particular view is assumed to be the origin, which will remain fixed for that view. Any suitable convention may be adopted for signalling the final point in this series. For example, when the operator comes to point E, he may touch this point twice, or he may touch an END key on the keyboard 36, FIG. 4, before touching the final point E. This informs the system that the series of DOC entries is completed and that the system should seek to establish an equivalency between this final point and some previously entered point which may have slightly different coordinates (such as point A, for example). The line string now has been defined.

Each document (DOC) point has two entries in the PSL, one for the horizontal (H) coordinate and one for the vertical (V) coordinate. (The terms "horizontal" and "vertical" are chosen for convenience, and any other suitable coordinate designations, such as X and Y, could be utilized if desired.) Thus, the touching of point A generates an $A_H$ entry and an $A_V$ entry, one designating the horizontal coordinate and the other the vertical coordinate of point A. A similar pair of entries is generated for each of the other points B through E of the object 12 as that point is touched by the stylus.

After all of the items of positional data in the line block have been entered, the items of dimensional data will be entered. At this point it should be explained that what is being described here is a preferred procedure. It is not strictly necessary that all line string entries be grouped together. They could be intermingled with dimensional entries, provided the appropriate headers are supplied. However, it is more economical of storage space to proceed in the fashion presently described, since this will require the minimum number of headers.

Entry of axial dimensional data into the PSL is initiated by the operator touching the dimension key (DIMENS.) on the keyboard 36, FIG. 4. This inserts an "axial dimension function header" into the PSL (entry 12, FIG. 7), Thereby starting an axial dimension block. Following this the operator proceeds to specify one of the axial dimensions. It should be noted in this connection that axial dimensions do not have to be entered in the same order as the lines in the line string. Thus, for example, the line AB, FIG. 2, was the first line whose position was defined by the DOC entries in the line block, FIG. 7, but the operator may choose to construct as his first axial dimension block the one which defines the axial dimension between points B and C. The order in which the dimensions are entered into the PSL is arbitrary. Proper correlation ultimately is established during search operations to be described hereinafter.

Let it be assumed that the operator wishes to specify a horizontal dimension 4.0 between the points B and C of the object 12, as denoted by the reference number 15 in FIG. 2. He does this by first touching the points B and C, thereby marking the lateral limits between which the dimension is to extend. Then he touches the stylus to the point at which it is desired to have the dimension value string 15 commence relative to the object in the finished drawing (such as point F, FIG. 2). Following this he touches another point to indicate the direction in which the dimension value string is to run. In the present case this would mean touching a point somewhere to the right of the preceding point (such as point G, FIG. 2). Then, the characters of the value string are touched successively on the keyboard 36, in this case "4" followed by "." followed by "0". The dimension value may be specified to any degree of precision desired, even though the stylus 34 is not capable of such precision in specifying the coordinates between which the dimension extends.

The resulting dimensional entries into the PSL, FIG. 7, comprise the horizontal and vertical coordinates of the points B, C and F (entries 13 to 18, referred to hereinafter as "DOC references"), a control word (entry 19) to indicate the direction in which the dimension value string 15 is to run (in this instance horizontal), and the characters of the value string (entries 20, 21 and 22). The direction control word, entry 19, is determined automatically by the system from the fact that the point G, FIG. 2, is located more to the right of point F than it is up or down relative thereto. In other words, the system determines that there is less vertical displacement between $F_V$ and $G_V$ than there is horizontal displacement between $F_H$ and $G_H$; hence the value string 15 is to run horizontally. (A direction-determining operation of this kind will be involved in the rectification process which is described subsequently herein under the heading "CONL", and it will not be explained in detail at this point). Note that it is not necessary to have the coordinate of point G included in the pointing sequence list, FIG. 7, now that the direction of the dimension value string is known. The data structure of the direction control word will not be shown in detail herein. It does not have the format of a DOC entry, which will be described presently.

The PSL may include many entries in addition to the ones described thus far which may be needed in the production of a complete finished drawing. Some of these additional entries may be automatically inserted into the dimension block by the system to denote things such as the positions of dimension arrowheads, for example. Other entries may pertain to notes which the operator wishes to have placed on the drawing (using the NOTES and LEADER keys and the alphanumeric keys, FIG. 4). Since the present invention is not particularly concerned with the use of such additional data, the PSL entries for the same will not be described further herein.

Each PSL entry comprises a 16-bit data word, the format of which will be explained with reference to FIGS. 8 and 9. In the PSL which is constructed initially from the operator's stylus pointings, the format of each entry is determined in part by whether the stylus has been pointed at a function key on the keyboard 36, a document point in the area outside the keyboard 36, an alphabetic key on the keyboard 36, or a numeric key on the keyboard 36. The information as to which of these categories the entry is classified in will be contained somewhere in the first byte (eight bits) of this data word. Referring to FIG. 8, which shows the four principal types of data word structure herein considered, if the entry is a header word generated by a function key, it will contain a 1 bit in the sixth position from the left and 0 bits in every other position of the first byte. The "-" marks in FIG. 8 represent any binary digits, 1 or 0. If the entry is a document (DOC) word, that is, a word specifying one of the two coordinates which define the position of a physical point on the document, a 1 must be in the second bit position, but any bits may occupy the other positions of this word. An alphabetic character is denoted by a 1 in the seventh position and 0's in the other positions within the first byte. A numeric character is indicated by a 1 in the eighth position and 0's in the first seven positions of the first byte. Other types of PSL entries will be disregarded herein.

FIG. 9 represents in more specific fashion the data format of a document word (any of the DOC entries in the PSL, FIG. 7). In keeping with conventional practice, the sixteen bit positions of this word are numbered 0 through 15, respectively, so that the first bit position is the No. 0 position, the second bit position the No. 1 position, etc. As hereinabove mentioned, the presence of a 1 bit in the No. 1 (i.e., second) position of this word indicates that it is a document (DOC) entry, as distinguished from a header or an alphanumeric character.

GENERAL DESCRIPTION OF RECTIFICATION AND PROPORTIONING

As will be explained in greater detail hereinafter, the PSL which is formed initially in response to the operator's stylus-generated entries (referred to as the "old PSL" in FIG. 9) will be converted later into one or more revised versions of this PSL ("new PSL") as the rectification and proportioning procedures are carried out. The twelve bits in the No. 4 through No. 15 positions of a DOC word in the old PSL represent, in binary notation, the value of a horizontal or vertical coordinate of the related document point, as the case may be. In the new PSL, however, there will be instances where the last twelve bit positions of a DOC word serve a different function, as will be explained presently in connection with the discussion of "pointers" in the new PSL.

The presence of a 1 bit in the No. 0 position of a horizontal DOC word in the old PSL signifies that the document point in question is to be "joined" with another document point. The coordinates of the point to be joined were made identical with those of the point it is to be joined with in the old PSL. In the new PSL the coordinates of the point to be joined (e.g., point E, FIG. 2) will be replaced with "pointers" to the coordinates of the point that it is to be joined with (e.g., point A), in the manner subsequently described. In the new PSL there is no need for a "join" bit in any of the words.

The No. 3 bit position of a DOC word, FIG. 9, may be used for a dual purpose. In the old PSL a 1 bit in this position indicates that the DOC word defines one coordinate of a point on a slanted or nonaxial line whose orientation is not to be changed to axial during the rectification process. In the new PSL a 1 bit in the No. 3 position of a DOC word indicates that the coordinate defined by this word is "fixed", which is to say, that it will remain unchanged as the succeeding portion of the procedure is executed. The method by which coordinates are fixed will be described in detail subsequently. For the present it is sufficient to explain that fixing a coordinate entails the entry of a 1 bit into the No. 3 position of its corresponding new PSL entry. Fixing a point is accomplished by fixing both of its coordinates.

The No. 2 bit position in the DOC word, FIG. 9, stores a 0 in the old PSL. In the new PSL it may in some cases store a 1 bit to denote a "pointer". Referring back to the example shown in FIG. 2, the roughly drawn object 12 is intended to be a rectangle whose sides are oriented parallel with the respective orthogonal axes. Therefore, when the object is rectified, the horizontal coordinates $A_H$ and $B_H$ of points A and B, respectively, should be identical. Obviously this will not be the case in the initial or "old" PSL for the object shown. As part of the rectification process the system will ascertain that point B is located more above point A than it is to either the left or right of point A. In other words, the difference between the respective values of the vertical coordinates $A_V$ and $B_V$ is greater than the difference between the values of the horizontal coordinates $A_H$ and $B_H$, and since the line AB is not designated as a nonaxial line, it must be rectified to a vertical orientation. Therefore, the rectification procedure requires that the values of $A_H$ and $B_H$ be made identical.

To indicate that point B is meant to be positioned directly above the present location of point A and that $B_H$ therefore is equivalent to $A_H$, a "pointer" is employed. Referring to FIGS. 9 and 7, this is accomplished in the new PSL by setting the No. 2 bit of entry No. 4, FIG. 7 (the PSL word for the horizontal coordinate $B_H$) to 1, thereby indicating a pointer, and storing in the last twelve bit positions of this word a binary number indicating the PSL location at which the appropriate new value of $B_H$ may be found, in this instance the entry numbered 2 (FIG. 7), which contains the value of $A_H$ to which $B_H$ is now being equated.

A similar process may be carried out with regard to the other points on the object which are positioned on axial lines. Thus, in FIG. 2, the vertical coordinate $C_V$ of point C must be effectively equated or "pointed" to the vertical coordinate $B_V$ of point B. Then the horizontal coordinate $D_H$ of point D must be equated with the horizontal coordinate $C_H$ of point C. Then, the vertical coordinate $E_V$ of point E must be equated with the vertical coordinate $D_V$ of point D. Finally, in response to the join bit in the old PSL "H" entry for point E described above, the vertical coordinate $D_V$ is pointed to the vertical coordinate $A_V$ of point A, thereby effectively pointing $E_V$ to $A_V$, and the horizontal coordinate $E_H$ of point E is pointed to the horizontal coordinate $A_H$ of the point A. The manner in which these joining and pointing functions are carried out will be explained more specifically hereinafter.

The result of all the operations just described is to create a new PSL in which some of the coordinate entries now have pointers establishing their equivalence to, or identity with, other coordinate entries. This is indicated in FIG. 10 by a comparative listing of coordinate entries in the old PSL (PSL1) and the new PSL (PSL2), where PSL1 is the initial input PSL, and PSL2 is the "rectified" version thereof. In PSL2, the arrows indicate the effects of the pointer bits and the join bit. In some instances there may be a multiple pointer ($E_V$ to $D_V$ to $A_V$, for example).

The presence of a nonaxial bit in the first of the DOC entries for any point (binary 1 in the No. 3 position of the old PSL word, FIG. 9) will inhibit the establishment of any pointer that would be inconsistent with a nonaxial relationship.

As will be explained subsequently herein, the "new" PSL2 which results from the rectifying operations performed upon the "old" PSL1 is subject to further modifications which are performed in the course of executing the proportioning procedure, wherein coordinate values are changed wherever necessary to correspond with the stated dimension values. The various pointers which were established in PSL2 during the rectifying process (as symbolically indicated in FIG. 10) are preserved throughout the proportioning operations which follow. These pointers are extremely useful, because if a coordinate is changed in one place, corresponding changes are made automatically in every other place which is related thereto by a pointer or pointers. This not only facilitates proportioning but also enables dimensional changes to be made expeditiously in the proportioned object representation, if such should be desired.

The entries in a dimension block, FIG. 7, include some words which define the coordinate locations of points involved in the dimensional specifications. Thus, entries 13 to 16, for instance, define the end locations of line BC to which the dimensional value 4.0 is being applied.

In the new PSL pointers are put into items 13, 14, 15 and 16 so that they point to items 4, 5, 6 and 7, respectively. Hence, any changes made, for example, in the coordinates of the line end points B and C, FIG. 2, in order to reposition the line BC (as shown in FIG. 3 by the new line B'C') will effect corresponding changes in the points to which the corresponding dimension legend 15, FIG. 2, is applied (as shown in FIG. 3, where the dimension legend 31 is applied to the line B'C').

The following is a general description of the proportioning procedure, which includes checking the dimensions assigned to the object. In this description a coordinate will be referred to as "fixed" when its location on the finished drawing has been determined, taking the specified dimensions into account. In the new PSL the fixing of a coordinate is indicated by setting the No. 3 bit of its PSL word to 1 (FIG. 9).

Initially none of the coordinates relating to the object are "fixed". That is to say, they have nominal values, at least some of which may have to be replaced by other coordinate values that are consistent with the various dimension values and line orientations specified for the object. It is assumed that there is a list of vertical and horizontal dimension values and horizontal and vertical coordinates of the nominal end points on the rectified but as yet unproportioned object. As already mentioned above, a listing of this kind will be referred to herein as a "pointing sequence list" (PSL). As previously indicated, the PSL entry for each coordinate contains a tag bit (No. 3 position, FIG. 9) which indicates by its 1 or 0 value whether the coordinate is fixed or unfixed. It is assumed that rectification of the roughly sketched object already has taken place, the procedure for this having been described in a general manner hereinabove and being described in more detail hereinafter.

The proportioning procedure currently under consideration includes the following steps:
1. Select a point on the object (for example point A) as the origin with respect to which the coordinates of all other points will be fixed.
2. Fix the horizontal coordinate of the origin (i.e., set the appropriate tag bit of its PSL entry to 1). As explained hereinafter, this automatically will fix the entries corresponding to the horizontal coordinates of all other points that are meant to be on the vertical line containing the origin, as previously determined by the rectification procedure.

3. For each unused horizontal dimension which extends from a fixed horizontal coordinate to another point, do the following:
   3a. If the horizontal coordinate of the second point of the pair already is fixed, indicate that it is overdimensioned horizontally and that the dimension currently under consideration has been used.
   3b. If the horizontal coordinate of the second point of the pair is not yet fixed, set its horizontal coordinate equal to the algebraic sum of the first horizontal coordinate plus the horizontal dimension, then indicate that the horizontal coordinate thus determined is now fixed and that the dimension currently under consideration has been used. The algebraic sign of the horizontal dimension is determined according to whether the horizontal coordinate of the second point is greater or less than that of the first point in PSL1. Fixing the horizontal coordinate of any point will automatically fix the entry corresponding to the horizontal coordinate of any other point that is meant to be on the same vertical line, as determined by the rectification procedure. (This is because of the pointers which have been established.)
4. Repeat step 3 until there are no more unused horizontal dimensions relating to fixed horizontal coordinates.
5. If there now remains any horizontal coordinate which has not been fixed, indicate that the object is underdimensioned horizontally.
6. Repeat steps 2 through 5 for the vertical dimensions and vertical coordinates. (It will be understood that the term "horizontal" will be replaced by "vertical", and vice versa, as may be appropriate in the foregoing description of these steps.)

The result of the foregoing operations is a further modification of the pointing sequence list (PSL) in which the coordinates of listed points have been assigned values that are consistent with the specified dimension values. If the object was properly dimensioned in the first instance, this new PSL completely and accurately defines the proportioned object. Appropriate measures are incorporated in the system to insure that the final object lines have not only the desired axial orientations but the desired directions (up, down, right, left) as well. If there had been any overdimensioning or inconsistent dimensioning of the object, this would have become apparent in step 3(a) above. If the object had been underdimensioned, this fact would have been detected in step 5. In the event of improper dimensioning, the system may be allowed to proceed to the extent it is able to do so, and appropriate measures may be taken to notify the operator of the improper dimensioning if it is not otherwise apparent to him.

DETAILED DESCRIPTION OF RECTIFICATION AND PROPORTIONING PROCEDURE

In the foregoing part of the specification the rectifying and proportioning functions were described in rather general terms. The remaining part of the specification will present a more detailed description of the manner in which the rectification and proportioning procedure may be carried out with the aid of a programmed general-purpose computer such as an IBM Type 1800 computer, for example, which has been successfully employed for this purpose. The central processing unit of such a computer, when appropriately programmed in the manner indicated hereinafter, is represented in FIG. 1 as the graphic data processor 18. It should be understood, of course, that this is merely an exemplary embodiment and that other types of computers could be equally well utilized, whether they employ software programming, microprogramming or special-purpose hardware circuitry to perform the described functions.

The present description will deal particularly with the programs or routines involved in the performance of the rectifying and proportioning functions with which the invention is concerned. It will be understood, of course, that any practical implementation of the novel concepts herein described will require additional programming or procedures for carrying out the usual "housekeeping" and supervisory functions, all of which are well within the present state of the art and therefore will not be specifically described herein.

To avoid possible confusion in the use of terminology such as "rectification" and "proportioning" herein, it should be explained that there are two ways in which one may employ the process of rectification (whereby object lines which are intended to be axial are aligned with the vertical and horizontal axes, respectively). Thus, rectification may be used solely for generating a display of a rectified but unproportioned image of the object upon the display unit 20, FIG. 1, in response to selection of the RECTIFY function key, FIG. 4. It also may be part of the proportioning procedure, initiated by selection of the PROP. function key, FIG. 4, wherein the axial lines of the object are first rectified and then are adjusted in length according to the proportions specified by the various dimensions of the object.

To recapitulate, if the operator activates the "RECTIFY" key on the keyboard 36, FIG. 4, this causes a rectified but unproportioned image to be displayed. The "PROP." key is utilized when the operator wishes to generate an image that is both rectified and proportioned. Also, as mentioned hereinabove, the operator may obtain a display of the object in its original roughly sketched form by pressing the "LITERAL" key. A hardcopy drawing of the object in its literal, rectified-only or proportioned (and rectified) form may be obtained by first pressing one of the three display keys LITERAL, RECTIFY or PROP., as the case may be, and then pressing the HARDCOPY key. (It is assumed that the desired scale already has been selected.) When the operator wants a finished drawing, he utilizes the PROP. and HARDCOPY keys.

Figure 11:
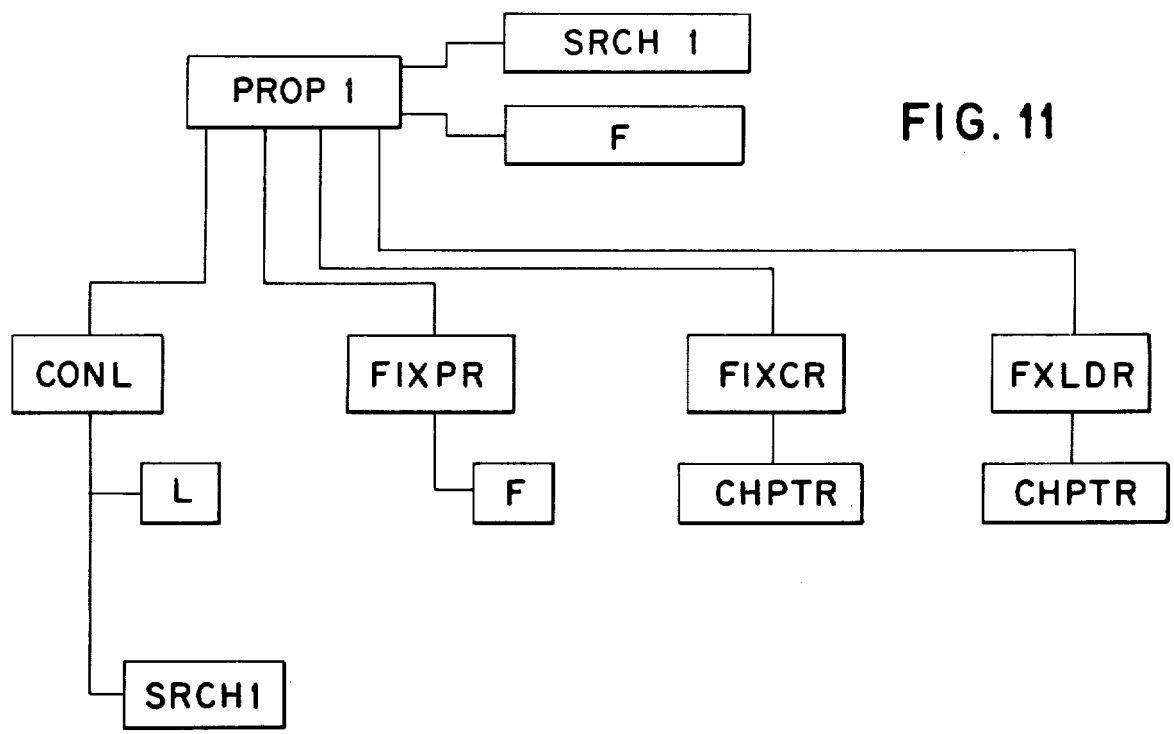
FIG. 11 is a block diagram showing the hierarchy of programs involved in the rectifying and proportioning functions of the system shown in FIG. 1.

FIG. 11 represents schematically the hierarchy of programs or routines involved in the performance of rectifying and proportioning functions. The master program in this hierarchy is PROP1, which is invoked regardless of whether the coversion procedure will be limited to rectification only or is to include both rectifying and proportioning functions. PROP1 is called in response to the selection of either the "RECTIFY" key or the "PROP." (proportion) key, FIG. 4. Under control of PROP1, directly or indirectly, are various subprograms or subroutines respectively designated in FIG. 11, as SRCH1, F, CONL, FIXPR, FIXCR, FXLDR, L and CHPTR, all of whose functions will be described more specifically hereinafter. If rectification only is desired, as indicated by selection of the RECTIFY key, then PROP1 calls only the program CONL and its associated subroutines L, and SRCH1, and none of the programs associated with proportioning—namely, FIXPR, F, FIXCR and FXLDR—will be called. If the procedure is to include the proportioning of a rectified object whose configuration is defined by a previously entered line string using a line function key such as "OBJECT", for example, then actuation of the PROP. key causes PROP1 to call both CONL and FIXPR, in that order, to produce a representation of the rectified and proportioned object. Where the object is a circle which has been entered by use of the CIRCLE function key, actuation of the PROP. key causes the programs CONL, FIXCR and FXLDR to be called by PROP1 for representing the circle and its leader in final form.

All of the programs designated by the labeled boxes shown in FIG. 11 are represented herein by their respective code listings, written in either FORTRAN or Assembler language, which are shown in FIGS. 18A et seq. Some of the programs, namely, PROP1, F, L, CONL and FIXPR, are further illustrated by flowcharts, FIGS. 13A to 17, which will be the subject of detailed descriptions presented hereinafter.

To briefly summarize what has been stated above, a roughly sketched object such as 12 shown in FIG. 2 is represented graphically by the vertical and horizontal coordinates defining the relative positions of a series of points such as A, B, C, D and E, which together constitute what frequently is referred to as a "line string". The proportions which one desires the finished drawing of that object to have are represented by vertical and horizontal dimensions (such as 16 and 15) which define the axial distances between certain pairs of the points in the line string. As described hereinabove, the positional data defining the configuration of the original object 12 and the dimensional data specifying the intended proportions of that object are entered into a pointing sequence list (PSL), an example of which is shown in FIG. 7. The dimensions are utilized in the proportioning process to fix the final coordinates of the points such as A', B', C', D' and E', FIG. 3 (the counterparts of points A, B, C, D and E, FIG. 2), which define the shape of the final object representation 30.

Figure 12:
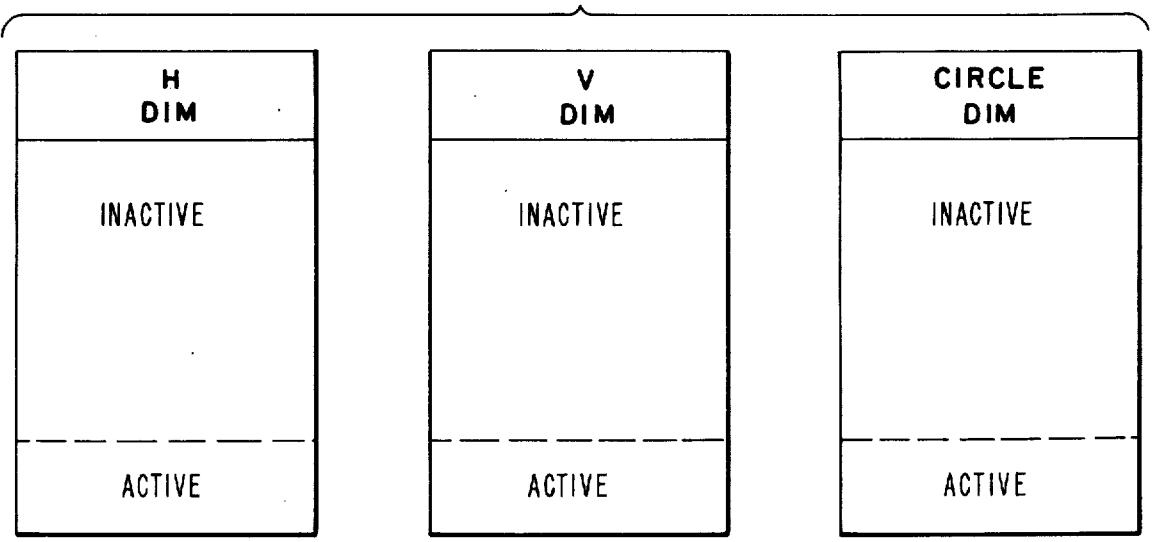
FIG. 12 is a diagramatic representation of certain dimensional indices that are utilized in the system of FIG. 1.

As an incident to the initiation of a rectifying or proportioning operation upon an object defined by a line string, the system creates indices of the horizontal and vertical dimensions stored in the PSL, as represented schematically in FIG. 12. For each H or V dimension stored in the PSL a corresponding entry is made in the H or V dimension index, such entry comprising a "pointer" to the PSL location at which the corresponding dimension is stored. If one or more circle dimensions (i.e., diameters) are specified by entries in the PSL, corresponding index entries are made in the circle dimension index. At first all of these index entries are assumed to be "inactive", which is to say that they have not thus far been used or referred to in any proportioning operations. As each dimension becomes involved in the process of fixing coordinates during the proportioning operations, its pointer is moved to the "active" part of the index, and when the dimension has been used, its pointer is deleted from the index. If the dimensioning procedure has been properly carried out, there will be no index entries left when proportioning has been completed, nor will the index entries be exhausted before the completion of the proportioning process.

For simplicity, the description thus far has proceeded on the assumption that the use of H and V dimensions is not dependent upon circle dimensions, so that H and V dimensions can be used before the circle dimensions. If this is not true, proportioning should iterate through all dimension types, which could be accomplished with a single index incorporating all dimension types.

PROP1

As mentioned hereinabove in relation to FIG. 11, PROP1 is the master program for the rectifying and proportioning functions of the disclosed system. A principal function of PROP1 and the subprograms under its control is to construct the new pointing sequence list, PSL2, which will represent the object first in its rectified form and then, if desired, in the proportioned or scale drawing form. The PROP1 program operates under control of a supervisory program, herein referred to as the "calling program", which calls PROP1 in response to operator selection of a function that involves rectification and/or proportioning of the object which is to be displayed and/or drawn by the system. In the present system, such selection is made by touching the stylus 34, FIG. 1, to the RECTIFY or PROP. key, FIG. 4, on the keyboard 36.

Figure 13A:
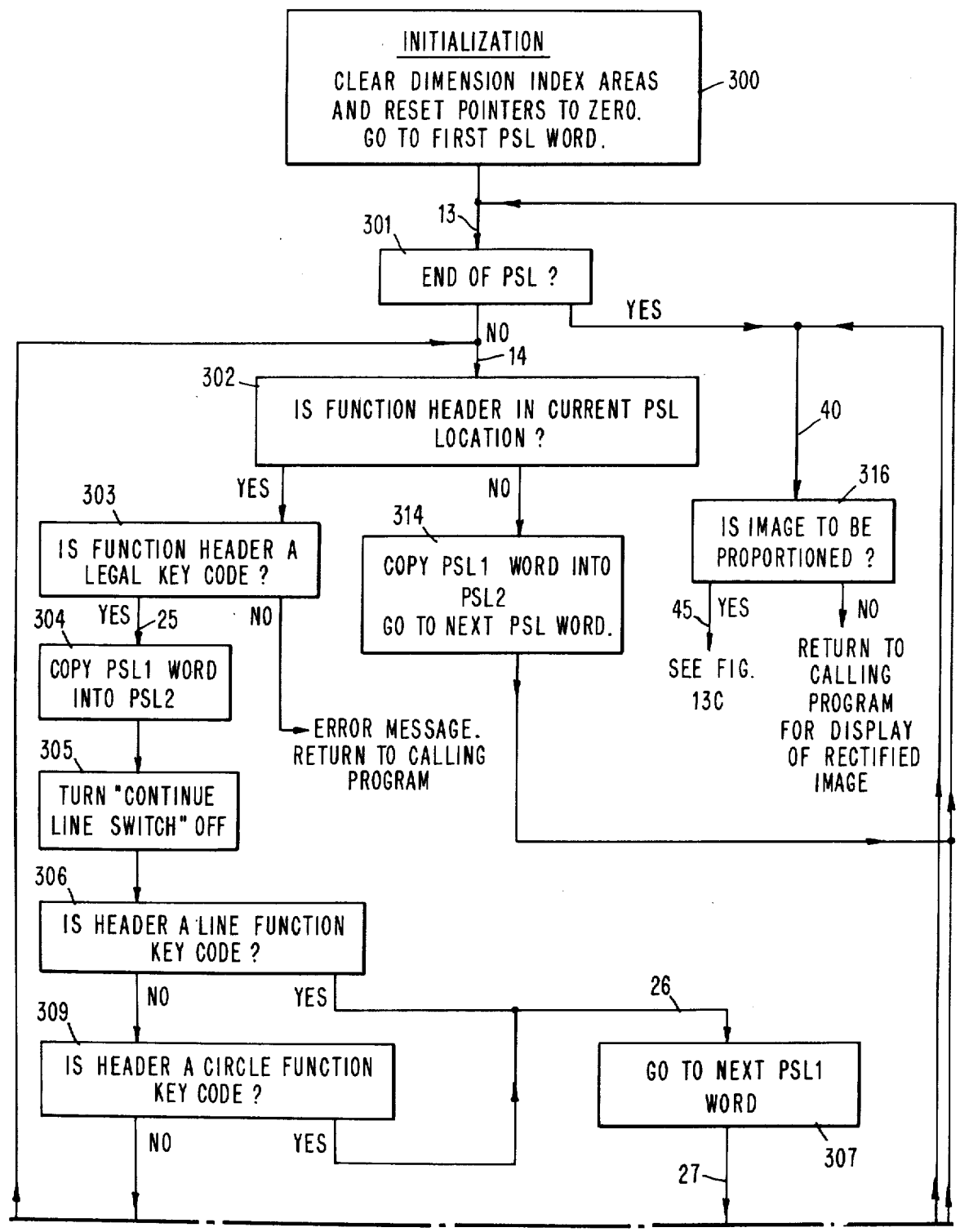
Figure 13B:
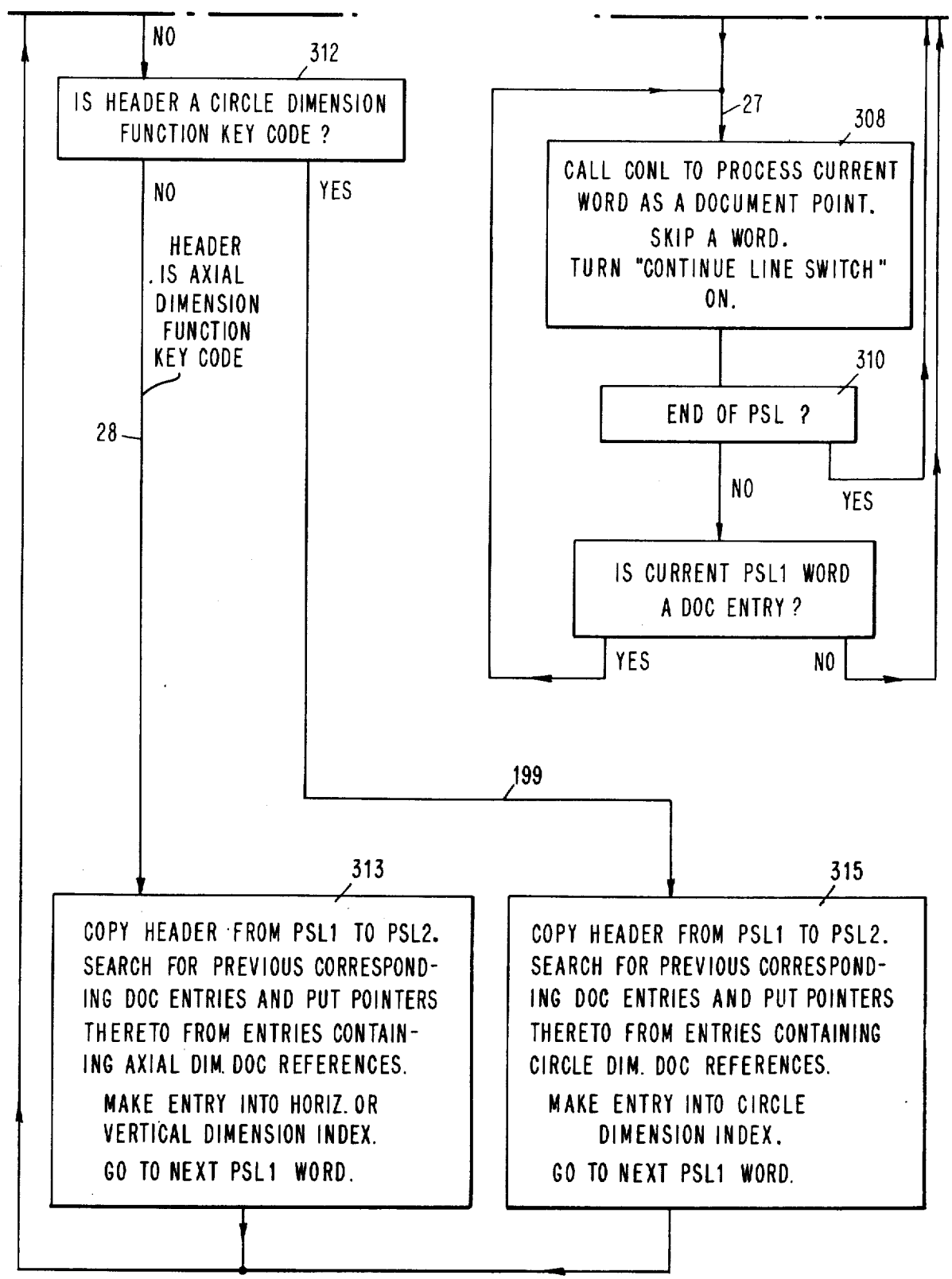

A flowchart of the PROP1 program is presented in FIGS. 13A, 13B and 13C, and an exemplary code listing of this program written in the FORTRAN programming language, is shown in FIGS. 18A to 18G. Eight other programs, respectively designated SRCH1, F, CONL, L, CHPTR, FIXPR, FIXCR and FXLDR, are callable directly or indirectly by PROP1 as circumstances require. Code listings for all of these programs are included herein, and flowcharts are presented for certain ones — PROP1, CONL, F, L and FIXPR.

At this point it should be explained that the PROP1 flowchart in FIGS. 13A to 13C is a simplified representation of the "PROP1" FORTRAN program listing in FIGS. 18A to 18G, and in some instances it has been necessary to modify sequences depicted in the FORTRAN listing in order to provide a more readily understandable flowchart. Hence, the correlations between the respective sequences depicted in the flowchart and in the code listing are not exact in all cases. Insofar as the end results of the various processes are concerned, however, the flowchart is accurate. Stating this another way, the flowcharts herein have been constructed with a view to simplicity rather than endeavoring to provide a rigorously exact representation of the program codes actually used. Numerous cross-references between flowchart lines and program statements have been provided in order to facilitate comparison.

When the term "PSL" is used hereinafter, it will refer (unless otherwise stated) to the "old" or original pointing sequence list, PSL1, which is the only pointing sequence list that exists at present.

Referring now to FIGS. 13A and 13B, the execution of the PROP1 program commences with an initialization step, represented by flowchart box 300, which involves clearing the dimension indices (FIG. 12) and resetting their pointers to zero. Upon completion of this initialization phase (represented in the actual programming by the statements preceding 13, FIGS. 18A and 18B), the execution of PROP1 proceeds to the step represented by flowchart box 301, FIG. 13A, at which point a test is made to determine whether the end of the pointing sequence list (PSL) has been reached. This test is made first to cover the case when the operator invokes the routine with an empty PSL1.

Assuming the PSL has entries to be processed, the program now proceeds along the "No" branch from box 301 to box 302, where the current PSL entry is tested to determine whether it is a function header (FIG. 7). Normally the PSL will commence with a function header of some kind, and it will be assumed that such is the case here. At subsequent times, when the operation returns to this point in the program (as it will on several occasions), there will be need to distinguish function headers from other PSL entries.

The next step in the process is to ascertain whether the function header is a "legal" key code, that is, one of the permissible function codes which the system is designed to handle. In the present embodiment it is assumed that four types of function headers are available — line function, axial dimension function, circle function and circle dimension function. If at step 303 it is found that the function header is not one of these permissible codes, the PROP1 program is aborted; otherwise it proceeds to the next step denoted by box 304, FIG. 13A, causing the current PSL1 word to be copied into PSL2 (the new pointing sequence list). Thus, the function header now appears at the same location in PSL2 that it occupies in PSL1.

At step 305 the "Continue Line Switch" (a conditional jump in the programming) is set to its "off" condition. This switch, in its normal "on" condition, will effectively relate the currently considered object point to the preceding object point as part of the same block of entries. The first point in a new block of entries should not (at least at this instant) be axially related to any previous point, however, so this switch must be turned off prior to processing the first point in the current block.

Next, one or more in a series of screening tests will be made upon the header code to determine which type of function is to be performed. Thus, box 306, FIG. 13A, indicates a test to determine whether or not the header calls for a line function. In the present example (FIG. 7) the PSL starts with a line function header; hence the program now branches to box 307, FIG. 13A, where the PSL address is advanced to the next PSL location; then the program advances to box 308, FIG. 13B, at which point the CONL subprogram is called to process the current PSL word and the next PSL word as the coordinates of a document point. The function of CONL is to generate entries for PSL2 (the new PSL) which will define document points on a "rectified" image of the object.

The CONL program will be described in detail hereinafter. For the present it will suffice to explain that each time CONL is called, it processes a pair of DOC entries from PSL1 (i.e., a pair of coordinates defining the position of a document point on the original sketch) in order to create a new pair of DOC entries for PSL2. In some instances CONL may cause one or both of the new DOC entries to be identical with one or both of the old DOC entries. In other instances (for example, where some axial realinement is needed) CONL may cause one or both of the new DOC entries to contain a pointer or pointers to some previously entered DOC word or words in PSL2, as symbolically represented by the arrows in FIG. 10. All of this will be explained more fully hereinafter.

After CONL has processed the first pair of PSL words or DOC entries in the current block (box 308, FIG. 13B), the PROP1 program sets the "Continue Line Switch" on to indicate that if the next pair of words after the current point are DOC entries, then they represent a point whose coordinates are to become interrelated for rectification purposes with those of the point whose DOC entries were just processed. The PSL address is skipped to the location immediately succeeding the pair of PSL words just processed, and at box 310 a test is made to determine whether or not this PSL location is at the end of the PSL. If not, the word stored in the current PSL location is analyzed to determine whether it is a DOC entry, i.e., one of the coordinates of a document point (box 311). If it is, the operation returns from box 311 to box 308 for again calling CONL to process another pair of DOC entries. This iterative loop is repeated until the end of the current series of successive DOC entries is reached, at which time the program branches back to box 301, FIG. 13A.

Referring again to box 306, FIG. 13A, if the header currently being analyzed is not a line function key code, then the test indicated by box 309 is made to determine whether or not it is a circle function key code. If it is, then the same procedure as described above in connection with boxes 307 and 308, FIGS. 13A and 13B, is followed to process the two coordinates for the current document point, which in the present case is the center of the circle. Rectification of a circle involves establishment of vertical alinement between the center point C and the surface point S, FIG. 27, these two points defining the position of the circle.

Referring once again to the part of the flowchart containing boxes 306 and 309, if the current header is neither a line function code nor a circle function code, it next is tested to see whether it is a circle dimension function code or an axial dimension function code (box 312). If it is an axial dimension header, it will be followed by a series of DOC entries specifying the coordinates of points relating to an axial dimension, such as the entries numbered 13 to 18 in FIG. 7, for example, which pertain to the horizontal dimension extending between points B and C, FIG. 2. The portion of the PROP1 program that handles the processing of DOC entries in an axial dimension block is represented by the flowchart box 313, FIG. 13B, which corresponds to the portion of the PROP1 program listing that commences with statement 28, FIG. 18E. Hereinafter these entries often will be called "DOC references" to distinguish them from the DOC entries 2 to 11 in the line block, FIG. 7.

Describing the action at step 313 in more detail, after the axial dimension header has been copied from PSL1 to PSL2, the SRCH1 program is called by PROP1 in order to establish equivalencies where appropriate among the coordinates specified in the axial dimension block and the line block, respectively, FIG. 7. Thus, for instance, the coordinates of points B and C specified by the DOC references 13 to 16 in the axial dimension block of PSL1 (the old PSL) will have the same values as the coordinates of points B and C specified by the DOC entries 4 to 7 in the line block of PSL1. In the new PSL (PSL2) pointers therefore should be placed in entries 13 to 16 relating them respectively as equivalent coordinates to entries 4 to 7. The SRCH1 subroutine which performs this function is represented in FIGS. 19A to 19D as a program listing written in 1800 Assembler language.

After these equivalencies are established, an entry is made into the appropriate dimensional index (FIG. 12) so that at the location therein designated by the assigned index number there will be a pointer to the PSL address which marks the beginning of the axial dimension block (e.g., address 12, FIG. 7). As each dimension block is processed, an appropriate entry is made in one of the dimensional indices. This enables the system to keep a numerical accounting of all stored dimensions, the purpose of this becoming apparent as the description proceeds.

A dimension block may contain many entries in addition to those indicated in FIG. 7, such as, for example, system-generated DOC entries locating the dimensional arrowheads, extension lines, etc. Such entries will be positioned subsequent to the characters of the dimension value string in the PSL.

Except for those DOC entries (or "references") in the dimension block which are to be given "pointers" to other DOC entries in the PSL, the old entries in the dimension block of PSL1 will simply be copied into the new dimension block of PSL2. This copying function is performed by the portion of the PROP1 program which includes the return from box 313, FIG. 13B, to box 302, FIG. 13A, and the iterative loop that includes the "No" branch from box 302 to box 314 and the return path from box 314 through boxes 301 and 302 to box 314, this loop being repeated until either the end of the PSL is reached or the end of the current PSL block is reached, whichever occurs first. If a new function header is encountered in PSL1, signifying the start of a new block, the program then branches to box 303 to start the processing of this new block.

Referring back to the decision box 312, FIG. 13B, if a circle dimension function header is detected, then the operation branches to box 315, corresponding to the portion of the PROP1 program that begins with statement 199 in the program listing, FIG. 18C. The circle dimension header is copied from PSL1 to PSL2. Then the SRCH1 program is called to provide pointers from the circle center and surface point DOC entries of the circle dimension block in PSL2 to the rectified circle center and surface point DOC entries of the circle function block of PSL2, which now represent these points in alined vertical relationship. An entry is then made into the circle dimension index, FIG. 12, with a pointer to the circle dimension header in the current PSL block, FIG. 7. The remainder of the current block processing operation is similar to that described above in connection with the axial dimension block, starting with the return to box 302, FIG. 13A, followed by the iterative action involving boxes 302, 314 and 301 for the purpose of copying all remaining words from the current PSL1 block to the corresponding PLS2 block, which action continues until a new function header (or the end of the list) is detected in PSL1. A new function header will start the processing of the next PSL1 block.

Eventually the end of the pointing sequence list is detected, as is signified in FIGS. 31A and 13B by an exit on the "Yes" branch from either box 301 or 310. At this stage the system will have completed the construction of the new pointing sequence list, PSL2, whose entries represent the rectified (but as yet unproportioned) object image. Next, at step 316, FIG. 13A, the system ascertains whether or not the image is to be proportioned. This is determined according to whether or not the PROP. key on the keyboard 36, FIGS. 1 and 4, has been selected by the operator. If the operator has selected the RECTIFY key rather than the PROP. key, then control of the operation will be returned to the calling program for a display of the rectified but unproportioned object. If the PROP. key has been selected, however, the program will advance to the proportioning procedure depicted by the flowchart in FIG. 13C, which corresponds to the part of the PROP1 program commencing with statement 45, FIG. 18F.

Before proceeding with a detailed description of the proportioning procedure, the results of the operations performed by the PROP1 program up to this point (using the example shown in FIG. 2) will be briefly reviewed. The line block in the new pointing sequence list PSL2 which was constructed during the execution of the program routines depicted in FIGS. 13A and 13B will differ from the line block in the old pointing sequence list PSL1 in the following significant respects:

The original horizontal coordinate $B_H$ has been replaced by a pointer to $A_H$, effectively bringing point B into vertical alinement with point A. The vertical coordinate $B_V$ remains unchanged, at least for the time being.

The original vertical coordinate $C_V$ has been replaced by a pointer to $B_V$, effectively bringing point C into horizontal alinement with point B. The horizontal coordinate $C_H$ remains unchanged, at least for the time being. The original horizontal coordinate $D_H$ has been replaced by a pointer to $C_H$, effectively bringing point D into vertical alinement with point C. The original vertical coordinate $D_V$ has been replaced by a pointer to $A_V$, effectively bringing point D into horizontal alinement with point A. In this connection it should be noted that D is the last significant point in the line string and therefore must be axially alined with the origin A. Point E, which will be discussed presently, is treated as a duplicate of the first point A. Inasmuch as point E is identical with point A, it is intended that the coordinates $E_H$ and $E_V$ of point E be replaced by pointers to $A_H$ and $A_V$, respectively, thereby effectively joining or merging point E with point A. The manner in which this actually is accomplished will be explained hereinafter.

In addition to the foregoing changes in the line block, the dimension blocks also will have been changed by the insertion of pointers in those dimensional DOC references which correspond to DOC entries in the line block.

In the case of circular objects, the procedure will be similar, though of a less complex nature. The horizontal coordinate of the surface point S will be pointed to the horizontal coordinate of the center point C to establish vertical alinement between these points.

Each of the various dimension indices (FIG. 12) now will have as many entries as there are dimensions of that respective type (axial horizontal, axial vertical or circle diameter). At this stage all of the dimensional index entries have an "inactive" status.

Assuming that the PSL commences with a line block defining an object to be proportioned, the PROP1 program now proceeds as indicated in FIG. 13C. The point defined by the first pair of DOC entries in the PSL is taken as the origin, and the fix bit is set to 1 in the horizontal coordinate of this pair (box 320). This fixes the horizontal coordinate of the origin. Once a coordinate is fixed, it establishes an immutable axial position to which any given dimension (or dimensions) along that same axis may be referred in order to determine the axial position of some other point (or points) on the object. Fixing any one coordinate automatically fixes all other coordinates that are "pointed" to it n PSL2. Thus, in the particular example shown in FIG. 2, fixing the horizontal coordinate $A_H$ of point A thereby also fixes the horizontal coordinate $B_H$ of point B, which points to $A_H$ in PSL2 (FIG. 10). With $B_H$ fixed, the horizontal dimension 15 between points B and C may then be utilized in due course to ascertain the horizontal coordinate which point C should have in the proportioned object (FIG. 3). This action will be explained presently.

With the horizontal coordinate of the origin A fixed (box 320, FIG. 13C), the PROP1 program now calls the F subroutine (to be described in detail hereinafter) in order to activate all horizontal dimensions that refer to the horizontal coordinate of the origin (box 322). The F subroutine first checks to see whether there are any inactive entries in the horizontal dimension index (FIG. 12). Since it is assumed herein that the object to be proportioned is one which is defined by lines and axial dimensions, each of the horizontal and vertical dimension indices will contain at least one entry, and initially all such entries are inactive. The F subroutine now activates all horizontal dimensions that refer to the horizontal coordinate $A_H$ of point A. Activation entails identifying all of those dimensions registered in the dimension index which define distances measurable from the fixed coordinate in question and moving such dimensional entries into the active part of the register (FIG. 12). In the simple example shown in FIG. 2, there is only one horizontal dimension. In practical situations there may be several dimensions which extend from the same coordinate, and all of them are activated concurrently. The activation sequence will be more specifically described hereinafter under the heading "F".

Referring again to FIG. 13C (in conjunction with FIGS. 2 and 12), the horizontal dimension index contains an entry corresponding to the horizontal dimension between points B and C, and since point B in the rectified image is alined vertically with the origin A, this dimension now is activated. There being no other horizontal dimension registered in this index in the present case, the PROP1 program now advances from step 322 to step 324, where it causes the fix bit to be set in the PSL word that defines the vertical coordinate of the origin A. Then, at step 326, the PROP1 program again calls the F subroutine to check the vertical dimension index and activate all vertical coordinates that refer to the point of origin. In this instance there is only one vertical dimension, i.e., the one between points A and B, and it now is activated.

The PROP1 program now calls the subroutine FIXPR to build the proportioned object (FIG. 3), using the horizontal and vertical dimensions and the line string coordinates stored in the "rectified" pointing sequence list PSL2, as indicated at boxes 328 and 330, FIG. 13C. The name "FIXPR" is an abbreviation of "fix projected coordinates", so called because the operations involved in this routine effectively determine the final fixed projections of the various points onto the two coordinate axes as a result of proportioning the object. The term "projected coordinate" refers to a PSL2 entry containing an actual coordinate value which is, in effect, the projection of a point upon one of the coordinate axes, as distinguished from a PSL2 entry which merely contains a "pointer" to another entry for indicating an axially alined relationship between two points. When a projected coordinate has been adjusted in accordance with the dimension, it is said to be "fixed". The FIXPR program will be described hereinafter.

Insofar as the proportioning process is concerned, it is immaterial whether the display or drawing to be prepared by the system contains one object or several objects. Differentiation between objects was important in the rectification process previously described, and for that reason the "Continue Line Switch" was turned off before the processing of each new block of PSL entries was begun (box 305, FIG. 13A), thereby preventing DOC entries for one object from being inadvertently pointed to DOC entries for other objects if such was not desired. No such precaution is necessary in carrying out the proportioning operations, because of the fact that these operations do not involve the establishment of new pointers among the existing DOC entries. Regardless of the number of separate objects to be proportioned in any one view, only one origin is utilized for that one view.

As mentioned hereinabove, the illustrative system herein disclosed has been designed on the assumption that straight-sided objects will be processed before circular objects are processed. (This merely characterizes the present embodiment and is not a conceptual limitation.) Accordingly, the dimensional indices (FIG. 12) are checked in the following order: axial horizontal dimensions, axial vertical dimensions and circular dimensions. When there are no more active axial dimensions registered in the horizontal and vertical indices, the system (operating under PROP1) then calls the FIXCR subroutine which checks the circle dimension index, and if an active entry is found there, the FIXCR subroutine (FIGS. 22A and 22B) fixes the vertical coordinate of the surface point (S) on each circle relative to the center point (C) of that circle, in accordance with the given vertical dimension (diameter) of the respective circle. This action is indicated at box 332, FIG. 13C.

The FIXPR and FIXCR routines cause the coordinates of points defining the position and configuration of each object to be fixed at values which are consistent with the dimension or dimensions specified for that object. Where necessary, the DOC entries in PSL2 which represented the configuration of the rectified but unproportioned object are changed to represent the configuration of the proportioned object in accordance with the given dimensions. These revised PSL entries then will be utilized by the system where it generates the drawing and/or display of the proportioned object or objects. The routines which are utilized for visually manifesting the constituent lines and circles of the objects in their final form are well known and are not disclosed herein.

Although the present disclosure is not concerned with the means utilized for generating visual manifestations of the various dimensions on the drawing or display, it will be noted briefly here that those system-generated portions of the dimension blocks in PSL2 which define the locations of dimension values, arrowheads, extension lines and the like must be revised to the extent made necessary by the reconfiguration of the object during the proportioning procedure. Box 334, FIG. 13C, denotes this rebuilding function which must be performed under control of the PROP1 program. When this has been accomplished, control is returned to the calling or supervisory program, which causes the plotter and/or display unit to produce the desired hardcopy drawing and/or display of the finished object presentation.

As an optional feature, an underdimension test may be performed as a final step in PROP1 before returning control to the calling program, or alternatively as an optional final step in the FIXPR subroutine (if FIXCR is not to be called), as will be explained hereinafter in connection with FIG. 16A.

The description of operations to this point has been concerned with the principal steps involved in executing the master program PROP1, which controls the rectifying and proportioning functions of the system. Attention now will be given specifically to the subprograms or subroutines that are directly or indirectly callable by PROP1 (FIG. 11) in the course of performing these functions.

CONL

During the rectification process, the new pointing sequence list, PSL2, is constructed, and "pointers" are placed at the appropriate locations in PSL2 to denote equivalencies among those entries which pertain to identical coodinates in the rectified object image. The subroutine which performs these functions is CONL, which is illustrated in flowchart form in FIGS. 14A and 14B. As explained above, each time CONL is called, it processes a pair of DOC entries from the old pointing sequence list (PSL1) to form a corresponding pair of entries in PSL2. Thus, each time a pair of DOC entries is to be processed, CONL is called by PROP1, as indicated at box 308 in the PROP1 flowchart, FIG. 13B. A FORTRAN code listing of the CONL subroutine is presented in FIGS. 26A and 26B.

Figure 14A:
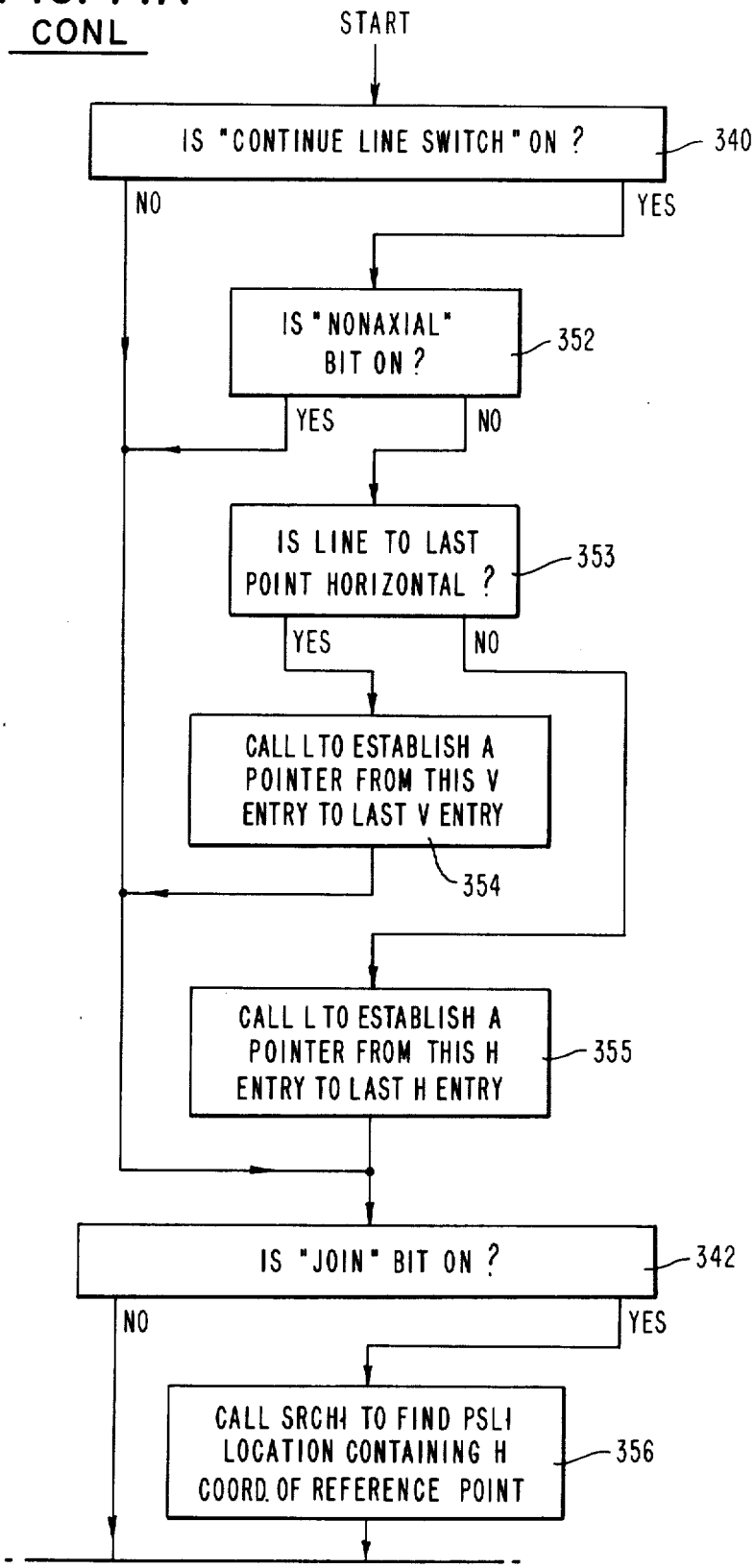
Figure 14B:
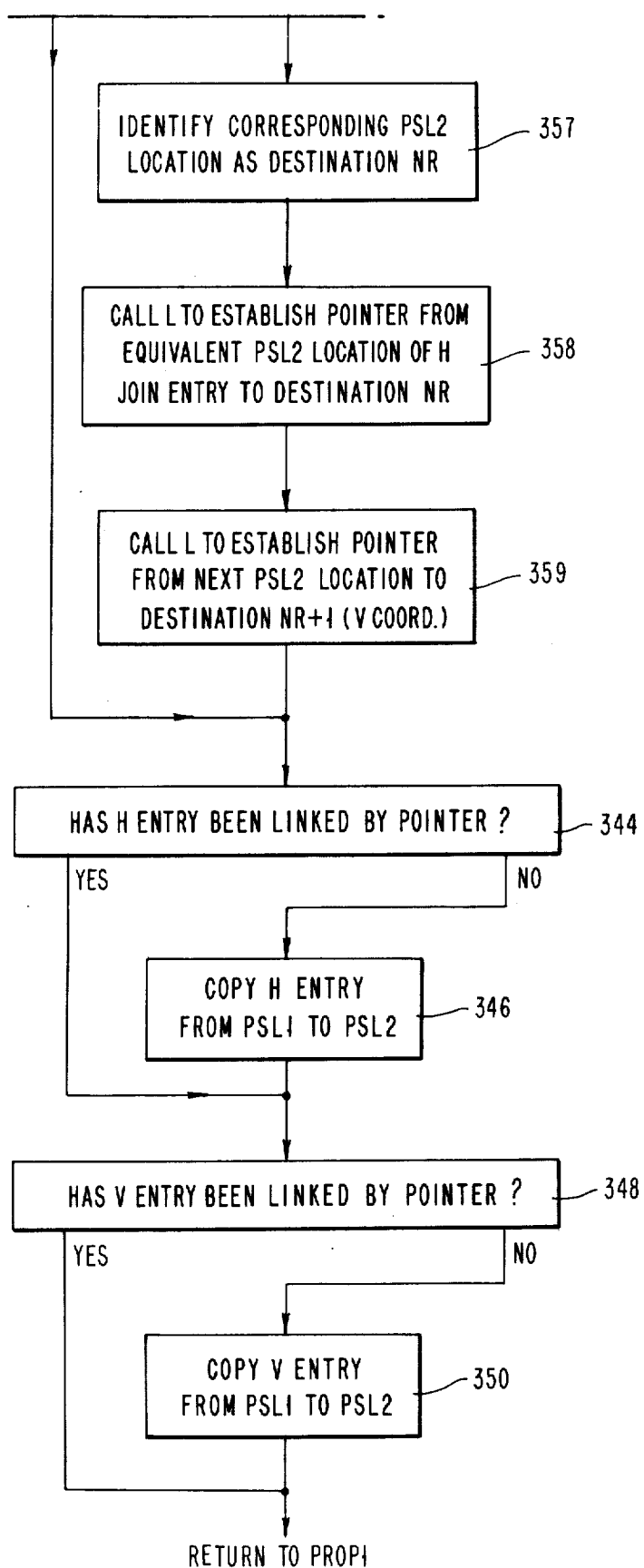

Now considering FIGS. 14A and 14B in detail, the CONL procedure commences with an inquiry as to whether the "Continue Line Switch" is on (box 340). Referring briefly again to FIG. 13B (box 308), the "Continue Line Switch" is off while the first two entries of each line or circle function block in the pointing sequence list are being processed (i.e., the H and V coordinates of the first point in a new string of document point entries). For the remainder of the string, this switch will be turned on to produce the necessary continuity between successively entered points for rectification purposes.

Accordingly, assuming that the first DOC entry in the block is now being processed, the "No" branch from box 340, FIG. 14A, is activated, and the next step is to determine whether the current entry contains an active "join" bit (box 342). As explained hereinabove in connection with FIG. 9 and FIG. 4, the data entry routine for the disclosed system is such that during the construction of PSL1 (the "old" pointing sequence list), the system establishes an identity between each of the terminal points of a string and any previously entered point which is situated very close to it. Usually this involves establishing an identity between the two points which begin and end the line string. However, there may be instances where the first and last points are not located close to each other, but each is located very close to a point on a previously entered object. In any event, where the system determines that a point in the current string is to be identified with any previously entered point situated in close proximity thereto, it sets to "1" the join bit in the H entry of the point that is about to be joined with a previously entered point.

In the present example it has been assumed that only the last point in the string will have an entry containing an active join bit. Hence, when the first entry is being processed, no join bit is detected, and the program accordingly branches from box 342, FIG. 14A to box 344, FIG. 14B, where the H (horizontal coordinate) entry for the current point on the object is tested to see whether it has been linked by a pointer to a previous DOC entry in the new pointing sequence list, PSL2. In the present instance, where processing of the DOC entries by CONL has just begun, no pointers will have been established as yet, so the program now branches along the "No" path from box 344 to box 346, FIG. 14B, which represents the step of copying the currently addressed H entry from the old pointing sequence list PSL1 to the corresponding location in the new pointing sequence list PSL2.

Next the program advances to the step represented by the box 348, FIG. 14B, where the V (vertical coordinate) entry for the current point on the object is tested to see whether it has been linked by a pointer to a previous DOC entry. As already explained, the answer to this inquiry must be negative when the point being processed by CONL is the first point on the object. Thus, the "No" branch to box 350 is now taken by the program, and the aforesaid V entry is copied from PSL1 to PSL2, after which the CONL subroutine terminates, and the system then returns to the control of the PROP1 program.

Each time the control of the system is passed back to PROP1 from CONL, the PSL1 address to be referenced by PROP1 is skipped one word to the second succeeding PSL location. This is because CONL processes two PSL entries at a time, one being the H entry and the other being the associated V entry for the point that is currently being processed. Hence, when PROP1 resumes control, the address now must be skipped over the PSL location of the V entry just processed to the H entry location for the next point to be processed. This is indicated in the box 308, FIG. 13B. As another incident to this action, the "Continue Line Switch" is turned on, thereby informing the system that when subsequent entries in the current PSL block are being processed by CONL, the necessary axial alinements (i.e., "pointers") will have to be established as appropriate for rectification purposes among the DOC entries in the new pointing sequence list PSL2. During the subsequent iterations involving boxes 308, 310 and 311 (FIG. 13B) which will occur in the remaining sequence of CONL operations, the repeated instruction to turn on the Continue Line Switch will merely be superfluous, inasmuch as the switch will not again be turned off until a new block of PSL entries is due for processing (box 305, FIG. 13A).

Following the processing of the first pair of DOC entries defining the H and V coordinates of the first point in the current PSL block and the subsequent performance of tests to determine whether there are more DOC entries in the current PSL block to be processed (boxes 310 and 311, FIG. 13A), control again is given to the CONL subroutine (box 308) to process the next pair of DOC entries or words defining the H and V coordinates of the next point on the object to be rectified. This time the Continue Line Switch is on, so the CONL procedure now advances from step 340 to step 352, FIG. 14A, where a test is made to determine whether the line that extends between the current document point and the preceding document point is to be axial or nonaxial. If it is to be nonaxial the H entry for the current point in PSL1 contains a 1 bit in its No. 3 position (FIG. 9). In this event, no attempt is made to establish pointers representing axial alinements and the program branches from box 352 to box 342, FIG. 14A. In the present example, however, it is assumed that all lines are meant to be axially directed, so that in this case the action proceeds along the "No" branch from box 352.

There now follows a sequence of steps 353, 354 and 355 for establishing the necessary pointer in one of the two PSL2 entries corresponding to the pair of PSL1 entries being processed. In many if not most cases the point on the rough sketch of the object represented by the currrent pair of H and V entries is PSL1 is not axially alined with the point represented by the immediately preceding pair of PSL1 entries, even though such axial alinement was intended when this rough sketch was drawn (FIG. 2). Regardless of whether or not such axial alinement was achieved in drawing the rough sketch, the system proceeds to establish pointers in the PSL2 entries as appropriate to insure that axial alinements are defined wherever necessary in the rectification process.

Referring again to the CONL flowchart, FIG. 14A, a test is made at step 353 to determine whether a horizontal or vertical alinement is to be defined between the current point and the preceding point. This depends upon whether a line drawn between the two points being considered on the original rough sketch would be inclined more than 45 degrees from the horizontal axis or would have a lesser inclination from that axis. If the inclination is more than 45°, a vertical alinement has to be defined; otherwise a horizontal alinement has to be defined. Thus, if a line AB on the original sketch is so oriented that the absolute difference between the horizontal coordinates $A_H$ and $B_H$ is equal to or greater than the absolute difference between the vertical coordinates $A_V$ and $B_V$, then the line AB must be defined as "horizontal"; otherwise it is "vertical", regardless of its original orientation.

If the test at step 353, FIG. 14A, determines that a horizontal alinement is required, then at step 354 the CONL subroutine calls the "L" subroutine to establish a pointer from the PSL2 entry defining the V coordinate of the current point to the PSL2 entry defining the projected V coordinate of the preceding point, thereby effectively equating these two V coordinates. (The L subroutine will be described hereinafter in connection with FIG. 15.) The establishment of a pointer in a PSL2 entry which does not already contain a pointer involves two actions: (a) setting the pointer bit in the No. 2 position of this word to its "1" value (FIG. 9), and (b) placing in bit positions 4 to 15 of this word the address of the PSL2 entry in which is contained the corresponding projected coordinate of the reference point with which the current point is being axially alined.

If the test at step 353, FIG. 14A, shows that a vertical alinement is required, then at step 355 the CONL subroutine calls the L subroutine to establish a pointer from the PSL2 entry defining the H coordinate of the current point to the PSL2 entry defining the projected H coordinate of the preceding point, thereby effectively equating these two H coordinates In either event, the next step in the procedure (342) is to ascertain whether a joinder is required by testing the "join" bit in the H entry of the current pair of PSL1 entries. For point B, no join bit is found (that is to say, the join bit is zero), so the program then branches to step 344, FIG. 14B, thereby commencing the series of steps already described to some extent hereinabove and involving the flowchart boxes 344, 346, 348 and 350.

Specifically, the H entry of the current pair of PSL2 entries is checked at step 344 to determine whether it has been linked by a pointer to a previous PSL2 entry thereby indicating a condition of vertical alinement. If the H entry contains such a pointer, the operation then advances immediately to step 348, FIG. 14B, where the companion V entry is checked to determine whether it has been linked by a pointer to a previous PSL2 entry thereby indicating a condition of horizontal alinement. As a general rule, except for the first pair of entries in a block or the case of a nonaxial relationship, at least one of the pair of PSL2 entries currently under consideration will contain a pointer that was established previously in step 354 or step 355, FIG. 14A, to indicate a condition of horizontal or vertical alinement, as the case may be. There is no need to do anything further with such an entry. However if either one of the two PSL2 locations currently being tested does not contain a pointer, then it is necessary to copy into that PSL2 location the word that is stored in the corresponding PSL1 location, as indicated at box 346 or 350, FIG. 14B.

As a specific example, referring to the object shown in FIG. 2, the pair of DOC entries in PSL1 defining the original position of point B cannot be copied without change into PSL2 because point B is meant to be vertically alined with point A. Hence, in PSL2, a pointer must be established from the $B_H$ entry to the $A_H$ entry, and the $B_H$ entry in PSL1 therefore is not copied into PSL2. However, the $B_V$ entry is to remain unchanged during rectification inasmuch as it is not determined by or conditioned upon an axial relationship or a joinder. Hence, the $B_V$ entry is copied from PSL1 into the corresponding PSL2 location. After three actions have taken place, the system then returns to the control of the PROP1 program at least for the time being.

Where two adjacent nonjoined points in the sequence are in a nonaxial relationship, neither of the PSL2 DOC entries for the second point of this pair will contain a pointer. However, an entry for a succeeding point may contain a pointer to one of the entries for said second point, if an axial alinement exists. It is not mandatory that there be a pointer to or from every DOC entry in PSL2.

Thus far no detailed consideration has been given to the "joining" function which is depicted in the series of flowchart boxes 356 to 359, FIGS. 14A and 14B. Referring again to flowchart box 342, if the H entry in the pair of PSL1 entries being processed by CONL has its join bit set to 1, the joining procedure depicted in boxes 356 to 359 is invoked. At this stage there will be in PSL1 two H entries having identical values and two V entries having identical values. What is desired is that in the new pointing sequence list PSL2 one of the duplicate H values shall be replaced by a pointer to the other, and similarly, that one of the duplicate V values shall be replaced by a pointer to the other. This is consistent with the general plan whereby entries which are equivalent to one another are linked by pointers in PSL2 rather than being duplicated in this pointing sequence list, so that any subsequent change of one entry in such a group will effectively change all other members of the same group that are mutually linked by pointers.

As indicated at box 356, FIG. 14A, the joining procedure commences with a call to the SRCH1 subroutine (FIGS. 19A to 19D) to find the PSL1 location containing the H coordinate of the "reference point", i.e., the point with which the current point is to be joined. For instance, in FIG. 2, the reference point would be A, since this is the point to which E will be joined. When this reference location in PSL1 is found then the address of the corresponding location in PSL2 is identified by CONL as the "Destination NR" as indicated at flowchart box 357, FIG. 14A.

Subroutine L (described hereinafter) now is called (at step 358, FIG. 14B) to establish a pointer originating at the PSL2 location corresponding to the PSL1 address of the current H entry and directed to the PSL2 location identified by the Destination NR. In terms of the example illustrated in FIGS. 2, 7 and 10, the pointer will extend from location 10 in PSL2 (which corresponds to PSL1 location 10 at which $E_H$ is stored) to location 2 in PSL2 at which $A_H$ is stored, thereby effectively identifying $E_H$ with $A_H$.

At step 359, FIG. 14B, subroutine L again is called to establish a pointer from the PSL2 location next succeeding the one that was associated with the aforesaid H entry to the PSL2 location whose address is "Destination NR+1". As applied to the present example, this means that the L subroutine will endeavor to establish a pointer from the PSL2 location numbered 11, FIG. 7, to the PSL2 location numbered 3, thereby effectively identifying the vertical coordinate $E_V$ of point E (FIG. 2) with the vertical coordinate $A_V$ of point A. However, the $E_V$ entry at PSL2 location No. 11 already has a pointer to PSL2 location No. 9 where the $D_V$ entry is stored, due to the process of rectifying line DE which occurred earlier in the execution of the program CONL. (See FIG. 10) With the word structure that is being used in the presently disclosed system, a PSL location cannot point to more than one other PSL location; hence there cannot be two pointers going from the $E_V$ entry to the $D_V$ and $A_V$ entries, respectively. However, inasmuch as $E_V$ points to $D_V$, and the $D_V$ entry at this time does not yet contain a pointer to some other entry, it is possible to place in the $D_V$ entry a pointer to the $A_V$ entry, thereby effectively providing a pointer from $E_V$ to $A_V$, as indicated in FIG. 10.

Completion of the joining process at step 359 is followed by the execution of steps 344 and 348, FIG. 14B. Inasmuch as both the H and V entries have been linked by pointers to other entries, there is now an exit from CONL and a return to PROP1. If the point just processed was the last point in the current PSL block, CONL will not be called again until a new line block or circle block is processed for rectification.

L

The L subroutine is called by CONL whenever a new pointer is to be established among PSL2 entries during the rectification process. A flowchart of the L subroutine is shown in FIG. 15, and a FORTRAN program code listing for this program is presented in FIG. 25.

The first step in the L procedure, represented by the flowchart box 360 in FIG. 15, is to determine whether or not the PSL2 location presently designated as the "start" location for the new pointer already contains an existing pointer established during some previous run of the L program. For example, referring to FIGS. 2 and 10, a pointer will be assumed to extend from the PSL2 location containing the $E_V$ entry (vertical coordinate of E) to the PSL2 location containing the $D_V$ entry (vertical coordinate of D), such pointer having been established previously in the portion of the CONL program represented by the flowchart boxes 353 and 354, FIG. 14A. Then, in the portion of the CONL program represented by the flowchart box 359 (which is part of the joining procedure), an attempt is made to establish a new pointer from the $E_V$ entry to the $A_V$ entry, but since the $E_V$ entry already contains a pointer to $D_V$, the pointer to $A_V$ must start from some location that is linked to the $E_V$ entry rather than from the location storing the $E_V$ entry itself. This detection is made by the L routine.

Thus, referring again to box 360, FIG. 15, if the start location already has a pointer, then a branch is taken to box 362 for following the existing pointer (or successive pointers, if necessary) to a PSL2 location that stores a coordinate value (the $D_V$ entry in the case). When such a location is found by this process, it is designated "S". If the start location contains no pointer, then (as indicated by box 364) this location immediately is designated S without further action.

Next, at step 366, it is determined whether the PSL2 location selected as the destination for the current pointer already contains a pointer to a different PSL2 location. If not, the selected location is designated "D", as indicated at box 368, FIG. 15. Otherwise, as indicated at box 370, a procedure is invoked for following the pointer from the selected location to a location where a coordinate value is stored, and when found, such location is designated D.

Then, at step 372, FIG. 15, a test is made to see whether the designations S and D have been applied effectively to the same PSL location. In practice this would occur only rarely, if at all, but the test is made nevertheless for a reason which will become apparent presently. If no such identity between the S and D locations is found (the usual case), then at step 374 the L program inserts at location S a pointer to location D, overwriting any coordinate that might have been entered previously into location S. Following this action, control is returned to the CONL subroutine. In the case where S and D are found to exist at the same location, however, it is not desirable that the coordinate at this location be overwritten, and a pointer moreover would be unnecessary in this instance; accordingly the step 374 is bypassed under these circumstances as indicated in FIG. 15.

SRCH1

SRCHL is a search routine which is employed when it is desired to find a previous entry containing coordinate values approximately the same as the coordinate values in the entry currently being considered. A program code listing for SRCH1, written in 1800 Assembler language, is shown in FIGS. 19A to 19D. When SRCH1 finds a referenced point at input time, the coordinates of the new point are made the same as those of the referenced point in order to facilitate the same search at proportioning time.

SRCH1 is callable by CONL as part of the joining procedure described hereinabove. See flowchart box 356, FIG. 14A. It also may be called by PROP1 in the process of establishing identity between DOC references in a dimension block and DOC entries in a line or circle block (flow-chart boxes 313 and 315, FIG. 13B).

F

The F subroutine (FIGS. 17, 20A & B) is employed to "activate" horizontal and vertical dimensions. The functions of the subroutine F were partially explained hereinabove in connection with the description of the proportioning procedure represented by the flowchart of FIG. 13C. Each time F is called, it will activate all of those dimensions in a specified horizontal or vertical dimension index register which refer to a given "fixed" coordinate, i.e., a coordinate designating a fixed axial reference position from which (or to which) one or more dimensions along that axis may be measured. Activating a dimension causes its address or location in the respective dimension index register to be changed from an inactive part of the register to an active part of the register, where it later will become effective in due course to fix another coordinate.

The function of the F subroutine will be explained first in connection with the process of activating those dimensions which refer to the fixed coordinates of the origin. It will be understood that a similar process is executed by the F subroutine to activate the dimensions which refer to each of the other coordinates which become fixed during the proportioning operations. Assume now that the horixontal coordinate of the origin A (FIG. 2) has just been fixed as indicated in flowchart box 320, FIG. 13C, of the PROP1 program. Now (in box 322) the subroutine F has been called to activate any and all horizontal dimensions which refer to the origin. In the present example (FIG. 2) there is only one horizontal dimension, designated by the reference number 15, which extends between points B and C, and since the PSL2 entry for the horizontal coordinate $B_H$ points to the PSL2 entry for the horizontal coordinate $A_H$ (FIG. 10), the horizontal dimension 15 refers to $A_H$, the horizontal coordinate of the origin. Hence, this dimension now should be activated by F.

Figure 17:
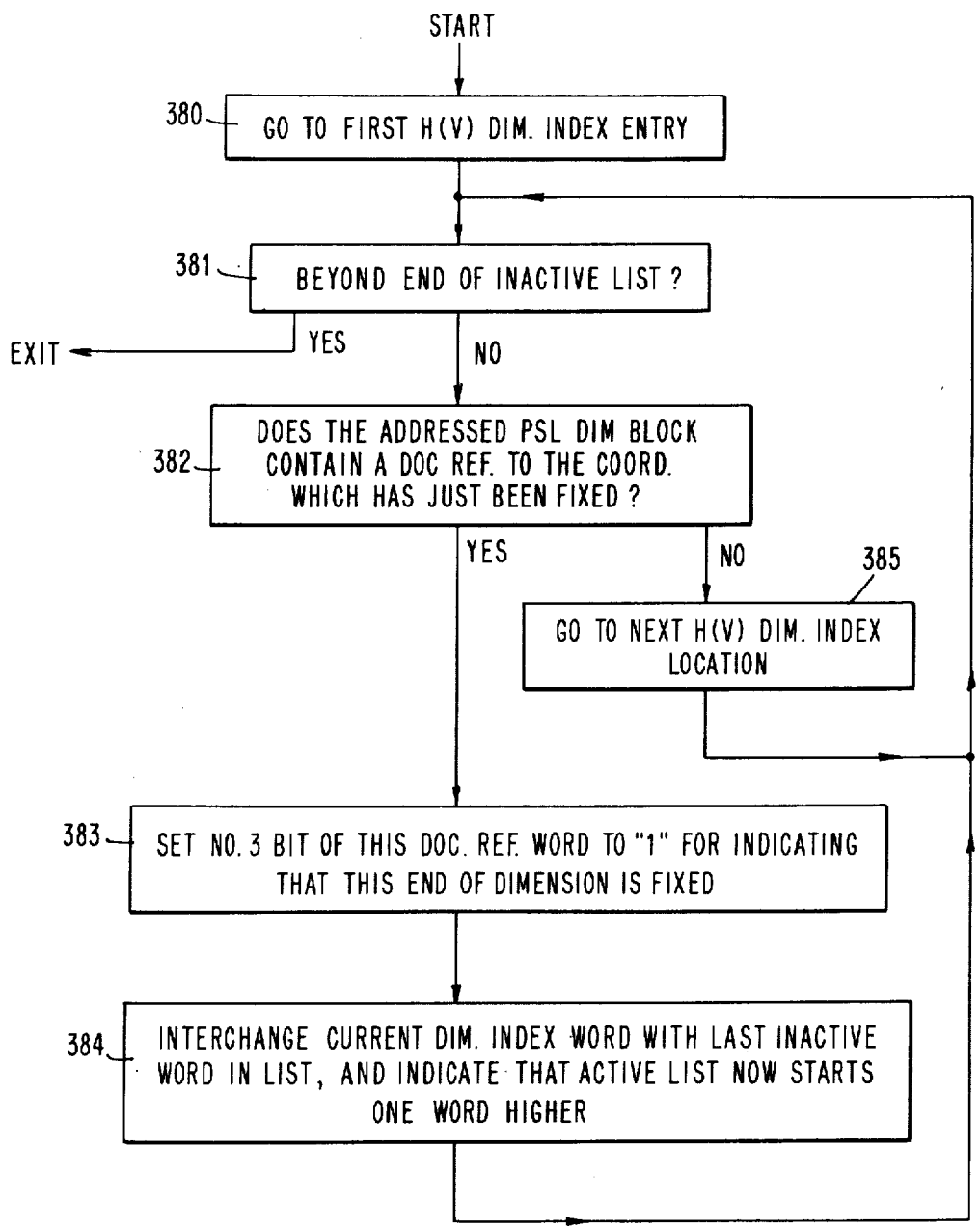

Referring to the F flowchart, FIG. 17, this subroutine is initiated by testing the first entry in the horizontal or vertical dimension index (as the case may be) to determine whether it is inactive (boxes 380 and 381). If the entry is located above the indicator which separates the inactive dimensional index entries from the active (FIG. 12), the operation then progresses along the "No" branch from box 381 to box 382, where the PSL dimension block that is being addressed by the current index entry (FIG. 7) is tested to ascertain whether it contains a DOC reference to the coordinate which has just been fixed.

In terms of the example presently being considerered, the first (and only) entry in the horizontal dimension index relates to the dimension 15, FIG. 2, and it addresses the axial dimension block shown in FIG. 7, which commences at PSL location 12. The coordinate which has just been fixed is the horizontal coordinate $A_H$ of the origin A (at PSL location 2), and as explained above, there is a pointer to $A_H$ from PSL location 4 storing the $B_H$ entry in the new pointing sequence list PSL2. The dimension block contains a DOC reference entry for $B_H$ (PSL location 13) to denote one end of the horizontal dimension currently being considered, which extends horizontally between points B and C, FIG. 2. Hence, referring again to flowchart box 382 in FIG. 17, the response to this inquiry is "Yes", meaning that there has been found a DOC reference to the fixed coordinate. In this case the DOC reference entry is at PSL2 location 13, which is pointed to location 4, which in turn points to location 2 where the $A_H$ coordinate value is stored.

When a DOC reference to the fixed coordinate is found, then (at step 383, FIG. 17) the No. 3 bit in this word is set to "1", thereby indicating that this end of the dimension is now fixed. It will be recalled that in describing the data word structure for a DOC entry in a line block (FIG. 9), mention was made hereinabove that the No. 3 bit position in a DOC entry word in the new PSL serves as an indicator of whether the coordinate value contained in this word is fixed or not. By analogy, the No. 3 bit position in a DOC reference word in the dimension block (which has a structure similar in many respects to that of a DOC entry word) likewise may serve to indicate whether the respective end of the dimension goes to a fixed coordinate. A distinction must be observed here. A DOC reference word in a dimension block of the new PSL does not itself contain a coordinate value but only a pointer to the DOC entry word in the line block which contains the coordinate value. Therefore, the "fixing" of a DOC reference word does not involve fixing a coordinate (which already has occurred in a previous step). Fixing DOC reference words by setting their No. 3 bits to 1 readily identifies these entries as being ones which point to fixed coordinates, and this will expedite the task of proportioning, as will be explained presently in describing the FIXPR subroutine.

Referring again to FIG. 17, after the DOC reference word in PSL2 has been fixed, there now takes place a relocation of entries in the dimension index register as indicated in flowchart box 384. Thus, the current dimension index word is interchanged with the last inactive word in the list, and the indicator which separates the inactive entries from the active entries in the dimension index (FIG. 12) is moved up one word. This places the most recently activated dimension in the first position in the active list (i.e., at the top of the active list as viewed in FIG. 12). In the present example, where only one horizontal dimension is involved, the index entry for this dimension is not actually moved, and the indicator is merely moved ahead of it to show that the entire list is now active.

If there are a number of inactive index entries, the operation now returns to step 381, FIG. 17, and thence to step 382, where the inactive entry which just recently was moved into the currently addressed position is tested to see whether its PSL dimension block contains a DOC reference to the coordinate that most recently was fixed. If it does, the operation then progresses through steps 383 and 384 as described above to activate the dimension under consideration and to indicate which of its ends is pointed to the fixed coordinate. If the currently addressed PSL dimension block contains no reference to the recently fixed coordinate, then at step 385 the index address is moved to the next location in the dimension index register. If the next entry is an inactive one, it is tested to see whether its dimension refers at either end thereof to the fixed coordinate currently under consideration, and the operation thereafter progresses as described hereinabove in connection with FIG. 17.

The purpose of the foregoing procedure is to identify all dimensions which refer to the fixed coordinate in question, which in the present instance is the horizontal coordinate of the origin but which subsequently will be other coordinates as they become fixed during the proportioning process, with F being repeatedly called as required to activate the dimensions referring to those coordinates.

After all of the remaining inactive dimension index entries have been examined to determine whether or not they should be activated with reference to the most recently fixed coordinate, the test at step 381, FIG. 17, now indicates that the scanning of the inactive list for that particular purpose is complete, and the program then exits from the F subroutine and returns to whichever program had called it, whether it be PROP1 as described above or FIXPR, which now will be described.

FIXPR

The subroutine FIXPR is employed as part of the proportioning process (boxes 328 and 330, FIG. 13C) to fix the remaining horizontal and vertical coordinates of a line string relative to the fixed origin coordinates in accordance with the specified dimensions. If the object to be proportioned is other than a line string (i.e., a circle in the present embodiment), the calling of FIXPR will be without effect, and the PROP1 program then will call FIXCR (box 332, FIG. 13C), which performs a proportioning function with respect to a specified diameter analogous to the action of FIXPR in fixing the vertical coordinates of a line string according to the specified vertical dimensions.

Figure 16A:
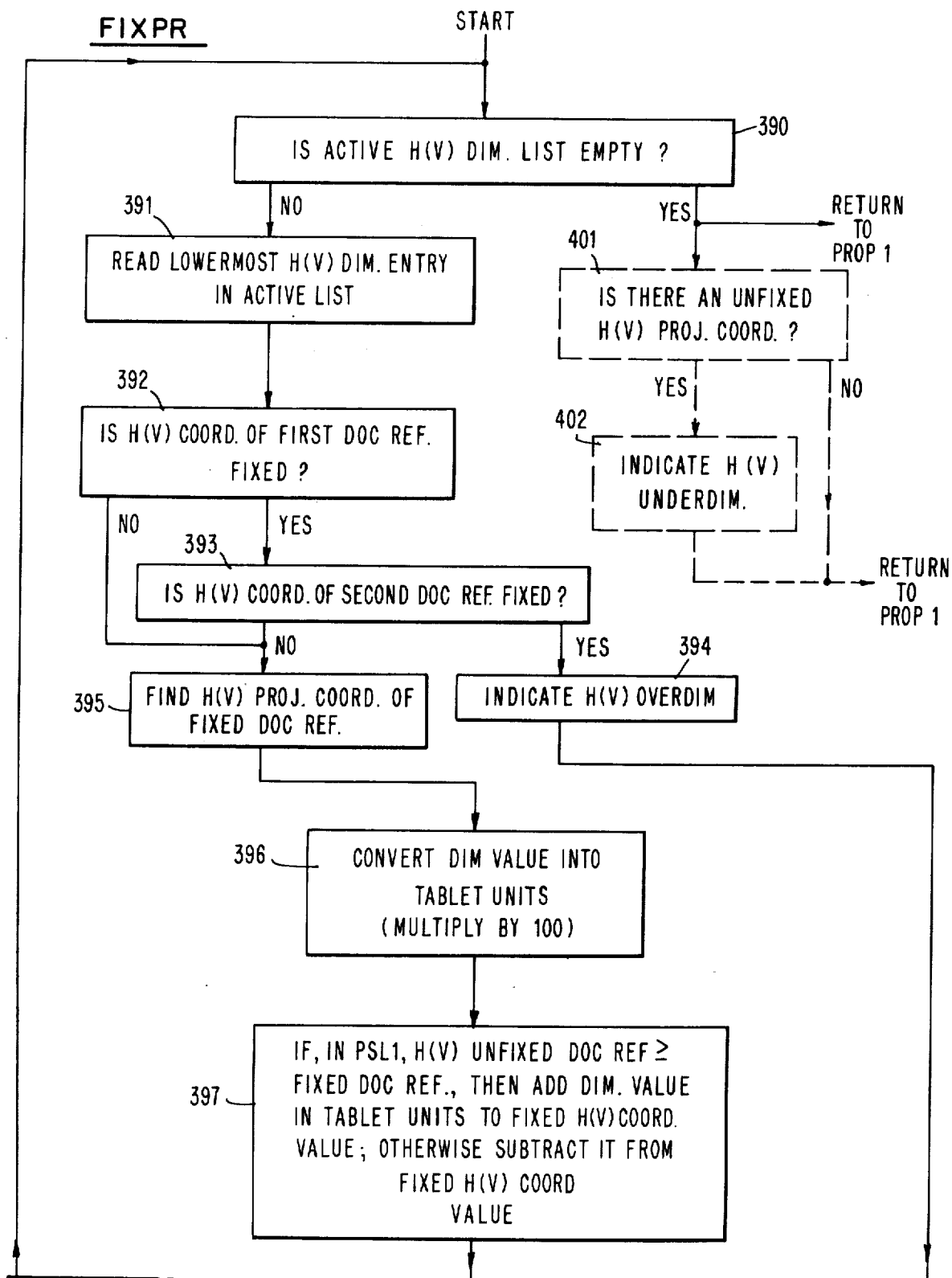
Figure 16B:
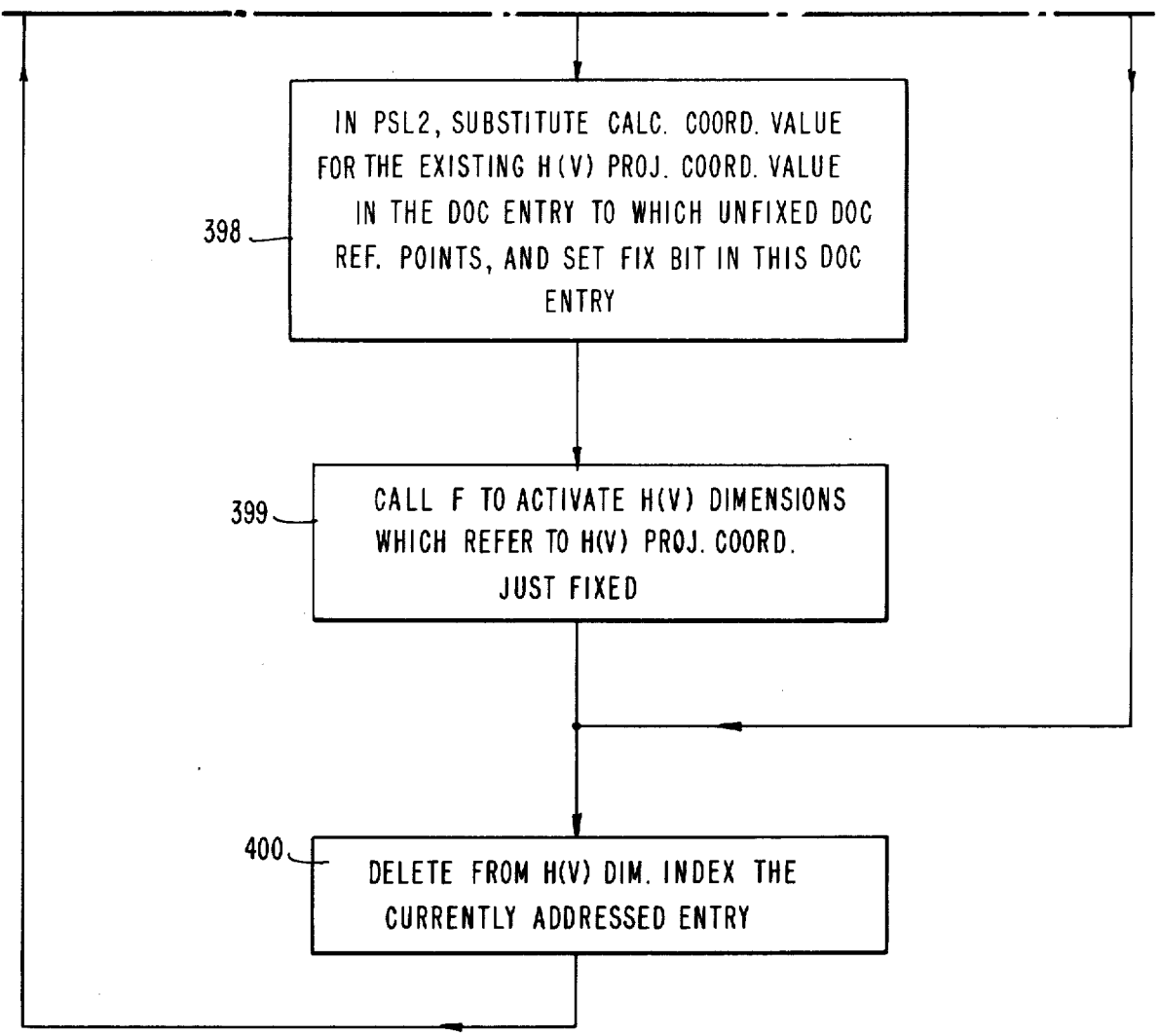

A flowchart of the FIXPR subroutine is presented in FIGS. 16A and 16B. A FORTRAN code listing for this program is shown in FIGS. 21, 21B and 21C. As explained above, "FIXPR" is an abbreviation of "Fix Projected Coordinates".

The rectification process previously performed by the CONL subroutine created a new pointing sequence list PSL2 wherein those PSL entries which relate or refer to the same axial position are logically interconnected by pointers. Thus, for example, referring to FIG. 7 in connection with FIGS. 2 and 10, the DOC entries at PSL locations 2, 4 and 10 in the illustrated line block, and the DOC reference word at PSL location 13 in the illustrated axial dimension block, are all interrelated by pointers in PSL2, because all of those entries designate a single position on the horizontal axis which is the common projection thereon of the points A, B and E, now vertically alined. Only one of these entries, however, namely the one at location 2, actually contains a coordinate value (in this case, the value of the horizontal coordinate $A_H$ of the origin A). Hence, this is the only one of the interrelated entries that defines the position on the horizontal axis to which the vertically alined points may be projected. The term "projected coordinate" therefore refers only to a PSL2 DOC entry which contains an actual coordinate value, not to an entry containing a pointer, even though the latter refers to the former. A projected coordinate involved in an axial relationship is common to a plurality of PSL2 entries; however, a projected coordinate also may be unique (e.g., where there is a junction between two nonaxial lines).

The function of FIXPR, as its name implies, is to fix the projected coordinates in accordance with the dimensions. This operation necessarily fixes the coordinates of all points alined with the point whose coordinate is being fixed. Fixing a coordinate involves overwriting the previous value of the projected coordinate in the respective PSL entry, because the rectified version of the original rough sketch generally does not position the points of the line string in a manner consistent with the stated dimensions, and the coordinates of these points therefore must be corrected according to the dimensions wherever necessary. When a projected coordinate has become fixed, this is signified by setting the "fix" bit in the No. 3 position of the DOC entry word to "1" (FIG. 9).

Referring now in detail to the FIXPR flowchart shown in FIGS. 16A and 16B, the process of fixing the projected coordinates commences at step 390 with an inquiry as to whether or not there are any active entries in the horizontal or vertical dimension index. The term "H(V)" will be used in this flowchart to designate either horizontal or vertical, whichever applies. As previously indicated in the proportioning flowchart, FIG. 13C, relative to boxes 328 and 330, FIXPR is called twice. The first time it is called to fix those horizontal coordinates which remain unfixed after the horizontal coordinate of the origin has been fixed. The second time it is called to fix those vertical coordinates which remain unfixed after the vertical coordinate of the origin has been fixed. Hence "H(V)" is to be interpreted as meaning either horizontal or vertical, as the case may be, but not both.

In the normal case there will be at least one active entry in the H or V dimension index at the time when FIXPR is called, and it will be assumed that this is the case here. (Subsequently herein consideration will be given to the abnormal situation in which the active dimension list has been exhausted while there still remains a coordinate to be fixed.) Hence, in the present instance the operation proceeds to step 391, FIG. 16A, where the lowermost entry in the active part of the dimension index is read. This index entry points to a particular dimension block in PSL, FIG. 7.

Within the currently addressed PSL dimension block there will be two DOC reference words which define the two end positions of the currently indexed dimension. Thus, as an example, in the PSL shown in FIG. 7 the DOC reference words at PSL locations 13 and 15 define or point to the axial positions $B_H$ and $C_H$ between which the horizontal dimension 15, FIG. 2, is supposed to extend.

Previously, when the horizontal coordinate $A_H$ of the origin A was fixed and the subroutine F was called to activate the horizontal dimensions referring to the origin A (boxes 320 and 322, FIG. 13C), it was ascertained that the DOC reference word at PSL location 13, FIG. 7, pointed to the DOC entry at location 4, which had been assigned to the $B_H$ coordinate, and that this in turn pointed to the DOC entry at location 2 which stores the $A_H$ coordinate value. This led to the fixing of the DOC reference word at location 13 (box 383, FIG. 17). Hence, the current status of the dimension block represented in FIG. 7 is such that the DOC reference word at location 13 (i.e., the $B_H$ reference) is fixed, but the DOC reference word at location 15 (i.e., the $C_H$ reference) is not yet fixed. This will be the usual situation; the active dimension will refer to a pair of DOC references, of which only one is fixed at this time.

There now is performed a sequence of steps for the purpose of fixing one or more previously unfixed coordinates, using the dimensions in the active portion of the H(V) dimension index. Thus, at step 392, FIG. 16A, the axial dimension block in PSL2 which is addressed by the H(V) dimension index entry that was just read is now checked to determine whether the first of the corresponding DOC reference points is fixed. The terms "first" and "second" as used in this context will have different meanings for H and V dimensions. In the present example, the dimension under consideration extends horizontally between document points B and C; hence the "first" and "second" DOC reference points are the words stored at PSL locations 13 and 15, respectively, FIG. 7, which point to the DOC entries for $B_H$ and $C_H$ in PSL locations 4 and 6, as explained above. If document points B and C had been vertically rather than horizontally alined, and the dimension from B to C had been vertically directed, then the "first" DOC reference point would have been the word stored at PSL location 14, and the "second" DOC reference point would have been the word stored at PSL location 15, since these words point respectively to the $B_V$ and $C_V$ DOC entries.

If the H(V) coordinate of the first DOC reference point is found to be fixed, this means that the projected coordinate to which this word points may serve as a base position for calculating the proper position of the unfixed coordinate at the second end of the dimension. That is to say, if the first point (e.g., B) can be considered fixed in its position along the axis in question, then the proper position of the second point (e.g., C) along that axis is determinable by performing an algebraic addition of the first coordinate value and the dimension (expressed in tablet units of, say, hundredths of an inch). On the other hand, if the first DOC reference point is not fixed, then it must be the second DOC reference point which is fixed, since an active dimension has at least one fixed end; and the value of the coordinate at the second end of the dimension then is to be used as a base for calculating the true value of the first end coordinate. The procedure has the same objective in either case, namely, to fix the hitherto unfixed end coordinate of the dimension in question.

If by chance it should be found that the DOC references at both ends of the same dimension are fixed at this time, this is an abnormal condition because it means that the position of a given document point has not been uniquely specified. In the embodiment herein contemplated, this is deemed undesirable. Accordingly, if the tests performed at steps 392 and 393, FIG. 16A, show that both of the DOC references in question already have been fixed, then an "overdimension" indication is generated at step 394. This need not cause the proportioning process to be aborted, however. In the present system, when an overdimensioned condition is detected, the dimension currently under consideration is disregarded as superfluous (with a warning to the operator, however, so that he may check the redundant dimensions for inconsistency or to make a choice among them). Having found that one of the currently addressed DOC references is fixed and the other is not, the program now advances to step 395, FIG. 16A, for finding the projected coordinate to which the fixed DOC reference points. In the present example, where the DOC reference word at PSL2 location 13 is the one that is fixed, the projected coordinate will be $A_H$ stored at location 2, to which location 13 ultimately points (via location 4). This will be a fixed end coordinate of the dimension. The value of the coordinate $A_H$ subsequently will serve as the base for determining the true value of the other end coordinate $C_H$, which is unfixed as yet.

Next, at step 396, FIG. 16A, the current dimension value is converted into "tablet units", i.e., grid mesh positions, in order to be compatible with the coordinate values which already are expressed in such units. If the dimensions are expressed in inches, and the grid mesh of the input tablet 10, FIG. 1, is one hundred lines to the inch along each axis, then the multiplication factor is 100. After this conversion is performed, the current dimension value (found in the currently addressed dimension block) is added to or subtracted from the fixed coordinate value, depending upon whether in the initial pointing sequence list PSL1 the coordinate at the fixed end of the dimension was or was not less than the coordinate at the unfixed end of the dimension (step 397). In the new pointing sequence list PSL2, the coordinate value thus calculated is now substituted for the existing value of the projected coordinate at the unfixed end of the dimension, that is, the coordinate value in the DOC entry to which the unfixed DOC reference word points (step 398, FIG. 16B).

In the present example, where the unfixed DOC reference is the word at PSL location 15, FIG. 7, the projected coordinate whose value is overwritten at this time is $C_H$ in the DOC entry at location 6. Overwriting a projected coordinate effectively changes all other coordinates whose DOC entries have pointers to the entry that has been overwritten. In the present case this would include only one other entry, $D_H$, at location 8 (FIGS. 7 and 10), which points to $C_H$.

As a final phase in this step of the operation (box 398, FIG. 16B), the "fix" bit in the No. 3 position of the DOC entry containing the overwritten coordinate is now set to "1". This completes the fixing of the coordinate in question at a value commensurate with the dimension that is currently being considered. This newly fixed coordinate now may serve as a basis for fixing other coordinates whose respective dimensions refer to it. As shown at step 399, the subroutine F now is called to activate those dimensions which refer to the newly fixed coordinate. Then, as the final step 400 in this sequence, the dimension which was used in the fixing process is now deleted from the index.

The operation now returns to the beginning of the FIXPR sequence (step 390, FIG. 16A) where the respective H or V dimension index is examined to see whether there are any dimensions left in the active list. If there is at least one active dimension, the above-described sequence of steps 391–400 is repeated.

If there are no more active H or V dimensions, FIXPR may terminate and return control to the PROP 1 program. As an alternative, if there are no circular dimensions to be processed, an underdimension test may be performed as indicated at step 401 to ascertain whether the H or V axial dimension list was exhausted before all of the H or V coordinates were fixed. If such is the case, an "underdimension" indication will be generated at step 402, after which control is returned to PROP 1. If circular dimensions are to be processed, the underdimension test should not be made at this, point but should be deferred to the end of the PROP 1 program (FIG. 13C).

With a properly dimensioned line string, the FIXPR routines (horizontal and vertical) will cause the coordinates of all points in a line string to be fixed at values which are consistent with the proportions specified by the dimensions. This completes the processing of the line string data insofar as rectification and proportioning are concerned. It should be noted that throughout these operations the identities of the respective entries in the pointing sequence list are preserved. That is to say, no entry is deleted from the pointing sequence list during rectification and proportioning. In those instances where two or more PSL entries contain coordinate values which become identical during rectification, such entries nevertheless retain their separate identities in the list, although they are linked to each other by pointers. This feature greatly facilitates the processing of the line string data, because it enables a line positioned parallel with one axis to be translated without change of orientation along the other axis (in order to achieve proportioning or for any other purpose) merely by changing a coordinate of one point on that line.

Another advantage of this proportioning procedure is the fact that the precision of each fixed coordinate value is dependent only upon the precision with which the dimension controlling that value is specified. It does not depend upon the precision with which the operator positions the stylus when identifying the tentative coordinates between which the dimension extends.

FIXCR

The subroutine FIXCR performs a proportioning function with respect to circular objects similar to that which is performed by FIXPR upon objects formed of line strings. Since all circular objects have the same shape, however, the proportioning of a circle merely involves fixing the coordinates of its center point C and surface point S, FIG. 27, in accordance with the specified diameter of the circle, which is treated herein as a vertical coordinate. A FORTRAN code listing for the FIXCR subroutine is presented in FIGS. 22A and 22B.

FXLDR

The subroutine FXLDR fixes the position of the leader that runs from the circle dimension to the surface of the circle, FIG. 27. This operation is performed after the position of the circle has been fixed by FIXCR. A FORTRAN code listing of the FXLDR subroutine is presented in FIGS. 24A and 24B.

CHPTR

The CHPTR ("Chase Pointer") subroutine is callable by the FIXCR and FXLDR subroutines as shown in FIG. 11. A program code listing for CHPTR, written in 1800 Assembler language, is presented in FIGS. 23A and 23B. The purpose of this subroutine is to find the entry containing the coordinate value to which the current entry is pointed in those situations where a pointer exists already in the entry that is currently to be processed. Alternative methods of performing the chase pointer function where needed are built into the L and FIXPR subroutines described hereinabove.

What is claimed is:

1. In a digital data processing system which utilizes a graphic data entry means to form a first pointing sequence list having entries that tentatively specify the respective coordinates of a selected sequence of points defining a first representation of an object, said first object representation being permitted to include at least some points that should be axially alined with each other but which actually are displaced by groosly dissimilar amounts from the related coordinate axis in each instance,
   a method of continuously processing the entires in said first list to produce a second list having entries that specify the respective coordinates of a corresponding sequence of points in a revised representation of said object which satisfies axial alinement requirements, said method comprising the following steps:
   a. identifying from the data contained in the entries of said first list any set of adjacently ordered points in the first-named sequence whose counterparts in the revised object representation are to be positioned on a common line paralleling either of the coordinate axes regardless of any gross deviation from said parallel relationship that may exist in said first object representation;
   b. in response to identification of any such set of points, forming a related set of entries in said second list wherein each of the entries but one in said related set has a pointer portion indicating that the coordinate specified by said one entry is to be a projected coordinate common to all members of that set;
   c. repeating steps a and b automaticaly as needed until sets of entries have teen formed in said second list for all sets of axially lined points that are to be included in the revised object representation; and
   d. operating a graphic output manifesting means under control of the entries in said second list for producing a visible representation of said object which effectively corrects errors previously made in the placement of points relative to the coordinate axes in said first object representation, including errors of gross magnitudes.

2. A method as set forth in claim 1 including a step whereby any entry in said first list which specifies a coordinate of a point whose counterpart in said corresponding sequence is not to be alined with an adjacently ordered point in the direction of a given coordinate axis will produce a unique entry in said second list that is not axially related to other entries therein and which specifies a coordinate identical with that of the corresponding entry in said first list.

3. In a digital data processing system which utilizes a graphic data entry means to form a first pointing sequence list having entries that tentatively specify the respective coordinates of a selected first sequence of points with respect to given coordinate axes for defining a first representation of an object, said first object representation being permitted to include at least some points that should be axially alined with each other but which actually are displaced by grossly dissimilar amounts from the related coordinate axis in each instance,
   a method of continuously processing the entries in said first list to produce a second list having entries that specify the respective coordinates of a corresponding second sequence of points in a revised representation of said object, which satisfies axial alinement requirements, said method comprising the following steps:
   a. for any of the points in said first sequence, determining whether there is an intended axial alinement of the corresponding point in said second sequence with a preceding point in said second sequence, such determination being based upon:
     a1. the absence of any indication among the entries of said first list which would preclude such an axially alined relationship between the two points under consideration in said second sequence; and
     a2. a comparative relationship of the difference between the coordinates of the two points under consideration in said first sequence with reference to one of the coordinate axes to the difference between the coordinates of the two points under consideration in said first sequence with reference to the other coordinate axis which denotes the direction of the intended axial alinement, if any, between the two points under consideration in said second sequence;
   b. for any point in said first sequence whose counterpart in said second sequence has been determined in step a to have an axially alined relationship with a preceding point in said second sequence in the direction of one coordinate axis, regardless of the extent to which the respective point in said first sequence may be displaced from such relationship, forming in said second list an entry which contains a pointer portion indicating that the coordinate of said counterpart with reference to the other coordinate axis is the same as the coordinate of said preceding point with reference to said other axis;

c. for any point in said first sequence whose counterpart in said second sequence is determined in step a to have no axially alined relationship with a preceding point in that sequence along either or both of the coordinate axes, forming in said second list an appropriate entry or entries to indicate that said counterpart has the same coordinate or coordinates as the corresponding point in said first sequence, as the case may be;

d. repeating any or all of steps a, b and c automatically as needed to form the second list entries for all of the points in said second sequence, thereby to define said revised object representation; and e. operating a graphic output manifesting means under control of the entries in said second list for producing a visible representation of said object which effectively corrects errors previously made in the placement of points relative to the coordinate axes in said first object representation, including errors of gross magnitudes.

4. A method as set forth in claim 3 wherein step *b* thereof includes a conditional function that is rendered operative when it is determined that a particular point which already has an entry in said second list containing a pointer portion to indicate axial alinement between said particular point and a preceding point is now to be alined along the same axis with yet another preceding point, whereby the respective second list entry for said preceding point is given a pointer portion indicating axial alinement between said preceding point and said other preceding point, thereby indirectly indicating axial alinement between said particular point and said other preceding point.

5. A method as set forth in claim 3 wherein step *b* includes a conditional function that is rendered operative when it is determined that a particular point is to have axial alinement with a preceding point whose respective entry in said second list already has a pointer portion indicating axial alinement thereof with yet another preceding point, whereby the second list entry for said particular point is given a pointer portion indicating axial alinement between said particular point and said other preceding point, thereby indirectly indicating axial alinement between said particular point and said preceding point.

6. In a digital data processing system which utilizes a graphic data entry means to form a first pointing sequence list having entries that define tentative coordinates for a selected sequence of points in a first representation of an object, including a point or set of coordinates which is to serve as an origin, and other entries specifying dimensions to determine the relative positions of a corresponding sequence of points in a revised representation of said object, said first object representation being permitted to include at least some points that are displaced from each other by amounts that differ grossly from the relative displacements that such points should have in order to be consistent with the specified object dimensions, a method of continuously processing the entires in said first list to produce a revised list having entries which denote the respective coordinates of points in said corresponding sequence whose values are consistent with said dimensions, said method comprising the following steps:

a. for each entry in said first list which defines a tentative coordinate of a point in said selected sequence whose counterpart in said corresponding sequence is to be related by one of said dimensions to a coordinate of said origin, forming an entry in said revised list that defines a fixed coordinate for said counterpart having a value obtained by algebraically adding the respective dimension value to the respective origin coordinate;

b. for any entry in said first list which defines a tentative coordinate of a point in said selected sequence whose counterpart in said corresponding sequence is to be related by one of said dimensions to a previously fixed coordinate of a point other than said origin, forming an entry in said revised list that defines a fixed coordinate for said counterpart having a value obtained by algebraically adding the respective dimension value to said previously fixed coordinate value;

c. repeating step b automatically as needed until entries have been formed in said revised list for all points in said corresponding sequence whose coordinates can be determined at least in part from the dimensions specified in said first list; and d. operating a graphic output manifesting means under control of the entries in said revised list for producing a visible representation of said object which effectively corrects errors previously made in the placement of points relative to each other in said first object representation, including errors of gross magnitude.

7. In a digital data processing system which utilizes a graphic data entry means to form a first pointing sequence list having entries that define tentative coordinates for a selected sequence of points in a first representation of an object, including a point or set of coordinates which is to serve as an origin, and other entries specifying dimensions to determine the relative positions of a corresponding sequence of points in a revised representation of said object, at least some of said first list entries being arranged in sets wherein each set includes an entry specifying the value of a dimension and entries denoting the coordinates of points in said selected sequence to which such dimension is referenced, said first object representation being permitted to include at least some points that are displaced from each other by amounts that differ grossly from the relative displacements that such points should have in order to be consistent with the specified object dimensions, a method of continuously processing the entries in said first list to produce a revised list having entries which denote the respective coordinates of points in said corresponding sequence whose values are consistent with said dimensions, said method comprising the following steps:

a. for each set of entries in said first list which defines one of said dimensions and the tentative coordinates of a pair of points including said origin to which such dimension is referenced, forming a set of entries in said revised list to denote that the point other than said origin to which said one dimension is referenced has a counterpart in said corresponding sequence whose respective coordinate is fixed at a value equal to the algebraic sum of said one dimension and the respective origin coordinate;

b. for each particular set of entries in said first list which defines a particular dimension and the tentative coordinates of a pair of points not including said origin to which said particular dimension is referenced, determining whether said revised list contains an entry corresponding to any of the entries in said particular set denoting that either of the points referenced by said particular dimension has an appropriate coordinate with a previously fixed value;

c. in response to the detection in step b of a previously fixed coordinate value for one of the points referenced by said particular dimension, forming a set of entries in said revised list to denote that the other point referenced by said particular dimension has a counterpart in said corresponding sequence whose respective coordinate is fixed at a value equal to the algebraic sum of said particular dimension and said previously fixed coordinate value;

d. repeating steps b and c automatically as needed until entries have been formed in said revised list for all points in said corresponding sequence whose coordinates can be determined at least in part from the dimensions specified in said first list; and e. operating a graphic output manifesting means under control of the entries in said revised list for producing a visible representation of said object which effectively corrects errors previously made in the placement of points relative to each other in said first object representation, including errors of gross magnitude.

8. In a digital data processing system which utilizes a graphic data entry means to form a first pointing sequence list having entries that define tentative coordinates for a selected sequence of points in a first representation of an object, including a point or set of coordinates which is to serve as an origin, and other entries specifying dimensions to determine the relative positions of a corresponding sequence of points in a revised representation of said object, at least some of said first list entries being arranged in sets wherein each set includes an entry specifying the value of a dimension and entries denoting the coordinates of points in said selected sequence to which such dimension is referenced, said first object representation being permitted to include at least some points that are displaced from each other by amounts that differ grossly from the relative displacements that such points should have in order to be consistent with the specified object dimensions, a method of continuously processing the entries in said first list to produce a revised list having entries which denote the respective coordinates of points in said corresponding sequence whose values are consistent with said dimensions, said method comprising the following steps:

a. for each entry in said first list which defines a coordinate of said origin, forming an entry in said revised list to denote that the value of such coordinate is fixed;

b. for any particular set of entries in said first list which defines a particular dimension and the tentative coordinates of a pair of points to which said particular dimension is referenced, determining whether said revised list contains an entry corresponding to any of the entires in said particular set denoting that either of the points referenced by said particular dimension has a corresponding coordinate whose values has just been fixed;

c. in response to the detection in step b of a particular dimension which is referenced to the coordinate whose value has just been fixed, forming an entry in a dimensional index to denote that said particular dimension is in an active status;

d. repeating steps b and c automatically if and as needed for the remaining sets of entries in said first list to form an active index entry for each dimension that is referenced to said coordinate whose value has just been fixed;

e. for any of the dimensions having an entry in said index showing it to be in an active status:

e1. determining which of the points referenced by such dimension has an entry in said revised list denoting that its respective coordinate is of fixed value;

e2. forming in said revised list an entry to denote that the other point referenced by such dimension has a counterpart in said corresponding sequence whose respective coordinate now is fixed at a value equal to the algebraic sum of such dimension and the fixed value specified in e1; and e3. deleting from the dimension index the entry pertaining to such dimension;

f. repeating steps b through e3 automatically if and as needed for each of the remaining dimensions having an entry in said index showing it to be in an active status, treating each such dimension as the particular dimension specified in step b, until all such index entries are exhausted; and g. operating a graphic output manifesting means under control of the entries in said revised list for producing a visible representation of said object which effectively corrects errors previously made in the placement of points relative to each other in said first object representation, including errors of gross magnitude.

9. A method as set forth in claim 8 wherein step *b* includes a conditional function which is rendered operative when it is determined that the coordinates of both points referenced by said particular dimension already are fixed to furnish an indication that the object is overdimensioned.

10. A method as set forth in claim 9 wherein said conditional function also causes steps *c* and *d* of said method to be bypassed for thereby inhibiting the use of that particular dimension.

11. A method as set forth in claim 8 wherein step *f* includes a conditional function which is rendered operative when it is determined that the active dimensional index entries have been exhausted before all of the coordinates of said sequence of points have been fixed to furnish an indication that the object is underdimensioned.

12. In a digital data processing system which utilizes a graphic data entry means to form an initial pointing sequence list whose entries tentatively specify the respective coordinates of a selected sequence of points in an initial object representation along with the dimensions and other necessary geometric relationships that are to be associated with a corresponding sequence of points in a revised object representation, said initial object representation being permitted to include at least some points that are displaced from each other and from the coordinate axes by amounts that deviate grossly from the intended axial alinements and relative displacements that such points should have in order to represent the object accurately, a method of continuously processing the entries in said initial list to produce a revised list having entries which denote the coordinates of said corresponding sequence of points, said method comprising the following steps:

a. identifying from the data contained in said initial list entries any set of adjacently ordered points in the first-named sequence whose counterparts in the revised object representation are to be positioned on a common line paralleling either of the coordinate axes regardless of any gross deviation from such parallel relationship that may exist in said initial object representation;

b. in response to identification of any such set of points, forming a corresponding set of entries relating thereto in said revised list wherein each of the entries but one in said corresponding set has a pointer portion indicating that the coordinate specified by said one entry is to be a projected coordinate common to all members of that set;

c. in those entries of the revised list which specify the coordinates of a point chosen to be the origin of the revised object representation, establishing suitable indicia to denote that each of these coordinates is fixed at its current or some arbitrary value, thereby also denoting that the corresponding coordinate of any other point which was found in step b to have axial alinement with said origin likewise is fixed at said value;

d. in each set of revised list entries other than those which refer to said origin, causing the projected coordinate of that particular set to be fixed at an ultimate value obtained by algebraically adding to a previously fixed coordinate value the dimensional value specified by another entry that defines the desired axial distance from said previously fixed coordinate value to the axially extending line on which the points identified with said particular set of entries are to be located in the revised object representation; and e. operating a graphic output device under control of the entries in said revised list for producing a visible representation of said object which effectively corrects errors made in the placement of the points in said initial object representation, including errors of gross magnitude.

13. In a digital data processing system which utilizes a graphic data entry means to form an initial pointing sequence list whose entries tentatively specify the respective coordinates of a selected sequence of points in an initial object representation along with the dimensions and other necessary geometric relationships that are to be associated with a corresponding sequence of points in a revised object representation, said initial object representation being permitted to include at least some points that are displaced from each other and from the coordinate axes by amounts that deviate grossly from the intended axial alinements and relative displacements that such points should have in order to represent the object accurately, a method of continuously processing the entries in said initial list to produce a revised list having entries which denote the coordinates of said corresponding sequence of points, said method comprising the following steps:

a. identifying from the data contained in said initial list entries any set of adjacently ordered points in the first-named sequence whose counterparts in the revised object representation are to be positioned on a common line paralleling either of the coordinate axes regardless of any gross deviation from such parallel relationship that may exist in said initial object representation;

b. in response to identification of any such set of points, forming a corresponding set of entries relating thereto in said revised list wherein each of the entries but one in said corresponding set has a pointer portion indicating that the coordinate specified by said one entry is to be a projected coordinate common to all members of that set;

c. repeating steps a and b automatically as needed until sets of revised list entries have been formed for all sets of axially alined points that are to be included in the revised object representation;

d. in those entries of the revised list which specify the coordinates of a point chosen to be the origin of the revised object representation, establishing suitable indicia to denote that each of these coordinates is fixed at its current or some arbitrary value, thereby also denoting that the corresponding coordinate of any other point which was found in step b to have axial alinement with said origin likewise is fixed at said value;

e. in each set of revised list entries other than those which refer to said origin, causing the projected coordinate of that particular set to be fixed at an ultimate value obtained by algebraically adding to a previously fixed coordinate value the dimensional value specified by another entry that defines the desired axial distance from said previously fixed coordinate value to the axially extending line on which the points identified with said particular set of entries are to be located in the revised object representation;

f. repeating step e automatically as needed until all projected coordinates are fixed at their ultimate values; and g. operating a graphic output device under control of the entries in said revised list for producing a visible representation of said object which effectively corrects errors made in the placement of the points in said initial object representation, including errors of gross magnitude.

14. A method as set forth in claim 13 including a step whereby any entry in said initial list which relates to a point whose counterpart is not ultimately alined with an adjacently ordered point of said corresponding sequence in the direction of a given coordinate axis is enabled to produce a revised list entry that is treated during the execution of steps e and f as though it constituted a set of entries whose projected coordinate is the coordinate of said nonalined point in the direction of the other axis.

15. In a digital data processing system which utilizes a graphic data entry means to form a first pointing sequence list having entries that tentatively specify the respective coordinates of a selected sequence of points defining a first representation of an object, said first object representation being permitted to include at least some points that should be axially alined with each other but which actually are displaced by grossly dissimilar amounts from the related coordinate axis in each instance, apparatus for continuously processing the entries in said first list to produce a second list having entries that specify the respective coordinates of a corresponding sequence of points in a revised representation of said object which satisfies axial alinement requirements, said apparatus comprising:

a. means for identifying from the data contained in the entries of said first list any set of adjacently ordered points in the first-named sequence whose counterparts in the revised object representation are to be positioned on a common line paralleling either of the coordinate axes regardless of any gross deviation from such parallel relationship that may exist in said first object representation;

b. means responsive to identification of each such set of points for generating a related set of entries in said second list wherein each of the entries but one in said related set has a pointer portion indicating that the coordinate specified by said one entry is to be a projected coordinate common to all members of that set; and c. graphic output manifesting means responsive to the entries in said second list for producing a visible representation of said object which effectively corrects errors previously made in the placement of points relative to the coordinate axes in said first object representation, including errors of gross magnitude.

16. In a digital data processing system which utilizes a graphic data entry means to form a first pointing sequence list having entries that tentatively specify the respective coordinates of a selected first sequence of points with respect to given coordinate axes for defining a first representation of an object, said first object representation being permitted to include at least some points that should be axially alined with each other but which actually are displaced by grossly dissimilar amounts from the related coordinate axis in each instance, apparatus for continuously processing the entries in said first list to produce a second list having entries that specify the respective coordinates of a corresponding second sequence of points in a revised representation of said object which satisfies axial alinement requirements, said apparatus comprising:

a. means effective in response to each of the points in said first sequence for determining whether there is an intended axial alinement of the corresponding point in said second sequence with a preceding point in said second sequence, said alinement-determining means including:

a1. means for determining whether or not the entries of said first list include any indicia which would preclude such an axially alined relationship between any pair of points under consideration in said second sequence; and a2. means for ascertaining the comparative relationship of the difference between the coordinates of each pair of points under consideration in said first sequence with reference to one of the coordinate axes to the difference between the coordinates of said pair of points in said first sequence with reference to the other coordinate axes for thereby determining the direction of the intended axial alinement, if any, between the corresponding pair of points in said second sequence;

b. means controlled by means a and effective whenever an axially alined relationship has been determined between two points in said second list an entry corresponding to one of said two points which contains a pointer portion indicating that the coordinate thereof with reference to the other coordinate axes is the same as the coordinate of the other of said two points with reference to said other axis; and c. graphic output manifesting means responsive to the entries in said second list for producing a visible representation of said object which effectively corrects errors previously made in the placement of points relative to the coordinate axes in said first object representation, including errors of gross magnitude.

17. In a digital data processing system which utilizes a graphic data entry means to form a first pointing sequence list having entries that define tentative coordinates for a selected sequence of points in a first representation of an object, including a point or set of coordinates which is to serve as an origin, and other entries specifying dimensions to determine the relative positions of a corresponding sequence of points in a revised representation of said object, said first object representation being permitted to include at least some points that are displaced from each other by amounts that differ grossly from the relative displacements that such points should have in order to be consistent with the specified object dimensions, apparatus for continuously processing the entries in said first list to produce a revised list having entries which denote the respective coordinates of points in said corresponding sequence whose values are consistent with said dimensions, said apparatus comprising:

a. means for generating entries in said revised list corresponding to the origin entries in said first list to specify fixed coordinates for said origin;

b. means responsive to each entry in said first list which defines a tentative coordinate of a point in said selected sequence whose counterpart in said corresponding sequence is to be related by one of said dimensions to a coordinate of said origin for generating a corresponding entry in said revised list that defines a fixed coordinate for said counterpart having a value obtained by algebraically adding the respective dimension value to the value of the respective origin coordinate;

c. means responsive to each entry in said first list which defines a tentative coordinate of a point in said selected sequence whose counterpart in said corresponding sequence is to be related by one of said dimensions to a previously fixed coordinate of a point other than said origin for generating a corresponding entry in said revised list that defines a fixed coordinate for said counterpart having a value obtained by algebraically adding the respective dimension value to said previously fixed coordinate value; and d. graphic output manifesting means responsive to the entries in said revised list for producing a visible representation of said object which effectively corrects errors previously made in the placement of points relative to each other in said first object representation, including errors of gross magnitude.

18. In a digital data processing system which utilizes a graphic data entry means to form a first pointing sequence list having entries that define tentative coordinates for a selected sequence of points in a first representation of an object, including a point or set of coordinates which is to serve as an origin, and other entries specifying dimensions to determine the relative positions of a corresponding sequence of points in a revised representation of said object, at least some of said first list entries being arranged in sets wherein each set includes an entry specifying the value of a dimension and entries denoting the coordinates of points in said selected sequence to which such dimension is referenced, said first object representation being permitted to include at least some points that are displaced from each other by amounts that differ grossly from the relative displacements that such points should have in order to be consistent with the specified object dimensions, apparatus for continuously processing the entries in said first list to produce a revised list having entries which denote the respective coordinates of points in said corresponding sequence whose values are consistent with said dimensions, said apparatus comprising:

a. means responsive to each set of entries in said first list which defines one of said dimensions and the tentative coordinates of a pair of points including said origin to which such dimension is referenced for generating a corresponding set of entries in said revised list to denote that the point other than said origin to which said one dimension is referenced has a counterpart in said corresponding sequence whose respective coordinate is fixed at a value equal to the algebraic sum of said one dimension and the respective origin coordinate;

b. means responsive to each particular set of entries in said first list which defines a particular dimension and the tentative coordinates of a pair of points not including said origin to which said particular dimension is referenced for determining whether said revised list contains an entry corresponding to any of the entries in said particular set denoting that either of the points referenced by said particular dimension has an appropriate coordinate with a previously fixed value;

c. means controlled by means b in response to the detection of a previously fixed coordinate value for one of the points referenced by said particular dimension for generating a set of entries in said revised list to denote that the other point referenced by said particular dimension has a counterpart in said corresponding sequence whose respective coordinate is fixed at a value equal to the algebraic sum of said particular dimension and said previously fixed coordinate value; and d. graphic output manifesting means responsive to the entries in said revised list for producing a visible representation of said object which effectively corrects errors previously made in the placement of points relative to each other in said first object representation, including errors of gross magnitude.

19. In a digital data processing system which utilizes a graphic data entry means to form a first pointing sequence list having entries that define tentative coordinates for a selected sequence of points in a first representation of an object, including a point or set of coordinates which is to serve as an origin, and other entries specifying dimensions to determine the relative positions of a corresponding sequence of points in a revised representation of said object, at least some of said first list entries being arranged in sets wherein each set includes an entry specifying the value of a dimension and entries denoting the coordinates of points in said selected sequence to which such dimension is referenced, said first object representation being permitted to include at least some points that are displaced from each other by amounts that differ grossly from the relative displacements that such points should have in order to be consistent with the specified object dimensions, apparatus for continuously processing the entries in said first list to produce a revised list having entries which denote the respective coordinates of points in said corresponding sequence whose values are consistent with said dimensions, said apparatus comprising:

a. means responsive to each entry in said first list which defines a coordinate of said origin for generating an entry in said revised list to denote that the value of such coordinate is fixed;

b. means responsive to any particular set of entries in said first list which defines a particular dimension and the tentative coordinates of a pair of points to which said particular dimension is referenced for determining whether said revised list contains an entry corresponding to any of the entries in said particular set denoting that either of the points referenced by said particular dimension has a corresponding coordinate whose value has just been fixed;

c. a dimensional index for storing dimensions to be utilized in proportioning said revised object representation;

d. means controlled by means b in response to the detection of a particular dimension which is referenced to the coordinate whose value has just been fixed for generating an entry in said dimensional index to denote that said particular dimension is in an active status;

e. means responsive to each of the dimensions having an entry in said index showing that such dimension is in an active status for determining which of the points referenced by such dimension has an entry in said revised list denoting that its respective coordinate is of fixed value;

f. means controlled by means e for generating in said revised list an entry to denote that the other point referenced by such dimension has a counterpart in said corresponding sequence whose respective coordinate now is fixed at a value equal to the algebraic sum of such dimension and the fixed value determined by means e; and g. graphic output manifesting means responsive to the entries in said revised list for producing a visible representation of said object which effectively corrects errors previously made in the placement of points relative to each other in said first object representation, including errors of gross magnitude.

20. Apparatus as set forth in claim 19 wherein means e includes additional means effective in the event that the coordinates of both points referenced by such dimension already are fixed to furnish an indication that the object is overdimensioned.

21. Apparatus as set forth in claim 20 wherein said additional means also is effective to inhibit the utilization of such dimension by means $f$.

22. Apparatus as set forth in claim 19 which includes additional means effective in the event that the quantity of dimensions stored in index c is insufficient to enable all of said tentative coordinates to be given fixed values for furnishing an indication that the object is underdimensioned.

23. In a digital data processing system which utilizes a graphic data entry means to form an initial pointing sequence list whose entries tentatively specify the respective coordinates of a selected sequence of points in an initial object representation along with the dimensions and other necessary geometric relationships that are to be associated with a corresponding sequence of points in a revised object representation, said initial object representation being permitted to include at least some points that are displaced from each other and from the coordinate axes by amounts that deviate grossly from the intended axial alinements and relative displacements that such points should have in order to represent the object accurately, apparatus for continuously processing the entries in said initial list to produce a revised list having entries which denote the coordinates of said corresponding sequence of points, said apparatus comprising:

a. means for identifying from the data contained in said initial list entries any set of adjacently ordered points in the first-named sequence whose counterparts in the revised object representation are to be positioned on a common line paralleling either of the coordinate axes regardless of any gross deviations from such parallel relationship that may exist in said initial object representation;

b. means responsive to identification of any such set of points for generating a corresponding set of entries relating thereto in said revised list wherein each of the entries but one in said corresponding set has a pointer portion indicating that the coordinate specified by said one entry is to be a projected coordinate common to all members of that set;

c. means responsive to those entries of the revised list which specify the coordinates of a point chosen to be the origin of the revised object representation for establishing suitable indicia in such entries to denote that each of these coordinates is fixed at its or some arbitrary value, thereby also denoting that the corresponding coordinate of any other point which was found by means b to have axial alinement with said origin likewise is fixed at said value;

d. means responsive to each set of revised list entries other than those which refer to said origin for causing the projected coordinate of that particular set to be fixed at an ultimate value obtained by algebraically added to a previously fixed coordinate value the dimensional value specified by another entry that defines the desired axial distance from said previously fixed coordinate value to the axially extending line on which the points identified with said particular set of entries are to be located in the revised object representation; and e. graphic output manifesting means responding to the entries in said revised list for producing a visible representation of said object which effectively corrects errors previously made in the placement of points relative to each other in said first object representation, includng errors of gross magnitude.

* * * * *

UNITED STATES PATENT OFFICE
CERTIFICATE OF CORRECTION

Patent No. 4,058,849      Dated November 15, 1977

Inventor(s) William Joseph Fitzgerald et al

It is certified that error appears in the above-identified patent and that said Letters Patent are hereby corrected as shown below:

Column 1, line 53, "is" should read --it--.

Column 9, line 63, "pSL" should read --PSL--.

Column 21, line 53, "FIGS. 31A" should read --FIGS. 13A--.

Column 22, line 63, "n" should read --in--.

Column 28, line 26, "three" should read --these--.

Column 31, line 29, after "active" insert --ones--.

Column 31, line 36, "considerered" should read --considered--.

Column 33, line 12, after "specified" insert --circle--.

Column 37, line 46, "groosly" should read --grossly--.

Column 38, line 5, "lined" should read --alined--.

UNITED STATES PATENT OFFICE
CERTIFICATE OF CORRECTION

Patent No. 4,058,849　　　　　　　　　　Dated November 15, 1977

Inventor(s)　William Joseph Fitzgerald et al

It is certified that error appears in the above-identified patent and that said Letters Patent are hereby corrected as shown below:

Column 40, line 10, after "the", second occurrence, insert --value of the--.

Column 46, line 3, after "second" insert --sequence in the direction of one coordinate axis for generating in said second--.

Column 50, line 23, "added" should read --adding--.

Column 50, line 30, "responding" should read --responsive--.

Column 50, line 35, "includng" should read --including--.

Signed and Sealed this

Sixteenth Day of May 1978

[SEAL]

Attest:

RUTH C. MASON　　　　　　　LUTRELLE F. PARKER
Attesting Officer　　　　Acting Commissioner of Patents and Trademarks